(12) United States Patent
Winklevoss et al.

(10) Patent No.: US 10,325,257 B1
(45) Date of Patent: *Jun. 18, 2019

(54) SYSTEMS AND METHODS FOR STORING DIGITAL MATH-BASED ASSETS USING A SECURE PORTAL

(71) Applicant: Winklevoss IP, LLC, Wilmington, DE (US)

(72) Inventors: Cameron Howard Winklevoss, New York, NY (US); Tyler Howard Winklevoss, New York, NY (US); Evan Louis Greebel, Scarsdale, NY (US); Kathleen Hill Moriarty, New York, NY (US); Gregory Elias Xethalis, New York, NY (US)

(73) Assignee: WINKLEVOSS IP, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,292

(22) Filed: Jun. 5, 2018

Related U.S. Application Data

(63) Continuation of application No. 14/320,900, filed on Jul. 1, 2014, now Pat. No. 10,068,228, which is a
(Continued)

(51) Int. Cl.
*G06Q 20/34* (2012.01)
*G06Q 20/38* (2012.01)
*G06Q 20/02* (2012.01)

(52) U.S. Cl.
CPC ......... *G06Q 20/3829* (2013.01); *G06Q 20/34* (2013.01); *G06Q 20/02* (2013.01); *G06Q 2220/14* (2013.01)

(58) Field of Classification Search
CPC ............ G06Q 20/065; G06Q 20/405; G06Q 20/4097; G06Q 30/0633; G06Q 40/06; G06Q 30/04; G06Q 30/06
See application file for complete search history.

(56) References Cited

U.S. PATENT DOCUMENTS 4,790,431 A * 12/1988 Reel ................. G06F 1/1628
190/109
5,675,649 A * 10/1997 Brennan ................. H04L 9/085
380/286
(Continued)

FOREIGN PATENT DOCUMENTS

CA 2627540 A1 9/2009
CN 103927656 7/2014
(Continued)

OTHER PUBLICATIONS

U.S. Appl. No. 61/954,434, filed Mar. 17, 2014.
(Continued)

*Primary Examiner* — Steven S Kim
*Assistant Examiner* — Johann Y Choo
(74) *Attorney, Agent, or Firm* — Amster, Rothstein & Ebenstein LLP

(57) ABSTRACT

Systems and methods for securely storing digital assets using a secure portal are disclosed. Using an isolated computer within an electronic isolation chamber, a plurality of digital asset accounts may be generated, and one or more private keys and a digital asset account identifier corresponding to each of the digital asset accounts may be obtained. A respective reference identifier may be associated with each digital asset account. At least one of the one or more private keys corresponding to each digital asset account may be divided into a plurality of private key segments and written to a card along with the respective
(Continued)

reference identifier to create sets of collated cards, wherein each set comprises cards corresponding to different private keys.

30 Claims, 40 Drawing Sheets

Related U.S. Application Data continuation-in-part of application No. 14/318,456, filed on Jun. 27, 2014, now Pat. No. 9,892,460.

(60) Provisional application No. 61/989,047, filed on May 6, 2014, provisional application No. 61/986,685, filed on Apr. 30, 2014, provisional application No. 61/978,724, filed on Apr. 11, 2014, provisional application No. 61/971,981, filed on Mar. 28, 2014, provisional application No. 61/955,017, filed on Mar. 18, 2014, provisional application No. 61/933,428, filed on Jan. 30, 2014, provisional application No. 61/920,534, filed on Dec. 24, 2013, provisional application No. 61/903,245, filed on Nov. 12, 2013, provisional application No. 61/900,191, filed on Nov. 5, 2013, provisional application No. 61/891,294, filed on Oct. 15, 2013, provisional application No. 61/857,691, filed on Jul. 23, 2013, provisional application No. 61/857,141, filed on Jul. 22, 2013, provisional application No. 61/856,323, filed on Jul. 19, 2013, provisional application No. 61/841,760, filed on Jul. 1, 2013, provisional application No. 61/841,177, filed on Jun. 28, 2013.

(56) References Cited

U.S. PATENT DOCUMENTS

| | | | |
|---|---|---|---|
| 5,799,287 A | 8/1998 | Dembo | |
| 5,950,176 A | 9/1999 | Keiser et al. | |
| 6,021,257 A * | 2/2000 | Chikauchi | G06K 15/00 |
| | | | 358/1.11 |
| 6,157,920 A | 12/2000 | Jakobsson et al. | |
| 6,505,174 B1 | 1/2003 | Keiser et al. | |
| 6,523,012 B1 | 2/2003 | Glassman et al. | |
| 6,583,712 B1 * | 6/2003 | Reed | G07C 9/00103 |
| | | | 340/5.21 |
| 7,167,565 B2 * | 1/2007 | Rajasekaran | H04L 9/085 |
| | | | 380/278 |
| 7,330,538 B2 * | 2/2008 | Dunsmuir | H04M 3/53333 |
| | | | 379/88.18 |
| 7,391,865 B2 * | 6/2008 | Orsini | G06F 21/31 |
| | | | 380/201 |
| 7,487,123 B1 | 2/2009 | Keiser et al. | |
| 7,677,974 B2 | 3/2010 | Van Luchene | |
| 7,716,484 B1 | 5/2010 | Kaliski, Jr. | |
| 7,870,058 B2 | 1/2011 | Maltzman | |
| 7,873,573 B2 * | 1/2011 | Realini | G06Q 20/04 |
| | | | 235/379 |
| 7,999,748 B2 * | 8/2011 | Ligtenberg | H01H 13/705 |
| | | | 343/702 |
| 8,108,278 B2 | 1/2012 | Tzekin et al. | |
| 8,108,283 B2 | 1/2012 | Dimitri et al. | |
| 8,139,770 B2 * | 3/2012 | Zheng | H04L 9/0894 |
| | | | 380/277 |
| 8,224,702 B2 | 7/2012 | Mengerink et al. | |
| 8,229,855 B2 | 7/2012 | Huang et al. | |
| 8,229,859 B2 | 7/2012 | Samid | |
| 8,239,330 B2 | 8/2012 | Montero et al. | |
| 8,249,965 B2 * | 8/2012 | Tumminaro | G06Q 20/12 |
| | | | 705/35 |
| 8,255,297 B2 | 8/2012 | Morgenstern et al. | |
| 8,275,692 B2 | 9/2012 | Cartledge et al. | |
| 8,306,910 B2 | 11/2012 | Wilkes | |
| 8,326,751 B2 | 12/2012 | Driemeyer et al. | |
| 8,352,326 B2 | 1/2013 | Betzler et al. | |
| 8,452,703 B2 | 5/2013 | O'Leary et al. | |
| 8,606,685 B2 | 12/2013 | Keiser et al. | |
| 8,630,951 B2 | 1/2014 | Wilkes | |
| 8,688,525 B2 | 4/2014 | Minde | |
| 8,688,563 B2 | 4/2014 | Mehew et al. | |
| 8,712,914 B2 | 4/2014 | Lyons et al. | |
| 8,719,131 B1 | 5/2014 | Roth et al. | |
| 9,794,074 B2 | 10/2017 | Toll et al. | |
| 2002/0143614 A1 | 10/2002 | MacLean et al. | |
| 2002/0171546 A1 * | 11/2002 | Evans | G06F 21/554 |
| | | | 340/540 |
| 2003/0009413 A1 | 1/2003 | Furbush et al. | |
| 2003/0014749 A1 | 1/2003 | Simons et al. | |
| 2003/0225672 A1 | 12/2003 | Hughes et al. | |
| 2004/0049464 A1 * | 3/2004 | Ohmori | G06F 21/10 |
| | | | 705/51 |
| 2004/0143710 A1 * | 7/2004 | Walmsley | B41J 2/04505 |
| | | | 711/144 |
| 2004/0193657 A1 | 9/2004 | Saito et al. | |
| 2004/0243488 A1 * | 12/2004 | Yamamoto | G06F 21/10 |
| | | | 705/30 |
| 2005/0044022 A1 | 2/2005 | Spirgel et al. | |
| 2005/0240510 A1 | 10/2005 | Schweickert et al. | |
| 2007/0117615 A1 | 5/2007 | Van Luchene | |
| 2007/0146797 A1 * | 6/2007 | Sakai | H04N 1/00326 |
| | | | 358/3.28 |
| 2007/0219869 A1 | 9/2007 | Haines et al. | |
| 2007/0271455 A1 * | 11/2007 | Nakano | G06Q 20/1235 |
| | | | 713/154 |
| 2008/0109280 A1 | 5/2008 | Csoka | |
| 2008/0120221 A1 | 5/2008 | Toneguzzo | |
| 2008/0140578 A1 | 6/2008 | Felt et al. | |
| 2008/0167965 A1 | 7/2008 | Von Nothaus et al. | |
| 2008/0215474 A1 * | 9/2008 | Graham | G06Q 10/10 |
| | | | 705/37 |
| 2008/0243703 A1 | 10/2008 | Al-Herz et al. | |
| 2008/0249957 A1 | 10/2008 | Masuyama et al. | |
| 2008/0281444 A1 | 11/2008 | Krieger et al. | |
| 2009/0089168 A1 | 4/2009 | Schneck | |
| 2009/0094134 A1 | 4/2009 | Toomer et al. | |
| 2009/0098939 A1 | 4/2009 | Hamilton, II et al. | |
| 2009/0119200 A1 | 5/2009 | Riviere | |
| 2009/0132830 A1 * | 5/2009 | Haga | H04L 9/085 |
| | | | 713/189 |
| 2009/0265268 A1 | 10/2009 | Huang et al. | |
| 2010/0094771 A1 | 4/2010 | VanderPal | |
| 2010/0174646 A1 | 7/2010 | Cole et al. | |
| 2010/0228674 A1 | 9/2010 | Ogg et al. | |
| 2010/0250360 A1 | 9/2010 | Ball et al. | |
| 2010/0306084 A1 | 12/2010 | Ciptawilangga | |
| 2011/0110516 A1 * | 5/2011 | Satoh | G06F 21/10 |
| | | | 380/201 |
| 2011/0112662 A1 | 5/2011 | Thompson et al. | |
| 2011/0231913 A1 | 9/2011 | Feng et al. | |
| 2011/0270748 A1 * | 11/2011 | Graham, III | G06Q 20/102 |
| | | | 705/40 |
| 2011/0302412 A1 | 12/2011 | Deng et al. | |
| 2012/0078693 A1 | 3/2012 | Wilkes | |
| 2012/0101886 A1 | 4/2012 | Subramanian et al. | |
| 2012/0123924 A1 | 5/2012 | Rose et al. | |
| 2012/0185395 A1 | 7/2012 | Wilkes | |
| 2012/0239543 A1 | 9/2012 | Ryan | |
| 2012/0278200 A1 | 11/2012 | van Coppenolle et al. | |
| 2013/0036373 A1 | 2/2013 | Alderfer et al. | |
| 2013/0041773 A1 | 2/2013 | Muse | |
| 2013/0054471 A1 | 2/2013 | Samid | |
| 2013/0061049 A1 | 3/2013 | Irvine | |
| 2013/0159699 A1 * | 6/2013 | Torkkel | G06F 21/6245 |
| | | | 713/155 |
| 2013/0166455 A1 | 6/2013 | Feigelson | |
| 2013/0179337 A1 * | 7/2013 | Ochynski | G06Q 40/02 |
| | | | 705/40 |
| 2013/0191277 A1 | 7/2013 | O'Leary et al. | |
| 2013/0232023 A2 | 9/2013 | Muse | |
| 2013/0238478 A1 | 9/2013 | Bruno | |

(56) References Cited

U.S. PATENT DOCUMENTS

| | | |
|---|---|---|
| 2013/0246233 A1 | 9/2013 | Hakim |
| 2013/0254052 A1 | 9/2013 | Royyuru et al. |
| 2013/0311266 A1 | 11/2013 | Vichich et al. |
| 2013/0311348 A1 | 11/2013 | Samid |
| 2013/0317972 A1 | 11/2013 | Morgenstern et al. |
| 2013/0317984 A1 | 11/2013 | O'Leary |
| 2013/0325701 A1 | 12/2013 | Schwartz |
| 2014/0025473 A1 | 1/2014 | Cohen |
| 2014/0032267 A1 | 1/2014 | Smith et al. |
| 2014/0040157 A1 | 2/2014 | Cohen et al. |
| 2014/0081710 A1 | 3/2014 | Rabie |
| 2014/0122903 A1* | 5/2014 | Endo .............. G06F 21/602 713/193 |
| 2014/0141869 A1 | 5/2014 | Shore |
| 2014/0156497 A1 | 6/2014 | Mehew et al. |
| 2014/0164251 A1* | 6/2014 | Loh .............. G06Q 20/065 705/67 |
| 2014/0233740 A1* | 8/2014 | Niamut .............. H04L 9/3013 380/279 |
| 2014/0310527 A1* | 10/2014 | Veugen .............. H04L 9/3013 713/171 |
| 2014/0344015 A1 | 11/2014 | Puertolas-Montanes et al. |
| 2015/0033301 A1 | 1/2015 | Pianese |
| 2015/0120567 A1 | 4/2015 | Van Rooyen et al. |
| 2015/0120569 A1 | 4/2015 | Belshe |
| 2015/0170112 A1 | 6/2015 | DeCastro |
| 2015/0193744 A1 | 7/2015 | Adleman |
| 2015/0227897 A1 | 8/2015 | Loera |
| 2015/0244690 A1 | 8/2015 | Mossbarger |
| 2015/0262137 A1 | 9/2015 | Armstrong |
| 2015/0262138 A1 | 9/2015 | Hudon |
| 2015/0262139 A1 | 9/2015 | Shtylman |
| 2015/0262140 A1 | 9/2015 | Armstrong |
| 2015/0262141 A1 | 9/2015 | Rebernik |
| 2015/0262168 A1 | 9/2015 | Armstrong |
| 2015/0262171 A1 | 9/2015 | Langschaedel |
| 2015/0262172 A1 | 9/2015 | Rebernik |
| 2015/0262173 A1 | 9/2015 | Durbin et al. |
| 2015/0262176 A1* | 9/2015 | Langschaedel ...... G06Q 20/065 705/71 |
| 2015/0310424 A1 | 10/2015 | Myers |
| 2015/0324787 A1 | 11/2015 | Schaffner |
| 2015/0332283 A1 | 11/2015 | Witchey |
| 2015/0341422 A1 | 11/2015 | Farnlof et al. |
| 2015/0348169 A1 | 12/2015 | Harris et al. |
| 2015/0356523 A1 | 12/2015 | Madden |
| 2015/0356555 A1 | 12/2015 | Pennanen |
| 2015/0363777 A1 | 12/2015 | Ronca et al. |
| 2015/0363783 A1 | 12/2015 | Ronca et al. |
| 2015/0379510 A1 | 12/2015 | Smith |
| 2016/0027229 A1 | 1/2016 | Spanos et al. |
| 2016/0028552 A1 | 1/2016 | Spanos et al. |
| 2016/0078219 A1 | 3/2016 | Hernan |
| 2016/0080156 A1 | 3/2016 | Kaliski, Jr. et al. |
| 2016/0086187 A1 | 3/2016 | Joao |
| 2016/0092988 A1 | 3/2016 | Letourneau |
| 2016/0112200 A1 | 4/2016 | Kheterpal et al. |
| 2016/0125040 A1 | 5/2016 | Kheterpal et al. |
| 2016/0162873 A1 | 6/2016 | Zhou et al. |
| 2016/0203448 A1 | 7/2016 | Metnick et al. |
| 2017/0005804 A1 | 1/2017 | Zinder |
| 2017/0017955 A1 | 1/2017 | Stern et al. |
| 2017/0091750 A1 | 3/2017 | Maim |
| 2017/0124535 A1 | 5/2017 | Juels et al. |
| 2017/0132630 A1 | 5/2017 | Castinado |

FOREIGN PATENT DOCUMENTS

| | | |
|---|---|---|
| EP | 2634738 A1 | 4/2013 |
| WO | WO 00/26745 | 5/2000 |
| WO | WO2000026745 A2 | 5/2000 |
| WO | WO 01/67409 | 9/2001 |
| WO | WO 01/86373 | 11/2001 |
| WO | WO 2008/127428 | 10/2008 |
| WO | WO2011008630 | 1/2011 |
| WO | WO2013034278 A2 | 3/2013 |
| WO | WO 2015/059669 | 4/2015 |
| WO | WO 2015/085393 | 6/2015 |
| WO | WO 2015/113519 | 8/2015 |
| WO | WO 2015/179020 | 11/2015 |
| WO | 2016-015041 A1 | 1/2016 |
| WO | WO 2016/088659 | 1/2016 |
| WO | WO 2016/022864 | 2/2016 |
| WO | WO 2016/029119 | 2/2016 |

OTHER PUBLICATIONS

U.S. Appl. No. 61/990,017, filed May 7, 2014.
U.S. Appl. No. 62/042,676, filed Aug. 27, 2014.
U.S. Appl. No. 62/056,100, filed Sep. 26, 2014.
U.S. Appl. No. 62/086,669, filed Dec. 2, 2014.
U.S. Appl. No. 62/099,992, filed Jan. 15, 2015.
David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.
Ken Hawkins, Exchange-Traded Funds (ETFs), Investopedia (May 12, 2013) Internet archive, https://web.archive.org/web/20130512125447/http://www.investopedia.com/university/exchange-traded-fund/.
Proof of stake instead of proof of work, Bitcoin Forum, https://bitcointalk.org/index.php?topic=27787 (last visited Nov. 6, 2015).
Trading Namecoins for Bitcoins, Bitcoin Forum, https://bitcointalk.org/index.php?topic=6289.0 (last visited Nov. 6, 2015).
International Search Report and Written Opinion issued in Application No. PCT/US16/25189 dated Jul. 1, 2016 (15 pp.).
"Digital Currency Exchange Goes Live to Public in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.
"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issuance-Documented-With-Blockchain-Technology.html, Dec. 30, 2015, 3 pages.
International Search Report and Written Opinion issued in Application No. PCT/US16/040711 dated Oct. 4, 2016 (14 pages).
"Blockchain Technologies Corp Makes History, 2016 Iowa Caucus Results Forever Documented on Blockchain", https://globenewswire.com/news-release/2016/02/06/808320/10159855/en/Blockchain-Technologies-Corp-Makes-History-2016-Iowa-Caucus-Results-Forever-Documented-on-Blockchain.html, Feb. 5, 2016, 2 pages.
"AlphaPoint Announces Blockchain Solution Custom-Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.
"Nasdaq Launches Enterprise-Wide Blockchain Technology Initiative", Nasdaq, https://globenewswire.com/news-release/2015/05/11/734456/10133665/en/Nasdaq-Launches-Enterprise-Wide-Blockchain-Technology-Initiative.html, May 11, 2015, 3 pages.
"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Industry.html, Mar. 14, 2016, 3 pages.
Nakamoto, S., "Bitcoin: A Peer-to-Peer Electronic Cash System,"www.bitcoin.org, 9 pages.
[ANN] M-of-N "Fragmented Backups" now in Armory (command-line only), Bitcoin Forum (Mar. 6, 2013), https://bitcointalk.org/index.php?topic=149820.0 (last visited Dec. 4, 2013).
2-of-3 Paper Wallets, Bitcoin Forum (published Jan. 29, 2013), https://bitcointalk.org/index.php?topic=139625.msg1487254 (last visited Dec. 4, 2013).
A Physical Price Tag for a Digital Currency. Introducing Bittag., BitTag, http://bittag.net/ (last visited Feb. 5, 2014).

(56) References Cited

OTHER PUBLICATIONS

A powerful trading platform for Bitcoin traders, BTXTrader.com (Aug. 13, 2013) Internet Archive, https://web.archive.org/web/20130813052513/http://www.btxtrader.com/.

About Bitcoin, Bitcoin.org (May 2, 2013) Internet Archive, http://web.archive.org/web/20130502214154/http://bitcoin.org/en/about.

An Open Source P2P Digital Currency, Bitcoin.org, http://bitcoin.org/en/ (last visited Jul. 22, 2013).

Ashlee Vance & Brad Stone, The Bitcoin-Mining Arms Race Heats Up, BloombergBusinessweek, http://www.businessweek.com/articles/2014-01-09/bitcoin-mining-chips-gear-computing-groups-competition-heats-up (last visited Jan. 9, 2014).

Bitcoin Fund Exclusively Available On EXANTE's Platform, EXANTE, https://exante.eu/press/news/266/ (last visited Oct. 10, 2013).

Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.

Bitcoin Theft Insurance, Ecoin Club (published Dec. 3, 2013), http://ecoinclub.com/bitcoin-insurance/ (last visited Dec. 5, 2013).

Bitcoin, Wikipedia (Jun. 24, 2013), Internet Archive http://web.archive.org/web/20130624030646/http://en.wikipedia.org/wiki/Bitcoin.

Bitcoinaverage code repository, GitHub, https://github.com/bitcoinaverage/bitcoinaverage/commits/master?page=134 (last visited Feb. 24, 2014).

BitcoinAverage.com—independent bitcoin price, Bitcoin Forum, https://bitcointalk.org/index.php?topic=270190.0 (last visited Feb. 24, 2014).

BitcoinAverage.com, Reddit, http://www.reddit.com/r/Bitcoin/comments/1jl9c2/ (last visited Feb. 24, 2014).

Bitcoin's First Kiosk, Robocoin (Jul. 2, 2013) Internet Archive, https://web.archive.org/web/20130702171110/https://robocoinkiosk.com/.

Bitcoin's First Real ATM, Robocoin Blog, http://blog.robocoinkiosk.com/ (last visited Nov. 11, 2013).

Bitflash Weekly Review (Apr. 14, 2014), Pantera, https://panteracapital.com/bitflash/ (last visited Apr. 15, 2014).

Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_IdXuS (last visited May 30, 2014).

Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).

Buying and Selling Linden Dollars, Second Life, http://community.secondlife.com/t5/English-Knowledge-Base/Buying-and-selling-Linden-dollars/ta-p/700107 (last visited Dec. 9, 2013).

Charts, Bitcoin Charts (May 10, 2013) Internet Archive, https://web.archive.org/web/20130510172057/http://bitcoincharts.com/charts/.

Choose Your Wallet, Bitcoin.org (May 30, 2013) Internet Archive, http://web.archive.org/web/20130530072551/http://bitcoin.org/en/choose-your-wallet.

Circle (May 19, 2014) Internet Archive, https://web.archive.org/web/20140519175717/https://www.circle.com/.

Coinbase, Bitcoin Wallet (Jul. 22, 2013) Internet Archive, http://web.archive.org/web/20130722200359/https://coinbase.com/.

Coinbase, Bitcoin Wallet, https://coinbase.com/ (last visited Aug. 15, 2013).

CoinDesk Bitcoin Price Index, CoinDesk, http://www.coindesk.com/price/ (last visited Oct. 23, 2013).

CoinDesk, This week we released the first version of our mobile app on iPhone, Twitter (published May 2, 2014), https://twitter.com/coindesk/status/462255287177453568?refsrc=email (last visited May 5, 2014).

Durnford, Barter network aims to help Mile End's cash-strapped live well, The Gazette [Montreal, Que] (Jan. 23, 1996).

Electrum, Bitcoin wiki, https://en.bitcoin.it/wiki/Electrum (last visited Jul. 22, 2013).

Elliptic Vault: Secure, Worry-free Storage for Your Bitcoins, Elliptic.co (Jan. 12, 2014) Internet Archive, https://web.archive.org/web/20140112043128/https://www.elliptic.co/vault.

FAQ: What's the Difference Between PPCoin and Bitcoin?, GitHub, https://github.com/ppcoin/ppcoin/wiki/FAQ (last visited Jul. 22, 2013).

First Bitcoin Capital Corp.(otc markets:BITCF) Launches Digital Currency Exchange, CoinQX.com in Beta, The Wall Street Journal MarketWatch, http://www.marketwatch.com/story/first-bitcoin-capital-corpotc-markets-bitcf-launches-digital-currency-exchange-coinqxcom-in-beta-2014-05-21 (last visited May 21, 2014).

How Bitcoin Works Under The Hood, Imponderable Things (Scott Driscoll's Blog) (published Jul. 14, 2013), http://www.imponderablethings.com/2013/07/how-bitcoin-works-under-hood.html (last visited Oct. 10, 2013).

How DigiCash Blew Everything, NEXT (published Jan. 1999), http://cryptome.org/jya/digicrash.htm (last visited Jan. 9, 2014).

How Does Bitcoin Work?, Bitcoin.org, (May 1, 2013) Internet Archive, http://web.archive.org/web/20130501092121/http://bitcoin.org/en/how-it-works.

How is Mt.Gox weighted average calculated?, Bitcoin Forum (Mar. 18, 2013), https://bitcointalk.org/index.php?topic=154548.0 (last visited Jul. 25, 2013).

Ina Steiner, eBay Mulls New Feature to Eliminate Deadbeat Bidders, EcommerceBytes Blog (published May 12, 2012), http://www.ecommercebytes.com/C/blog/blog.pl?/pl/2012/5/1336831866.html (last visited May 30, 2014).

Independent Bitcoin Price, BitcoinAverage, https://bitcoinaverage.com/explain.htm (last visited Mar. 4, 2014).

Introducing BDIC: Bitcoin's decentralized, privately-funded version of the FDIC, Reddit (published Dec. 4, 2013), http://www.reddit.com/r/Bitcoin/comments/1s365o/introducing_bdic_bitcoins_decentralized/ (last visited Dec. 5, 2013).

James Ball, Meet the seven people who hold the keys to worldwide internet security, The Guardian, http://www.theguardian.com/technology/2014/feb/28/seven-people-keys-worldwide-internet-security-web (last visited Mar. 7, 2014).

Jeremy Allaire, What We Have Been Up to at Circle, The Circle Blog (May 19, 2014) Internet Archive, https://web.archive.org/web/20140519162958/https://www.circle.com/2014/05/15/circle-update/.

Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.

John Biggs, Xapo Raises $20 Million to Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.

Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).

Jon Southurst, ATM Industry Association Publishes Report on Bitcoin ATMs, CoinDesk (published Mar. 20, 2014), http://www.coindesk.com/atm-industry-association-publishes-report-bitcoin-atms/ (last visited Mar. 21, 2014).

Jonathan Shieber, Circle Emerges From Stealth to Bring Bitcoin to the Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.

Larry Ren, Proof of Stake Velocity: Building the Social Currency of the Digital Age, www.reddcoin.com (Apr. 2014).

Lisa Fleisher, London's New Bitcoin Exchange Hopes to Avoid Mt. Gox Fate, The Wall Street Journal (published Apr. 30, 2014), http://blogs.wsj.com/digits/2014/04/30/londons-new-bitcoin-exchange-hopes-to-avoid-mt-gox-fate/ (last visited May 1, 2014).

Markets API, Bitcoin Charts (Jun. 3, 2013) Internet Archive, https://web.archive.org/web/20130603091557/http://bitcoincharts.com/about/markets-api.

Max Raskin, Cameron and Tyler Winklevoss on Bitcoin and Their Public Persona, BloombergBusinessweek, http://www.businessweek.

(56) References Cited

OTHER PUBLICATIONS com/articles/2013-08-08/cameron-and-tyler-winklevoss-on-bitcoin-and-their-public-persona (last visited Aug. 8, 2013).
"What Is Blockchain Technology?" Quora. N.p. Jan. 15, 2009. Web. Jun. 9, 2017. <https://www.quora.com/What-is-blockchain-technology-1>.
BANKEX Proof-of-Asset Protocol—The Smart White Paper, version 0.3.1 beta (Oct. 19, 2017) 36 pgs.
ATMIA ATM Industry Association Position Paper, www.atmia.com, Internet.
Winklevosses' Gemini to Offer Cryptocurrency Block Trading, Olga Kharif and Matthew Leising, Bloomberg.com (Apr. 9, 2018) https://www.bloomberg.com/news/articles/2018-04-09/winklevoss-s-gemini-to-offer-cryptocurrency-block-trading, Internet.
A block chain based decentralized exchange, Harsh Patel.
Marketplace—Gemini, web.archive.org (Last modified Jan. 8, 2018) http://web.archive.org/web/20180125115941/https://gemini.com/marketplace/, Internet.
Marketplace—Gemini, web.archive.org (Last modified Nov. 25, 2017) http://web.archive.org/web/20171211092415/https://gemini.com/marketplace/, Internet.
Marketplace, Gemini.com (Last modified Sep. 20, 2018) https://gemini.com/marketplace/, Internet.
The Ripple Network Review—What Is Ripple?, Donald McIntyre—Etherplan (Aug. 1, 2013) https://etherplan.com/2013/08/01/the-ripple-network-review-what-is-ripple/4103/, Internet.
Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.
Notice of References Cited, U.S. Appl. No. 12/192,809 (Oct. 10, 2012).
Online auctions: An in-depth look, National Consumers League, http://www.nclnet.org/personal-finance/121-online-auctions/279online-auctions-an-in-depth-look (last visited May 30, 2014).
PPCoin Proof of Stake Minting Setup Guide, Bitcoin Forum (Apr. 25, 2013) https://bitcointalk.org/index.php?topic=187714.0 (last visited Jul. 22, 2013).
PPCoin, Wikipedia, http://en.wikipedia.org/wiki/PPCoin (last visited Jul. 22, 2013).
Private Bitcoin Insurance, Inscrypto, http://go.inscrypto.com (last visited Jan. 24, 2014).
Proof-of-stake, Wikipedia, http://en.wikipedia.org/wiki/Proof-of-stake (last visited Jul. 22, 2013).
Proof-of-work System, Wikipedia, http://en.wikipedia.org/wiki/Proof-of-work (last visited Jul. 22, 2013).
Protocol of Bitcoin, Wikipedia, http://en.wikipedia.org/wiki/Bitcoin_mining (last visited Jul. 22, 2013).
Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).
Rob Wile, Shares of No-Name Tech Company Go Crazy After It Announces It's Getting Into The Bitcoin Game, Business Insider, http://www.businessinsider.com/wpcs-bitcoin-2013-12?nr_email_referer=1&utm_source=Triggermail&utm_medium=email&utm_content=emailshare (last visited Dec. 30, 2013).
Satoshi Nakamoto, Bitcoin: A Peer-to-Peer Electronic Cash System (Oct. 31, 2008).
Securing Your Wallet, Bitcoin.org (Jul. 21, 2013) Internet Archive, http://web.archive.org/web/20130721194621/http://bitcoin.org/en/secure-your-wallet.
Security for Your Peace of Mind, Coinbase, https://coinbase.com/security (last visited Oct. 28, 2013).
Shamir's Secret Sharing, Wikipedia, http://en.wikipedia.org/wiki/Shamir's_Secret_Sharing (last visited Jul. 22, 2013).
Some Things You Need to Know, Bitcoin.org (May 2, 2013) Internet Archive, http://web.archive.org/web/20130502051011/http://bitcoin.org/en/you-need-to-know.
Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).
Sunny King & Scott Nadal, PPCoin: Peer-to-Peer Crypto-Currency with Proof-of-Stake, (Aug. 19, 2012).
TigerDirect.com Now Accepts Bitcoin Payments!, TigerDirect, http://www.tigerdirect.com/bitcoin/ (last visited Feb. 6, 2014).
U.S. Appl. No. 60/884,172, filed Jan. 9, 2007.
U.S. Appl. No. 61/225,256, filed Jul. 14, 2009.
USD Average Price History, BitcoinAverage, https://bitcoinaverage.com/charts.htm@USD-averages-all (last visited Feb. 24, 2014).
Using Offline Wallets in Armory, Armory (May 20, 2013) Internet Archive, http://web.archive.org/web/20130520100213/https://bitcoinarmory.com/using-offline-wallets-in-armory/.
Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).
Why Bitcoin Is Changing The World, Bitcoin.org (Jun. 20, 2013) Internet Archive, http://web.archive.org/web/20130620062218/http://bitcoin.org/en/innovation.
Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.
World Gold Council, How SPDR Gold Shares (2840 HK) are Created and Redeemed (Mar. 2013).
Bitcoin, A Primer for Policymakers(2013).
Bitcoin: A first assessment, FX and Rates | Global, Bank of America Merrill Lynch (Dec. 5, 2013).
Bitcoin: Questions, Answers, and Analysis of Legal Issues, Congressional Research Service (Dec. 20, 2013).
The audacity of bitcoin, Risks and opportunities for corporates and investors,Global Rates & FX Research, J.P. Morgan (Feb. 11, 2014), http://www.jpmorganmarkets.com/GlobalFXStrategy.
John Heggestuen, BITCOIN: How It Works, and How It Could Fundamentally Change How Companies and Individuals Handle Payments, BI Intelligence (Jan. 30, 2014).
Bitcoin: Intrinsic Value as Conduit for Disruptive Payment Network Technology, Wedbush, Computer Services: Financial Technology (Dec. 1, 2014).
Digitizing Trust: Leveraging the Bitcoin Protocol Beyond the "Coin", Wedbush, Computer Services: Financial Technology (Jan. 2, 2014).
Bitcoin: Watch the Innovation, Not the Price, Wedbush, Computer Services: Financial Technology (Feb. 14, 2014).
"How Bitcoin is Driving Digital Innovation in Entertainment, Mediaand Communications (EMC), PwC Consumer Intelligence Series, Digital Disruptor, (Jan. 27, 2014)."
Bitcoins and Banks: Problematic currency, interesting payment system, UBS, Global Research (Mar. 28, 2014).
François R. Velde, Bitcoin: A primer, The Federal Reserve Bank of Chicago, Chicago Fed Letter (Dec. 2013).
David Andolfatto, Bitcoin and Beyond: The Possibilities and Pitfalls of Virtual Currencies, Federal Reserve Bank of St. Louis, Dialogue With the Fed, Beyond Today's Financial Headlines (Mar. 31, 2014).
All About Bitcoin, Goldman Sachs, Global Macro Research, Top of Mind, Issue 21 (Mar. 11, 2014).
Julieta Duek and Demian Brener, Bitcoin: Understanding and Assessing potential Opportunities, Quasar Ventures, (Jan. 2014).
"Yacine Ghalim and Max Niederhofer, bitcoin: Primer, State of Play, Discussion, Courmayeur, Sunstone Capital (Jan. 24, 2014)."
Timing and Sizing the Era of Bitcoin, Wedbush, Computer Services: Financial Technology (May 27, 2014).
State of Bitcoin 2014, CoinDesk (Feb. 26, 2014).
Ronald A. Glantz, Pantera Primer, (Mar. 11, 2014).
Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).
Bitcoin Moves Closer to Regulation, Straffor Flobal Intelligence (Jan. 29, 2015), https://www.straffor.com/sample/analysis/bitcoin-moves-closer-regulation#axzz/ (last visited Jan. 30, 2015).

(56) References Cited

OTHER PUBLICATIONS

BLOCKTRAIL|Bitcoin Block Explorer, Blocktrail (Aug. 18, 2014), https://www.blocktrail.com/.

Jerry Bito and Andrea Castillo, BITCOIN A Primer for Policymakers, Mercatus Center, George Mason University (2013).

Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).

Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014).

"Coinsetter Launches Out of Beta, Platform Now a Full U.S.Bitcoin Exchange, Coinsetter blog (Jul. 24 2014), http://www.coinsetter.com/blog/2014/07/24/coinsetter-launches-beta-plafform-now-full-us-bitcoin-exchange/(last visited Jul. 24, 2014)."

Request for Administrative Ruling on the Application of FinCEN's Regulations to a Virtual Currency Trading Platform, United States Department of the Treasury, FinCEN, (Oct. 27, 2014).

Request for Administrative Ruling on the Application of FinCEN's Regulations to a Virtual Currency Payment System, United States Department of the Treasury, FinCEN, (Oct. 27, 2014).

Daniel Roberts, on Winklevoss Bitcoin index, it's open season for developers, FORTUNE, (Jul. 22, 2014).

Evan L. Greebel et al., Recent Key Bitcoin and Virtual Currency Regulatory and Law Enforcement Developments, Virtual Currency Advisory, Katten Muchin Rosenman LLP (Nov. 13, 2014).

BTC, Google Finance, https://www.google.com/finance?q=CURRENCY%3ABTC&ei=T-euU7jVFZOUwQPNkIHYCQ (last visited Jul. 11, 2014).

Sanjay Panikkar et al., ADEPT: An IoT Practitioner Perspective, IBM (2015).

Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html.

NYC Bitcoin Exchange Coinsetter Launches Out of Beta With Institutional and Consumer Trading, MarketWatch (published Jul. 24, 2014), http://www.marketwatch.com/story/nyc-bitcoin-exchange-coinsetter-launches-out-of-beta-with-institutional-and-consumer-trading-2014-07-24 (last visited Jul. 24, 2014).

Major Bitcoin Investment Firm Launches Bitindex, The Crypto Crimson, (published Jul. 10, 2014), http://cryptocrimson.com/2014/07/major-bitcoin-investment-tirm-launches-bitindex/ (last visited Jul. 11, 2014).

"We make it easy to build secure, high-level services on topof the Bitcoin protocol, Trusted Coin (Dec. 26, 2013) Internet Archive, https://web.archive.org/web/20131226232433lhttps://api.trustedcoin.com/f."

WINKBTCO Index, Bloomberg Finance L.P. (Jun. 16, 2014).

\* cited by examiner

| Transaction Ledger 115 | | | | | | |
|---|---|---|---|---|---|---|
| Transaction ID | Date | Fee | Origin Identifiers | Amount from Origin | Destination Identifiers | Destination Amount |
| f06db23bc69b7fc155f237 3aa6e41cdc1c75da6136b5 95c017b13d7b7c16552 | 2014-06-24 20:41:32 | 0 | 19Zmw5kMbKTjA7qRUdUiiwLqgRaMRRLDkh 19Zmw5kMbKTjA7qRUdUiiwLqgRaMRRLDkh | 500 500 | 1228NoyhmmuJtBG9mdEm3mhN4nb73c1UgRKt | 1000 |
| 9cd9cef3b96936c8c3a1b7c 1f6a0de17a3cfcf94c575b7 92638bef85c0b9de58 | 2014-06-24 20:41:32 | 0.0001 | 1EvwbspD9jYbH2ZSq6TFbPxftkM8ejSYqP | 45.9983 | 1PXdpLs2k3ETm9vcL4SRp3UHxHiiMMiZXb 1BS6XTQKH2uUS1GG965Rmcn8Yms6jhtkGC | 42.1724747 3.8257253 |
| 5f3f685576336e61e9ab20e b46155a97423cf7b3a3b7 414e7c672d41efd9c830 | 2014-06-24 20:41:32 | 0 | 1Su7FXhfiaW7EYWwfvZayA9duahXb835Rnv | 303.92706127 | 172CqV7KtgfNhGYWvVLc8gdDi6ByyRUqZ8G 12eqJZbQpRoYqa6BxGtWq8pBc5UpwZqCek | 154.77363532 149.15342595 |
| 535936b199bb3fcb-c8d15e e38bb735c69289dd360ea05 e27a19514bc4be828d69f | 2014-06-24 20:41:32 | 0.00005 | 1JW8RmhYjfsnTyv4W6ZGHpm9QhA2wVPvap | 18.0475292 | 18v92L9Sk3Wp3pgVDtrVTNC3fPaukXoLk 1GnhQNChqguuqgGAtVujjmqxPtk8P2y4Ev | 17.2974792 0.75 |
| 4616da18de8944f33da984 12a6fc8f70c5c0843637d7f b28b8ea99863f1b55ef | 2014-06-24 20:41:32 | 0.0001 | 1GD64WARGDiYG71WTTgCpRMpeP1BnmGjj | 5 | 1HjiqUAer7yjJNP&pPxSmhCoifGqW3NFA 1NRNrusa3D4sxxzig5fvwmX1thDnRGw3ZJ 1GD64WARGDiYG71WTTgCpRMpeP1BnmGjj | 3.45703582 0.01383369 1.52897749 |

FIG. 2

| | | | | |
|---|---|---|---|---|
| Welcome back john.doe@email.com! | | | | ✕ |
| Buy Bitcoin | Sell Bitcoin | History | Payment Methods | Limits and Verifications |

Buy Amount

[ 10 ]   at $645.67 USD each    You have 0.0 BTC remaining of your daily buy limit. View Limits.

| | |
|---|---|
| Subtotal | $6,456.70 |
| Coinbase fee | $64.57 |
| Bank fee | $0.15 |
| Total | $6,521.42 |

Enable ⚡ Instant Buy to get your coins in seconds instead of days.

To complete a purchase you'll need to:

[Verify A Bank Account] and [Verify A Phone Number]

You can also set up a recurring buy.

GENERAL
▲ Send/Request
▲ Buy/Sell
▲ Recurring Payments
▲ Account Settings

MERCHANT TOOLS
▲ Orders
▲ Subscribers
▲ Tools
▲ Merchant Settings

Complete your profile

FIG. 3

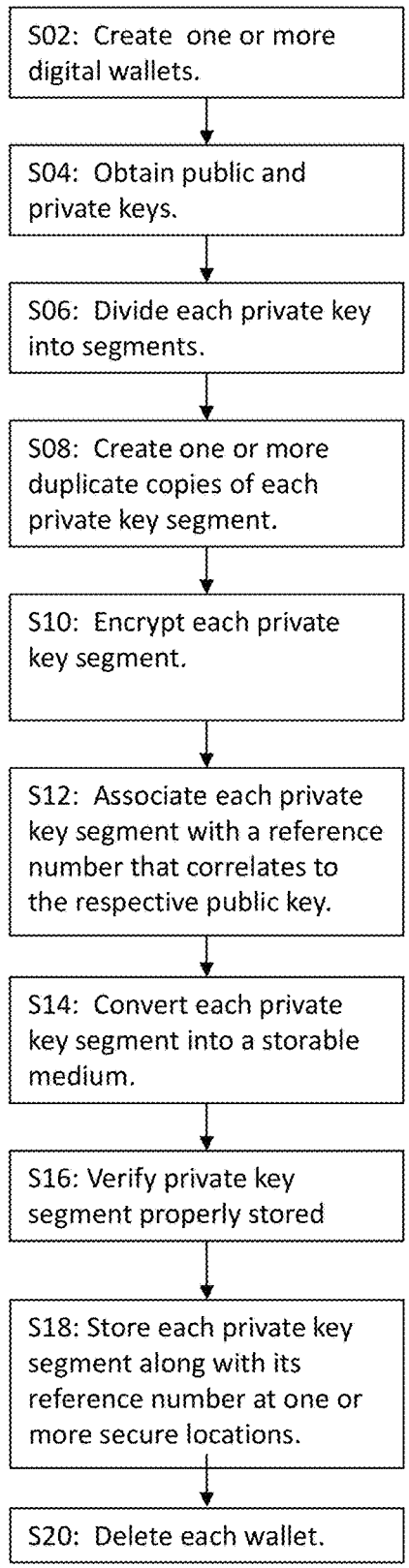
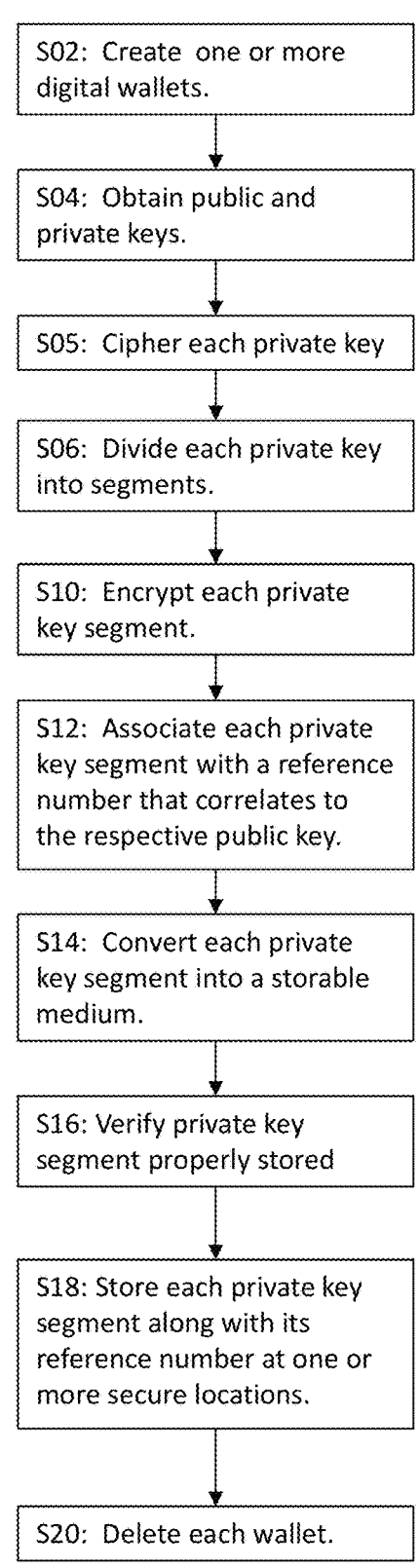
FIG. 5A                     FIG. 5B

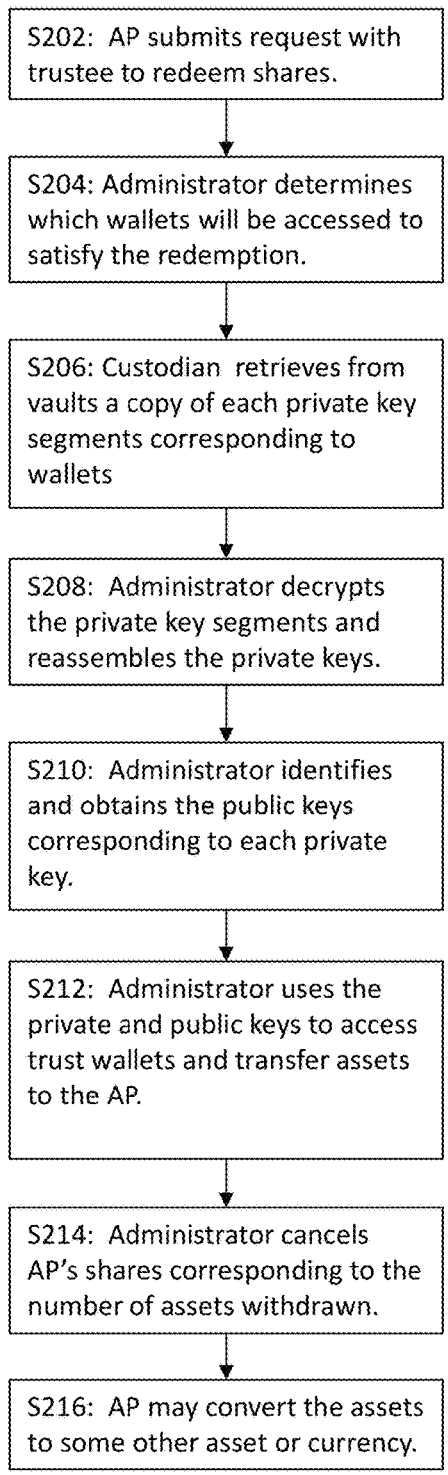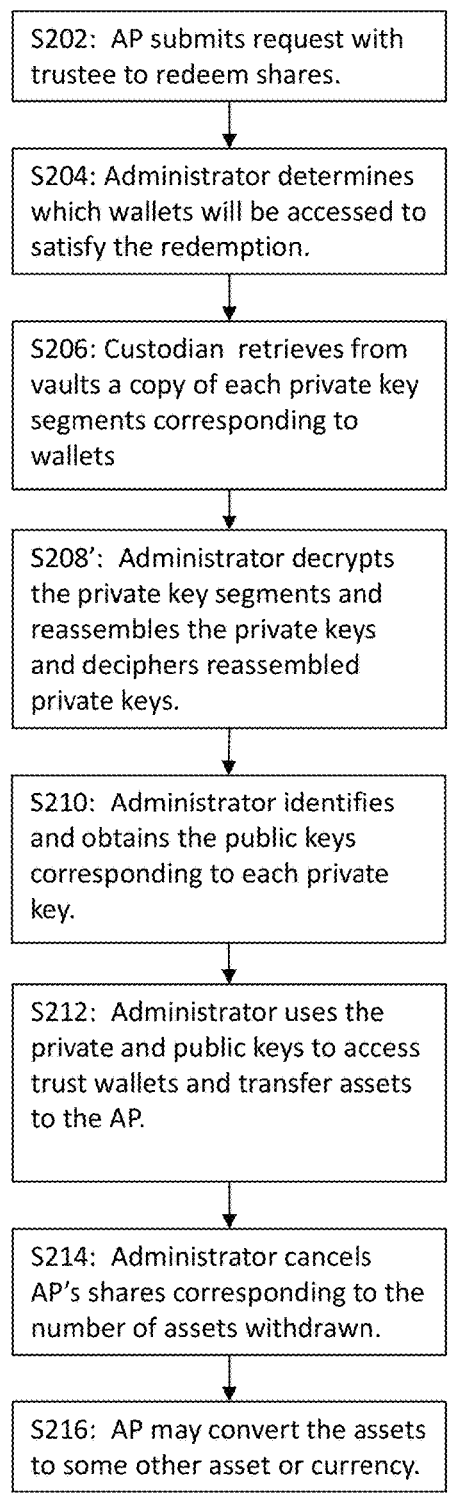
FIG. 19A
FIG. 19B

S2022: Determining, by a trust computer system comprising one or more computers, share price information based at least in part upon a first quantity of digital math-based assets held by a trust at a first point in time and a second quantity of shares in the trust at the first point in time.

S2024: Receiving, at the trust computer system from one or more authorized participant user devices of an authorized participant, an electronic request to redeem a third quantity of shares.

S2026: Determining, by the trust computer system, a fourth quantity of digital math-based assets based at least in part upon the share price information and the third quantity of shares.

S2028: Obtaining, by the trust computer system, one or more destination digital asset account identifiers corresponding to one or more destination digital asset accounts for receipt by the authorized participant of a transfer of the fourth quantity of digital math-based assets from the trust.

S2030: Obtaining, using the trust computer system, one or more origin digital asset account identifiers corresponding to one or more origin digital asset accounts for the transfer.

S2032: Initiating, using the trust computer system, the transfer of the fourth quantity of digital math-based assets from the one or more origin digital asset accounts to the one or more destination digital asset accounts.

S2034: Broadcasting, using the trust computer system, the transfer to a decentralized electronic ledger maintained by a plurality of physically remote computer systems.

S2036: Verifying, by the trust computer system using the decentralized electronic ledger, a receipt of the fourth quantity of digital math-based assets at the one or more destination digital asset accounts.

S2038: Canceling or causing to be canceled, using the trust computer system, the third quantity of shares from the authorized participant.

FIG. 19C

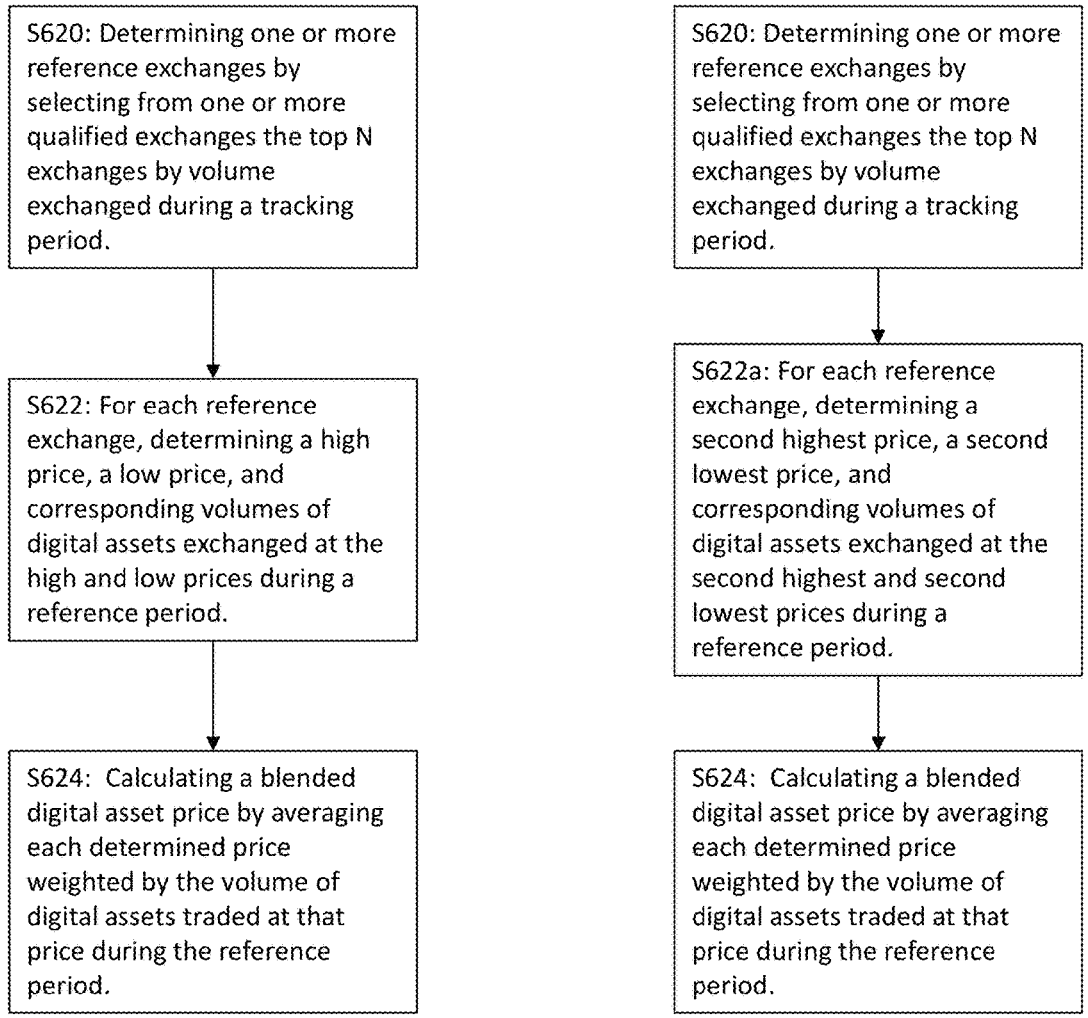

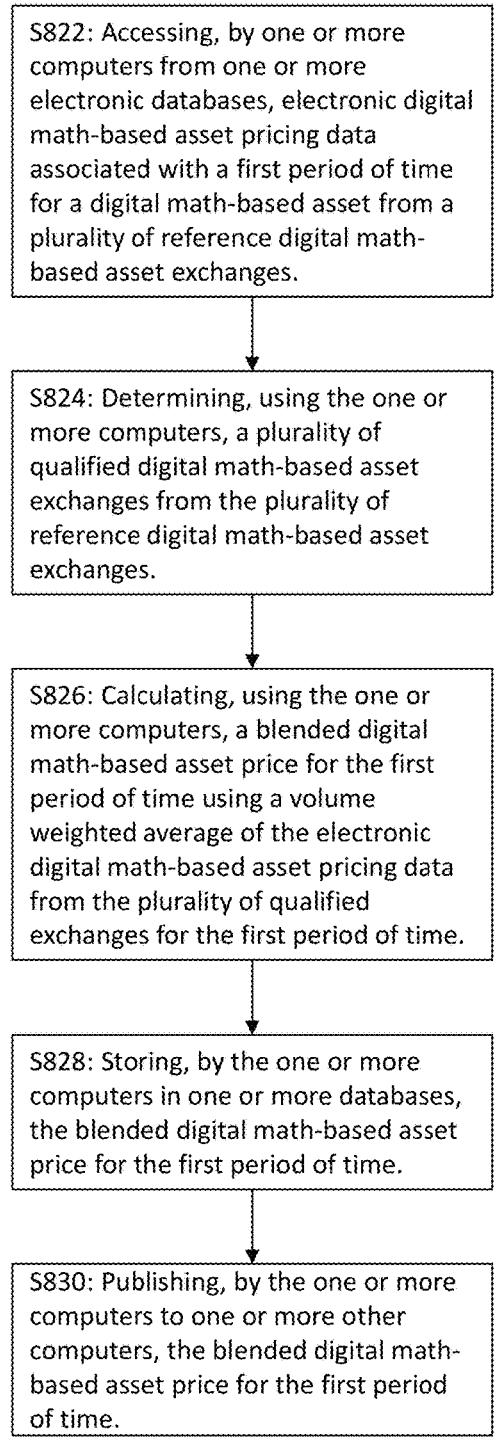
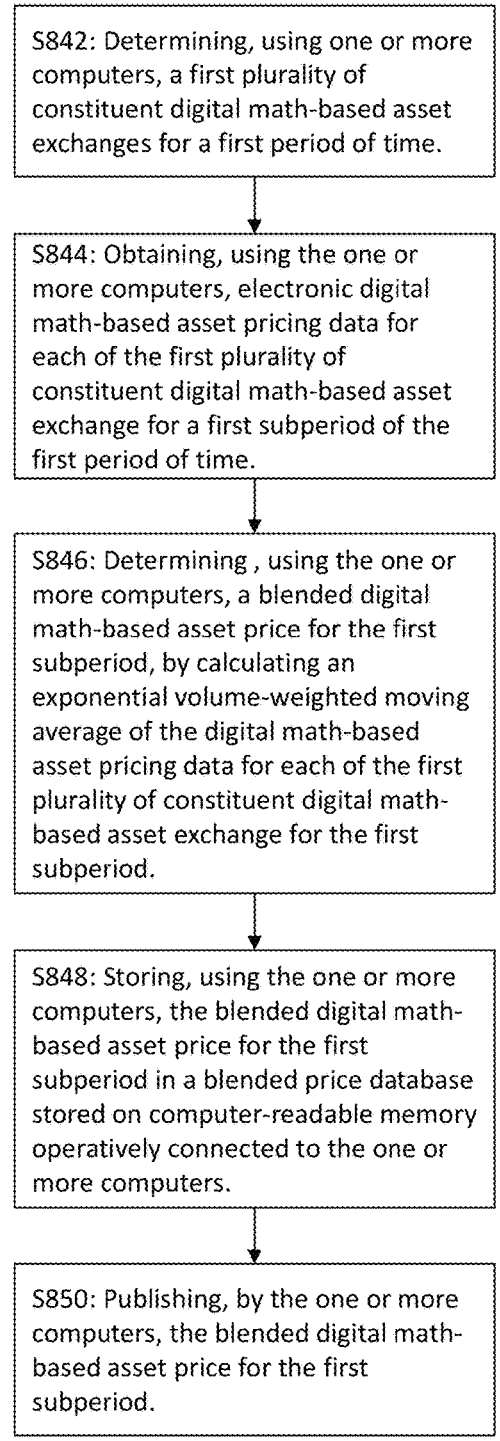
FIG. 25A
FIG. 25B

SYSTEMS AND METHODS FOR STORING DIGITAL MATH-BASED ASSETS USING A SECURE PORTAL

RELATED APPLICATIONS

This application is a continuation of U.S. patent application Ser. No. 14/320,900, filed on Jul. 1, 2014, which is a continuation-in-part of U.S. patent application Ser. No. 14/318,456, filed on Jun. 27, 2014, now U.S. Pat. No. 9,892,460, which in turn claims priority to and the benefit of each of U.S. Provisional Patent Application No. 61/989,047, filed on May 6, 2014, U.S. Provisional Patent Application No. 61/986,685, filed on Apr. 30, 2014, U.S. Provisional Patent Application No. 61/978,724, filed on Apr. 11, 2014, U.S. Provisional Patent Application No. 61/971,981, filed on Mar. 28, 2014, U.S. Provisional Patent Application No. 61/955,017, filed on Mar. 18, 2014, U.S. Provisional Patent Application No. 61/933,428, filed on Jan. 30, 2014, U.S. Provisional Patent Application No. 61/920,534, filed on Dec. 24, 2013, U.S. Provisional Patent Application No. 61/903,245, filed on Nov. 12, 2013, U.S. Provisional Patent Application No. 61/900,191, filed on Nov. 5, 2013, U.S. Provisional Patent Application No. 61/891,294, filed on Oct. 15, 2013, U.S. Provisional Patent Application No. 61/857,691, filed on Jul. 23, 2013, U.S. Provisional Patent Application No. 61/857,141, filed on Jul. 22, 2013, U.S. Provisional Patent Application No. 61/856,323, filed on Jul. 19, 2013, U.S. Provisional Patent Application No. 61/841,760, filed on Jul. 1, 2013, and U.S. Provisional Patent Application No. 61/841,177, filed on Jun. 28, 2013, the entire content of each of which is hereby incorporated by reference herein.

FIELD

In embodiments, the present invention generally relates to systems and methods for securely storing digital assets using a secure portal.

SUMMARY

Systems and methods for securely storing digital assets, including digital math-based assets, such as bitcoins, Namecoins, Litecoins, PPCoins, Tonal bitcoins, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Darkcoins, XC, MaidSafeCoins, Vertcoins, Qoras, Zetacoins, Megacoins, YbCoins, Novacoins, Moneros, Infinitecoins, MaxCoins, WorldCoins, Billioncoins, Anoncoins Colored Coins, or Counterparty, to name a few, are disclosed.

In embodiments, a computer-implemented method may comprise the steps of (i) generating, using a computer system comprising one or more computers, one or more digital asset accounts capable of holding one or more digital math-based assets; (ii) obtaining, using the computer system, one or more private keys corresponding to the one or more digital asset accounts; (iii) dividing, using the computer system, each of the one or more private keys into a plurality of private key segments; (iv) encrypting, using the computer system, each of the plurality of private key segments; (v) associating, using the computer system, each of the plurality of private key segments with a respective reference identifier; (vi) creating, using the computer system, one or more cards for each of the encrypted plurality of private key segments wherein each of the one or more cards has fixed thereon one of the encrypted plurality of private key segments along with the respective associated reference identifier; and (vii) tracking, using the computer system, storage of each of the one or more cards in one or more vaults.

In embodiments, the computer-implemented method may further comprise the steps of generating, using the computer system, electronic transfer instructions for an electronic transfer of the quantity of digital math-based assets to the one or more digital asset accounts; and broadcasting, using the computer system, the electronic transfer instructions to a decentralized electronic ledger maintained by a plurality of physically remote computer systems.

In embodiments, the computer system can include at least one isolated computer that is not directly connected to an external data network.

In embodiments, the encryption step (iv) above, may further comprise implementing, using the computer system, a symmetric-key and/or asymmetric-key encryption algorithm.

In embodiments, the one or more cards may be plastic, a paper product, papyrus, index cards, sheets of paper, metal, and/or laminated.

In embodiments, each of the encrypted plurality of private key segments along with the respective associated reference identifier may be fixed on the one or more cards via printing, etching, or engraving. In embodiments, each of the encrypted plurality of private key segments may be fixed on the one or more cards as a scannable code. In embodiments, the scannable code may be a bar code and/or a QR code. In embodiments, each of the encrypted plurality of private key segments may be fixed on the one or more cards via a magnetic encoding.

In embodiments, the one or more vaults may be geographically remote from each other. In embodiments, the one or more vaults may include a bank vault and/or a precious metal vault. In embodiments, the one or more vaults may comprise a main set of vaults and one or more sets of backup vaults. In embodiments, the main set of vaults may be located in a geographically proximate area and at least one of the one or more sets of backup vaults are located in a geographically remote area. In embodiments, the geographically proximate area may be a metropolitan area of a first city.

In embodiments, each of the plurality of private key segments corresponding to a first private key may be stored in separate vaults.

In embodiments, the computer-implemented method may further comprise the steps of receiving, at the computer system, a quantity of digital math-based assets; and storing, using the computer system, the quantity of digital math-based assets in the one or more digital asset accounts.

In embodiments, a computer-implemented method may comprise the steps of (i) generating, using a computer system comprising one or more computers, one or more digital asset accounts capable of holding one or more digital math-based assets; (ii) obtaining, using the computer system, a first plurality of private keys corresponding to each of the one or more digital asset accounts; (iii) dividing, using the computer system, a first private key of the first plurality of private keys into a second plurality of first private key segments; (iv) encrypting, using the computer system, each of the second plurality of first private key segments; (v) associating, using the computer system, each of the second plurality of first private key segments and a second private key with a respective reference identifier; (vi) creating, using the computer system, one or more cards for each of the encrypted second plurality of first private key segments wherein each of the one or more cards has fixed thereon one of the encrypted second plurality of first private key segments along with the respective associated reference identifier; and (vii) tracking, using the computer system, storage of each of the one or more cards in one or more vaults and storage of the second private key.

In embodiments, the computer-implemented method may further comprise the step of encrypting, using the computer system, the second private key.

In embodiments, the computer-implemented method may further comprise the step of electronically storing the second private key on a computer-readable substrate.

In embodiments, the computer-implemented method may further comprise the steps of generating, using a computer system comprising one or more computers, one or more digital asset accounts capable of holding one or more digital math-based assets; obtaining, using the computer system, one or more private keys corresponding to the one or more digital asset accounts; encrypting, using the computer system, each of the one or more private keys; dividing, using the computer system, each of the one or more encrypted private keys into a plurality of private key segments; associating, using the computer system, each of the plurality of private key segments with a respective reference identifier; creating, using the computer system, one or more cards for each of the plurality of private key segments wherein each of the one or more cards has fixed thereon one of the plurality of private key segments along with the respective associated reference identifier; and tracking, using the computer system, storage of each of the one or more cards in one or more vaults.

In embodiments, the one or more digital asset accounts may comprise multi-signature digital asset accounts.

In embodiments, a computer-implemented method may comprise the steps of (i) determining, using a computer system comprising one or more computers, one or more digital asset account identifiers corresponding to one or more digital asset accounts capable of holding one or more digital math-based assets; (ii) accessing, using the computer system, key storage information associated with each of the one or more digital asset account identifiers; (iii) determining, using the computer system, based upon the key storage information, storage locations corresponding to each of a plurality of private key segments corresponding to each of the one or more digital asset accounts; (iv) issuing or causing to be issued, retrieval instructions for retrieving each of the plurality of private key segments; (v) receiving, at the computer system, each of the plurality of private key segments; (vi) decrypting, using the computer system, each of the plurality of private key segments; (vii) assembling, using the computer system, each of the plurality of private key segments into one or more private keys.

In embodiments, the computer-implemented method may further comprise the step of accessing, using the computer system, the one or more digital asset accounts associated with the one or more private keys.

In embodiments, the computer-implemented method may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

In embodiments, the key storage information may comprise a reference identifier associated with one or more stored private key segments.

In embodiments, a system may comprise (i) one or more networked computers comprising one or more processors and computer-readable memory; (ii) one or more isolated computers comprising one or more processors and computer-readable memory and configured to generate digital asset accounts and generate transaction instructions for digital math-based asset transactions; (iii) a writing device configured to write digital asset account keys; and (iv) a reading device configured to read digital asset account keys.

In embodiments, the system may further comprise an accounting computer comprising one or more processors and computer-readable memory and configured to track digital math-based asset transactions involving one or more specified digital asset accounts.

In embodiments, the one or more isolated computers, the writing device, and the reading device may be located within an electronic isolation chamber, such as a Faraday cage.

In embodiments, the isolated computer may not be physically connected to an external data network.

In embodiments, the writing device may be a printer and/or an engraver.

In embodiments, the reading device may be a disk drive, an electronic card reader. a QR reader, and/or a scanner. In embodiments, the scanner may be a bar code scanner.

In embodiments, the writing and/or device may be operationally connected to the one or more isolated computers.

In embodiments, a method for securely storing digital math-based assets using a secure portal can comprise (i) providing an electronic isolation chamber containing one or more writing devices, one or more reading devices, and an isolated computer operatively connected to the one or more writing devices but not directly connected to an external data network and comprising one or more processors and computer-readable memory; (ii) generating, using the isolated computer, a first plurality of digital asset accounts capable of holding one or more digital math-based assets; (iii) obtaining, using the isolated computer, one or more private keys and a digital asset account identifier corresponding to each of the first plurality of digital asset accounts; (iv) associating, using the isolated computer, each of the one or more digital asset accounts with a respective reference identifier; (v) dividing, using the isolated computer, at least one of the one or more private keys corresponding to each of the first plurality of digital asset accounts into a second plurality of private key segments, wherein each private key segment is required to regenerate the respective private key; (vi) transmitting, from the isolated computer to the one or more writing devices, electronic writing instructions for writing each of the second plurality of private key segments and the respective reference identifier on a respective card to generate a third plurality of collated sets of cards wherein each of the collated sets of cards comprises cards corresponding to different private keys and wherein the third plurality of collated sets includes one or more duplicate sets for each of the collated sets of cards; (vii) writing, using the one or more writing devices, each respective private key segment of the second plurality of private key segments and the respective reference identifier on a respective card according to the electronic writing instructions; (viii) writing, using the isolated computer, each of the digital asset account identifiers along with the corresponding reference identifier; and (xi)

reading, using the one or more reading devices, each of the cards to ensure readability. In embodiments, step (viii) may be performed after step (xi). In embodiments, step (viii) may be performed before step (xi).

In embodiments, the step of writing, using the isolated computer, each of the digital asset account identifiers along with the corresponding reference identifier can further comprise the steps of transmitting, from the isolated computer to the one or more writing devices, second electronic writing instructions for writing each of the digital asset account identifiers along with the corresponding reference identifier, and writing, using the one or more writing devices, each of the digital asset account identifiers along with the corresponding reference identifier according to the second writing instructions. In embodiments, writing according to the second writing instructions can comprise writing to an electronic storage medium, such as a flash drive, hard drive, and/or disc. In embodiments, writing according to the second writing instructions can comprise writing to a physical storage medium, such as paper.

In embodiments, the method can further comprise the step of writing, using the isolated computer, the respective digital asset account identifiers to a removable electronic storage medium.

In embodiments, the method can further comprise the step of destroying the isolated computer, the one or more writing devices, and the one or more reading devices, or destroying any one of those devices.

In embodiments, the step of writing each respective private key segment of the second plurality of private key segments and the respective reference identifier on a respective card according to the electronic writing instructions can comprise printing each respective private key segment of the plurality of private key segments and the respective reference identifier on respective separate cards.

In embodiments, the step of writing each respective private key segment of the second plurality of private key segments and the respective reference identifier on a respective card according to the electronic writing instructions can comprise etching each respective private key segment of the plurality of private key segments and the respective reference identifier on respective separate cards.

In embodiments, the step of writing each respective private key segment of the second plurality of private key segments and the respective reference identifier on a respective card according to the electronic writing instructions can comprise magnetically encoding each respective private key segment of the plurality of private key segments on respective separate cards. In embodiments, the respective reference identifiers may be printed on the respective cards.

In embodiments, the step of writing each respective private key segment of the second plurality of private key segments and the respective reference identifier on a respective card according to the electronic writing instructions can comprise writing each respective private key segment of the second plurality of private key segments as a scannable code, such as a bar code and/or a QR code.

In embodiments, the method can further comprise the step of encrypting, using the isolated computer, each of the second plurality of private key segments. In embodiments, encryption techniques can include symmetric-key encryption, asymmetric-key encryption, scrambling, substitution, hashing, or adding characters.

In embodiments, the method can further comprise the step of tracking, using the isolated computer, storage of each of the third plurality of collated sets of cards. In embodiments, each of the third plurality of collated sets of cards may be stored in a vault. In embodiments, each collated set of cards may be stored in a separate vault.

In embodiments, a secure system for storing digital math-based assets may comprise (a) an electronic isolation chamber; (b) one or more isolated computers within the electronic isolation chamber and comprising one or more processors and computer-readable memory operatively connected to then one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier; (c) the one or more writing devices located within the electronic isolation chamber and configured to perform the electronic writing instructions, including collating the plurality of cards into the plurality of sets; and (d) one or more reading devices located within the electronic isolation chamber and configured to read the plurality of private key segments along with the respective associated reference identifier from the one or more cards.

In embodiments, a computer-implemented method may comprise the steps of (i) receiving, at a computer system comprising one or more computers, an electronic request to transfer first respective quantities of digital math-based assets from each of a first plurality of digital asset accounts; (ii) accessing, using the computer system, each of the first plurality of digital asset accounts; (iii) generating, using the computer system, transaction instructions comprising one or more transfers of the first respective quantities from each of the first plurality of digital asset accounts; and (iv) broadcasting, using the computer system, the transaction instructions to a decentralized electronic ledger maintained by a plurality of physically remote computer systems.

In embodiments, the first respective quantities of digital math-based assets can comprise different quantities for different digital asset accounts.

In embodiments, the security systems and methods described herein may be used, e.g., as security protocols, associated with various financial products, such as a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product.

BRIEF DESCRIPTION OF THE DRAWINGS

Exemplary embodiments of the present invention will be described with references to the accompanying figures, wherein:

FIG. 2 is an exemplary screen shot of an excerpt of an exemplary bitcoin transaction log showing addresses in accordance with exemplary embodiments of the present invention;

FIG. 3 is an exemplary exchange agent interface in accordance with exemplary embodiments of the present invention;

FIGS. 5A and 5B are flow charts of exemplary processes for creating and securing digital wallets in accordance with exemplary embodiments of the present invention;

FIGS. 19A and 19B are flow charts of processes for redeeming shares in the trust in accordance with exemplary embodiments of the present invention;

FIG. 19C is a flow chart of an exemplary process for redemption of shares in an exchange traded product holding digital math-based assets in accordance with exemplary embodiments of the present invention;

FIGS. 23A-23H are flow charts showing methods for calculating a blended digital asset price in accordance with exemplary embodiments of the present invention;

FIGS. 25A and 25B are flow charts of a method for creating an index of digital asset prices in accordance with exemplary embodiments of the present invention.

DETAILED DESCRIPTION

Figure 1:
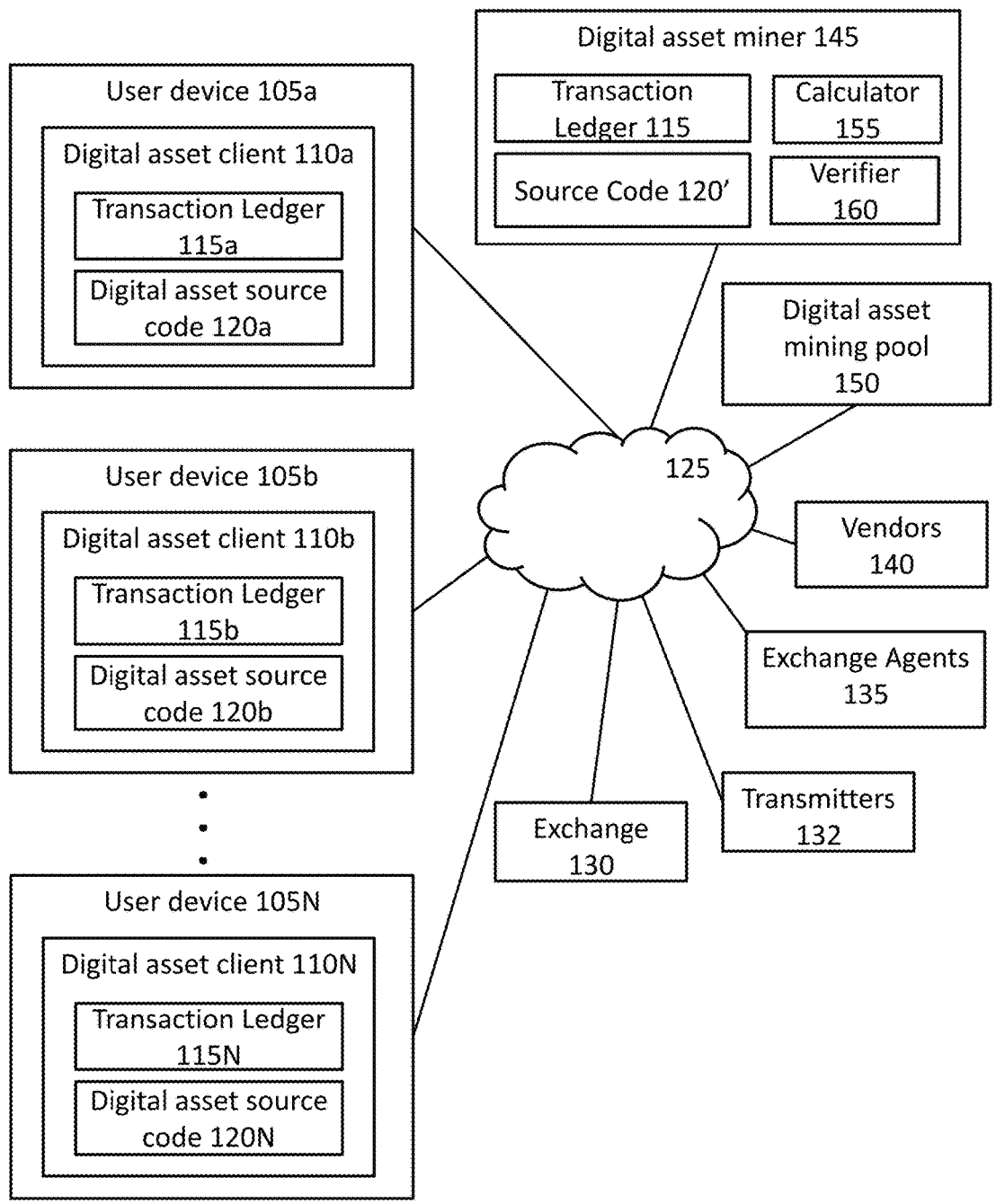
FIG. 1 is a schematic diagram of a digital asset network in accordance with exemplary embodiments of the present invention.

In embodiments, the present invention generally relates to systems, methods, and program products for use with ETPs holding digital assets, including digital math-based assets, such as bitcoins, Namecoins, Litecoins, PPCoins, Tonal bitcoins, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Darkcoins, XC, MaidSafeCoins, Vertcoins, Qoras, Zetacoins, Megacoins, YbCoins, Novacoins, Moneros, Infinitecoins, MaxCoins, WorldCoins, Billioncoins, Anoncoins Colored Coins, or Counterparty, to name a few. For purposes of discussion, without limiting the scope of the invention, embodiments involving bitcoins may be discussed to illustrate the present invention. The disclosure can encompass other forms of digital assets, digital math-based assets, peer-to-peer electronic cash system, digital currency, synthetic currency, or digital crypto-currency.

In embodiments, the present invention may be used in connection with other products or services related to ETPs, which can include digital asset price calculators, digital asset indices, digital asset account monitoring systems, correlation of news events to digital asset prices, exchanges for converting from, to, or between digital assets, such as digital math-based assets, automated notification, transaction, and/or arbitrage systems involving digital assets, including digital math-based assets, kiosk systems for transacting or interacting with digital math-based assets, digital asset insurance systems, digital asset secure storage systems, and/or other financial products based on the same.

Digital Math-Based Assets and Bitcoins

A digital math-based asset is a kind of digital asset based upon a computer generated mathematical and/or cryptographic protocol that may, among other things, be exchanged for value and/or be used to buy and sell goods or pay for services. A digital math-based asset may be a non-tangible asset that is not based upon a governmental rule, law, regulation, and/or backing. The Bitcoin system represents one form of digital math-based asset. A bitcoin may be a unit of the Bitcoin digital math-based asset. Other examples of digital math-based assets include Namecoins, Litecoins, PPCoins, Tonal bitcoins, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Darkcoins, XC, MaidSafeCoins, Vertcoins, Qoras, Zetacoins, Megacoins, YbCoins, Novacoins, Moneros, Infinitecoins, MaxCoins, WorldCoins, Billioncoins, Anoncoins Colored Coins, and Counterparty, to name a few. In embodiments, digital math-based assets, such as bitcoins, may be accepted in trade by merchants, other businesses, and/or individuals in many parts of the world.

In embodiments, a digital math-based asset may be based on an open source mathematical and/or cryptographic protocol, which may exist on a digital asset network, such as a Bitcoin network. The network may be centralized, e.g., run by one or more central servers, or decentralized, e.g., run through a peer-to-peer network. Digital math-based assets may be maintained, tracked, and/or administered by the network.

A digital math-based asset system may use a decentralized electronic ledger system, which may be maintained by a plurality of physically remote computer systems. Such a ledger may be a public transaction, which may track asset ownership and/or transactions in a digital math-based asset system. The ledger may be a decentralized public transaction ledger, which can be distributed to users in the network, e.g., via a peer-to-peer sharing. Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without identifying the assets themselves.

In embodiments, a digital asset ledger, such as the Bitcoin blockchain, can be used to achieve consensus and to solve double-spending problems where users attempt to spend the same digital assets in more than one transaction. In embodiments, before a transaction may be cleared, the transaction participants may need to wait for some period of time, e.g., a six-confirmation wait (typically one hour in the context of the Bitcoin network, 15 minutes in the context of the Litecoin network, to name a few), before feeling confident that the transaction is valid, e.g., not a double count. Each update to the decentralized electronic ledger (e.g., each addition of a block to the Bitcoin blockchain) following execution of a transaction may provide a transaction confirmation. After a plurality of updates to the ledger, e.g., 6 updates, the transaction may be confirmed with certainty or high certainty.

In embodiments, a blockchain can be a public transaction ledger of the digital math-based asset network, such as the Bitcoin network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of math-based assets) and/or a payment of transaction fees (e.g., a fixed amount or set percentage of the transaction) from users whose transactions are recorded in the block being added.

The digital asset network (e.g., Bitcoin network) may timestamp transactions by including them in blocks that form an ongoing chain called a blockchain. In embodiments, the addition of a block may occur periodically, e.g., approximately every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power will become the accepted blockchain for the network. In embodiments, confirmation of a transaction may be attained with a high degree of accuracy following the addition of six blocks to the blockchain after a transaction was performed. As long as a majority of computing power is controlled by nodes that are not cooperating to attack the network, they will generate the longest blockchain of records and outpace attackers.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally-signed transactions that began with its creation as a block reward through bitcoin mining. Each owner transfers bitcoins to the next by digitally signing them over to the next owner in a bitcoin transaction. A payee can then verify each previous transaction, e.g., by analyzing the blockchain, to verify the chain of ownership.

FIG. 2 is an exemplary screen shot of an excerpt of a bitcoin transaction log or transaction ledger 115 showing digital asset account identifiers (e.g., addresses) corresponding to origin and destination accounts for each transaction and amount information for each transaction. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g. "rent payment") and/or balance information. Other forms of transaction logs can be used consistent with the present invention.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. A digital math-based asset network, such as a Bitcoin network, may be an online, end-user to end-user network hosting a public transaction ledger 115 and governed by source code 120 comprising cryptologic and/or algorithmic protocols. A digital asset network can comprise a plurality of end users, a . . . N, each of which may access the network using one or more corresponding user device 105a, 105b, . . . 105N. In embodiments, user devices 105 may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, each user device 105 can run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction ledger 115a (contained on a user device 105a) should correspond with the electronic transaction ledgers 115b . . . 115N (contained on user devices 105b . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few.

In addition, a digital asset network, such as a Bitcoin network, may include one or more digital asset exchange 130, such as Bitcoin exchanges (e.g., BitFinex, BTC-e). Digital asset exchanges may enable or otherwise facilitate the transfer of digital assets, such as bitcoins, and/or conversions involving digital assets, such as between different digital assets and/or between a digital asset and non-digital assets, currencies, to name a few. The digital asset network may also include one or more digital asset exchange agents 135, e.g., a Bitcoin exchange agent. Exchange agents 135 may facilitate and/or accelerate the services provided by the exchanges. Exchanges 130, transmitters 132, and/or exchange agents 135 may interface with financial institutions (e.g., banks) and/or digital asset users. Transmitters 132 can include, e.g., money service businesses, which could be licensed in appropriate geographic locations to handle financial transactions. In embodiments, transmitters 132 may be part of and/or associated with a digital asset exchange 130. Like the user devices 105, digital asset exchanges 130, transmitters 132, and exchange agents 135 may be connected to the data network 125 through wired, wireless, or other connections. They may be connected directly and/or indirectly to each other and/or to one or more user device 105 or other entity participating in the digital asset system.

Digital assets may be sub-divided into smaller units or bundled into blocks or baskets. For example, for bitcoins, subunits, such as a Satoshi, as discussed herein, or larger units, such as blocks of bitcoins, may be used in exemplary embodiments. Each digital asset, e.g., bitcoin, may be subdivided, such as down to eight decimal places, forming 100 million smaller units. For at least bitcoins, such a smaller unit may be called a Satoshi. Other forms of division can be made consistent with embodiments of the present invention.

In embodiments, the creation and transfer of digital math-based assets can be based on an open source mathematical and/or cryptographic protocol, which may not be managed by any central authority. Digital assets can be transferred between one or more users or between digital asset accounts and/or storage devices (e.g., digital wallets) associated with a single user, through a network, such as the Internet, via a computer, smartphone, or other electronic device without an intermediate financial institution. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account.

In embodiments, a digital math-based asset system may produce digital asset transaction change. Transaction change refers to leftover digital asset amounts from transactions in digital asset systems, such as Bitcoin, where the transactions are comprised of one or more digital inputs and outputs. A digital asset account can store and/or track unspent transaction outputs, which it can use as digital inputs for future transactions. In embodiments, a wallet, third-party system, and/or digital asset network may store an electronic log of digital outputs to track the outputs associated with the assets contained in each account. In digital asset systems such as Bitcoin, digital inputs and outputs cannot be subdivided. For example, if a first digital asset account is initially empty and receives a transaction output of 20 BTC (a bitcoin unit) from a second digital asset account, the first account then stores that 20 BTC output for future use as a transaction input. To send 15 BTC, the first account must use the entire 20 BTC as an input, 15 BTC of which will be a spent output that is sent to the desired destination and 5 BTC of which will be an unspent output, which is transaction change that returns to the first account. An account with digital assets stored as multiple digital outputs can select any combination of those outputs for use as digital inputs in a spending transaction. In embodiments, a digital wallet may programmatically select outputs to use as inputs for a given transaction to minimize transaction change, such as by combining outputs that produce an amount closest to the required transaction amount and at least equal to the transaction amount.

Referring again to FIG. 1, a digital asset network may include digital asset miners 145. Digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., bitcoin transactions, can be performed by one or more computers over a distributed network, such as digital asset miners 145, e.g., bitcoin miners, and/or digital asset mining pools 150, e.g., bitcoin mining pools. In embodiments, mining pools 150 may comprise one or more miners 145, which miners 145 may work together toward a common goal. Miners 145 may have source code 120', which may govern the activities of the miners 145. In embodiments, source code 120' may be the same source code as found on user devices 105. These computers and/or servers can communicate over a network, such as an internet-based network, and can confirm transactions by adding them to a ledger 115, which can be updated and archived periodically using peer-to-peer file sharing technology. For example, a new ledger block could be distributed on a periodic basis, such as approximately every 10 minutes. In embodiments, the ledger may be a blockchain. Each successive block may record transactions that have occurred on the digital asset network. In embodiments, all digital asset transactions may be recorded as individual blocks in the blockchain. Each block may contain the details of some or all of the most recent transactions that are not memorialized in prior blocks. Blocks may also contain a record of the award of digital assets, e.g., bitcoins, to the miner 145 or mining pool 150 who added the new block, e.g., by solving calculations first.

A miner 145 may have a calculator 155, which may solve equations and/or add blocks to the blockchain. The calculator 155 may be one or more computing devices, software, or special-purpose device, to name a few. In embodiments, in order to add blocks to the blockchain, a miner 145 may be required to map an input data set (e.g., the blockchain, plus a block of the most recent transactions on the digital asset network, e.g., transactions on the Bitcoin network, and an arbitrary number, such as a nonce) to a desired output data set of predetermined length, such as a hash value. In embodiments, mapping may be required to use one or more particular cryptographic algorithms, such as the SHA-256 cryptographic hash algorithm or scrypt, to name a few. In embodiments, to solve or calculate a block, a miner 145 may be required to repeat this computation with a different nonce until the miner 145 generates a SHA-256 hash of a block's header that has a value less than or equal to a current target set by the digital asset network. In embodiments, each unique block may only be solved and added to the blockchain by one miner 145. In such an embodiment, all individual miners 145 and mining pools 150 on the digital asset network may be engaged in a competitive process and may seek to increase their computing power to improve their likelihood of solving for new blocks. In embodiments, successful digital asset miners 145 or mining pools 150 may receive an incentive, such as, e.g., a fixed number of digital assets (e.g., bitcoins) and/or a transaction fee for performing the calculation first and correctly and/or in a verifiable manner.

In embodiments, the cryptographic hash function that a miner 145 uses may be one-way only and thus may be, in effect, irreversible. In embodiments, hash values may be easy to generate from input data, such as valid recent network transaction(s), blockchain, and/or nonce, but neither a miner 145 nor other participant may be able to determine the original input data solely from the hash value. Other digital asset networks may use different proof of work algorithms, such as a sequential hard memory function, like scrypt, which may be used for Litecoin. As a result, generating a new valid block with a header less than the target prescribed by the digital asset network may be initially difficult for a miner 145, yet other miners 145 can easily confirm a proposed block by running the hash function at least once with a proposed nonce and other identified input data. In embodiments, a miner's proposed block may be added to the blockchain once a defined percentage or number of nodes (e.g., a majority of the nodes) on the digital asset network confirms the miner's work. A miner 145 may have a verifier 160, which may confirm other miners' work. A verifier 160 may be one or more computers, software, or specialized device, to name a few. A miner 145 that solved such a block may receive the reward of a fixed number of digital assets and/or any transaction fees paid by transferors whose transactions are recorded in the block. "Hashing" may be viewed as a mathematical lottery where miners that have devices with greater processing power (and thus the ability to make more hash calculations per second) are more likely to be successful miners 145. In embodiments, as more miners 145 join a digital asset network and as processing power increases, the digital asset network may adjust the complexity of the block-solving equation to ensure that one newly-created block is added to the blockchain approximately every ten minutes. Digital asset networks may use different processing times, e.g., approximately 2.5 minutes for Litecoin, approximately 10 minutes for Bitcoin, to name a few.

In addition to archiving transactions, a new addition to a ledger can create or reflect creation of one or more newly minted digital assets, such as bitcoins. In embodiments, new digital math-based assets may be created through a mining process, as described herein. In embodiments, the number of new digital assets created can be limited. For example, in embodiments, the number of digital assets (e.g., bitcoins) minted each year is halved every four years until a specified year, e.g., 2140, when this number will round down to zero. At that time no more digital assets will be added into circulation. In the exemplary embodiment of bitcoins, the total number of digital assets will have reached a maximum of 21 million assets in denomination of bitcoins. Other algorithms for limiting the total number of units of a digital math-based asset can be used consistent with exemplary embodiments of the present invention. For example, the Litecoin network is anticipated to produce 84 million Litecoins. In embodiments, the number of digital assets may not be capped and thus may be unlimited. In embodiments, a specified number of coins may be added into circulation each year, e.g., so as to create a 1% inflation rate.

In embodiments, the mining of digital assets may entail solving one or more mathematical calculations. In embodiments, the complexity of the mathematical calculations may increase over time and/or may increase as computer processing power increases. In embodiments, result of solving the calculations may be the addition of a block to a blockchain, which may be a transaction ledger, as described further below. Solving the calculations may verify a set of transactions that has taken place. Solving the calculations may entail a reward, e.g., a number of digital math-based assets and/or transaction fees from one or more of the verified transactions.

Different approaches are possible for confirming transactions and/or creating new assets. In embodiments, a digital asset network may employ a proof of work system. A proof of work system may require some type of work, such as the solving of calculations, from one or more participants (e.g., miners 145) on the network to verify transactions and/or create new assets. In embodiments, a miner 145 can verify as many transactions as computationally possible. A proof of work system may be computationally and/or energy intensive. In embodiments, the network may limit the transactions that a miner 145 may verify.

In embodiments, a digital asset network may employ a proof of stake system. In a proof of stake system, asset ownership may be tied to transaction verification and/or asset creation. Asset ownership can include an amount of assets owned and/or a duration of ownership. The duration of ownership may be measured linearly as time passes while a user owns an asset. In an exemplary embodiment, a user holding 4% of all digital assets in a proof of stake system can generate 4% of all blocks for the transaction ledger. A proof of stake system may not require the solution of complex calculations. A proof of stake system may be less energy intensive than a proof of work system. In embodiments, a hybrid of proof of work and proof of stake systems may be employed. For example, a proof of work system may be employed initially, but as the system becomes too energy intensive, it may transition to a proof of stake system.

In embodiments, asset creation and/or transaction confirmation can be governed by a proof of stake velocity system.

Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets unspendable, such as by sending them to an address from which they cannot be spent. Destroying or rendering assets unusable can be an expensive task within the digital math-based asset system, yet it may not have external costs such as the energy costs that can be associated with mining in a proof of work system.

Digital Asset Accounts and Transaction Security

Digital assets may be associated with a digital asset account, which may be identified by a digital asset address. A digital asset account can comprise at least one public key and at least one private key, e.g., based on a cryptographic protocol associated with the particular digital asset system, as discussed herein. One or more digital asset accounts may be accessed and/or stored using a digital wallet, and the accounts may be accessed through the wallet using the keys corresponding to the account.

Public Keys

A digital asset account identifier and/or a digital wallet identifier may comprise a public key and/or a public address. Such a digital asset account identifier may be used to identify an account in transactions, e.g., by listing the digital asset account identifier on a decentralized electronic ledger (e.g., in association with one or more digital asset transactions), by specifying the digital asset account identifier as an origin account identifier, and/or by specifying the digital asset account identifier as a destination account identifier, to name a few. The systems and methods described herein involving public keys and/or public addresses are not intended to exclude one or the other and are instead intended generally to refer to digital asset account identifiers, as may be used for other digital math-based asset. A public key may be a key (e.g., a sequence, such as a binary sequence or an alphanumeric sequence) that can be publicly revealed while maintaining security, as the public key alone cannot decrypt or access a corresponding account. A public address may be a version of a public key. In embodiments, a public key may be generated from a private key, e.g., using a cryptographic protocol, such as the Elliptic Curve Digital Signature Algorithm ("ECDSA").

In exemplary embodiments using bitcoins, a public key may be a 512-bit key, which may be converted to a 160-bit key using a hash, such as the SHA-256 and/or RIPEMD-160 hash algorithms. The 160-bit key may be encoded from binary to text, e.g., using Base58 encoding, to produce a public address comprising non-binary text (e.g., an alphanumeric sequence). Accordingly, in embodiments, a public address may comprise a version (e.g., a shortened yet not truncated version) of a public key, which may be derived from the public key via hashing or other encoding. In embodiments, a public address for a digital wallet may comprise human-readable strings of numbers and letters around 34 characters in length, beginning with the digit 1 or 3, as in the example of 175tWpb8K1S7NmH4Zx6rew F9WQrcZv245W. The matching private key may be stored in a digital wallet or mobile device and protected by a password or other techniques and/or devices for providing authentication.

In other digital asset networks, other nomenclature mechanisms may be used, such as a human-readable string of numbers and letters around 34 characters in length, beginning with the letter L for Litecoins or M or N for Namecoins or around 44 characters in length, beginning with the letter P for PPCoins, to name a few.

Private Keys

A private key in the context of a digital math-based asset, such as bitcoins, may be a sequence such as a number that allows the digital math-based asset, e.g., bitcoins, to be transferred or spent. In embodiments, a private key may be kept secret to help protect against unauthorized transactions. In a digital asset system, a private key may correspond to a digital asset account, which may also have a public key or other digital asset account identifier. While the public key may be derived from the private key, the reverse may not be true.

In embodiments related to the Bitcoin system, every Bitcoin public address has a matching private key, which can be saved in the digital wallet file of the account holder. The private key can be mathematically related to the Bitcoin public address and can be designed so that the Bitcoin public address can be calculated from the private key, but importantly, the same cannot be done in reverse.

A digital asset account, such as a multi-signature account, may require a plurality of private keys to access it. In embodiments, any number of private keys may be required. An account creator may specify the number of required keys (e.g., 2, 3, 5, to name a few) when generating a new account. More keys may be generated than are required to access and/or use an account. For example, 5 keys may be generated, and any combination of 3 of the 5 keys may be sufficient to access a digital asset account. Such an account setup can allow for additional storage and security options, such as backup keys and multi-signature transaction approval, as described herein.

Because a private key provides authorization to transfer or spend digital assets such as bitcoins, security of the private key can be important. Private keys can be stored via electronic computer files, but they may also be short enough that they can be printed or otherwise written on paper or other media. An example of a utility that allows extraction of private keys from an electronic wallet file for printing purposes is Pywallet. Other extraction utilities may also be used consistent with the present invention.

In embodiments, a private key can be made available to a program or service that allows entry or importing of private keys in order to process a transaction from an account associated with the corresponding public key. Some wallets can allow the private key to be imported without generating any transactions while other wallets or services may require that the private key be swept. When a private key is swept, a transaction is automatically broadcast so that the entire balance held by the private key is sent or transferred to another address in the wallet and/or securely controlled by the service in question.

In embodiments, using Bitcoin clients, such as BlockChain.info's My Wallet service and Bitcoin-QT, a private key may be imported without creating a sweep transaction.

In embodiments, a private key, such as for a Bitcoin account, may be a 256-bit number, which can be represented in one or more ways. For example, a private key in a hexadecimal format may be shorter than in a decimal format. For example, 256 bits in hexadecimal is 32 bytes, or 64 characters in the range 0-9 or A-F. The following is an example of a hexadecimal private key:

E9 87 3D 79 C6 D8 7D C0 FB 6A 57 78 63 33 89 F4 45 32 13 30 3D A6 1F 20 BD 67 FC 23 3A A3 32 62

In embodiments, nearly every 256-bit number is a valid private key. Specifically, any 256-bit number between 0x1 and 0xFFFF FFFF FFFF FFFF FFFF FFFF FFFF FFFE BAAE DCE6 AF48 A03B BFD2 5E8C D036 4141 is a valid private key. In embodiments, the range of valid private keys can be governed by the secp256k1 ECDSA standard used by Bitcoin. Other standards may also be used.

In embodiments, a shorter form of a private key may be used, such as a base 58 Wallet Import format, which may be derived from the private key using Base58 and/or Base58Check encoding. The Wallet Import format may be shorter than the original private key and can include built-in error checking codes so that typographical errors can be automatically detected and/or corrected. For private keys associated with uncompressed public keys, the private key may be 51 characters and may start with the number 5. For example, such a private key may be in the following format:

5Kb8kLf9zgWQnogidDA76MzPL6TsZZY36hWXMssSzNydYXYB9KF

In embodiments, private keys associated with compressed public keys may be 52 characters and start with a capital L or K.

In embodiments when a private key is imported, each private key may always correspond to exactly one Bitcoin public address. In embodiments, a utility that performs the conversion can display the matching Bitcoin public address.

The Bitcoin public address corresponding to the sample above is:

1CC3X2gu58d6wXUWMffpuzN9JAfTUWu4Kj

In embodiments, a mini private key format can be used. Not every private key or Bitcoin public address has a corresponding mini private key; they have to be generated a certain way in order to ensure a mini private key exists for an address. The mini private key is used for applications where space is critical, such as in QR codes and in physical bitcoins. The above example has a mini key, which is:

SzavMBLoXU6kDrqtUVmffv

In embodiments, any bitcoins sent to the designated address 1CC3X2gu58d6wXUWMffpuzN9JAfTUWu4Kj can be transferred or spent by anybody who knows the private key in any of the three formats (e.g., hexadecimal, base 58 wallet format, or mini private key). That includes bitcoins presently at the address, as well as any bitcoins that are ever sent to it in the future. The private key is only needed to transfer or spend the balance, not necessarily to see it. In embodiments, the bitcoin balance of the address can be determined by anybody with the public Block Explorer at http://www.blockexplorer.com/address/1CC3X2gu58d6wXUWMffpuzN9JAfTUWu4Kj—even if without access to the private key.

In embodiments, a private key may be divided into segments, encrypted, printed, and/or stored in other formats and/or other media, as discussed herein.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

Signatures

A transaction may require, as a precondition to execution, a digital asset signature generated using a private key and associated public key for the digital asset account making the transfer. In embodiments, each transaction can be signed by a digital wallet or other storage mechanism of a user sending a transaction by utilizing a private key associated with such a digital wallet. The signature may provide authorization for the transaction to proceed, e.g., authorization to broadcast the transaction to a digital asset network and/or authorization for other users in a digital asset network to accept the transaction. A signature can be a number that proves that a signing operation took place. A signature can be mathematically generated from a hash of something to be signed, plus a private key. The signature itself can be two numbers such as r and s. With the public key, a mathematical algorithm can be used on the signature to determine that it was originally produced from the hash and the private key, without needing to know the private key. Signatures can be either 73, 72, or 71 bytes long, to name a few.

In embodiments, the ECDSA cryptographic algorithm may be used to ensure that digital asset transactions (e.g., bitcoin transactions) can only be initiated from the digital wallet holding the digital assets (e.g., bitcoins). Alternatively or in addition, other algorithms may be employed.

In embodiments, a transaction from a multi-signature account may require digital asset signatures from a plurality of private keys, which may correspond to the same public key and/or public address identifying the multi-signature digital asset account. As described herein, a greater number of private keys may be created than is necessary to sign a transaction (e.g., 5 private keys created and only 3 required to sign a transaction). In embodiments, private keys for a multi-signature account may be distributed to a plurality of users who are required to authorize a transaction together. In embodiments, private keys for a multi-signature account may be stored as backups, e.g., in secure storage, which may be difficult to access, and may be used in the event that more readily obtainable keys are lost.

Market Places

A digital asset market place, such as a Bitcoin market place, can comprise various participants, including users, vendors, exchanges, exchange agents, and/or miners/mining pools. The market contains a number of digital asset exchanges, which facilitate trade of digital assets using other currencies, such as United States dollars. Exchanges may allow market participants to buy and sell digital assets, essentially converting between digital assets (e.g., bitcoins) and currency, legal tender, and/or traditional money (e.g., cash). In embodiments, a digital asset exchange market can include a global exchange market for the trading of digital assets, which may contain transactions on electronic exchange markets. In accordance with the present invention, exchanges and/or transmitters may also be used to facilitate other transactions involving digital assets, such as where digital assets are being transferred from differently denominated accounts or where the amount to transfer is specified in a different denomination than the digital asset being transferred, to name a few. Bitstamp is one example of a Bitcoin exchange 130. A Bitcoin exchange agent 135 can be a service that acts as an agent for exchanges, accelerating the buying and selling of bitcoins as well as the transfer of funds to be used in the buying and/or selling of bitcoins. Coinbase is an example of a company that performs the role of a Bitcoin exchange agent 135. Coinbase engages in the retail sale of bitcoin, which it obtains, at least in part, from one or more exchanges. FIG. 3 illustrates an exemplary Coinbase website interface for buying bitcoin. Other Coinbase options include "Sell Bitcoin," "Send Money," "Request Money," and "Recurring Payments." Other options could also be made available consistent with exemplary embodiments of the present invention.

In addition to the services that facilitate digital asset transactions and exchanges with cash, digital asset transactions can occur directly between two users. In exemplary uses, one user may provide payment of a certain number of digital assets to another user. Such a transfer may occur by using digital wallets and designating the public key of the wallet to which funds are being transferred. As a result of the capability, digital assets may form the basis of business and other transactions. Digital math-based asset transactions may occur on a global scale without the added costs, complexities, time and/or other limits associated with using one or more different currencies.

Vendors 140 may accept digital assets as payment. A vendor 140 may be a seller with a digital wallet that can hold the digital asset. In embodiments, a vendor 140 may be a larger institution with an infrastructure arranged to accept and/or transact in digital assets. Various vendors 140 can offer banknotes and coins denominated in bitcoins; what is sold is really a Bitcoin private key as part of the coin or banknote. Usually, a seal has to be broken to access the Bitcoin private key, while the receiving address remains visible on the outside so that the bitcoin balance can be verified. In embodiments, a debit card can be tied to a Bitcoin wallet to process transactions.

Setup and Storage of Digital Assets and/or Digital Wallets

Digital asset accounts may be securely generated, accessed, and/or used (e.g., for transactions) from a secure administrative portal. In embodiments, the administrative portal, which may be used for key generation, parsing, and/or reassembly, may be a secure system for transacting in digital math based assets comprising a first computer system comprising one or more processors that generate one or more digital wallets and one or more respective private keys and one or more respective public keys, each of the one or more private keys being segmented into one or more private key segments; one or more writing devices operatively connected to the one or more first computer systems, each of the one or more writing devices adapted to write at least one private key segment of a corresponding one of the one or more private keys, along with information correlating the at least one private key segment to one of the one or more public keys; and at least one networked computer comprising one or more processors that access at least one of the digital wallets using a corresponding one of the one or more private keys as reassembled using the corresponding private key segments.

In embodiments, the administrative portal may further comprise a second computer system comprising one or more processors for reassembling the corresponding one of the one or more private keys based on input into the second computer system of the corresponding private key segments. In embodiments, the input device may be a scanner, a keyboard, a touchscreen, a mouse, a microphone, a camera, and/or a digital card reader, to name a few.

In embodiments, the first computer system of the administrative portal and/or the second computer system may not be associated with a network. In embodiments, the first computer system of the administrative portal and the networked computer system may be a common computer system. In embodiments, the second computer system of the administrative portal and the networked computer system may comprise a common computer system. In further embodiments, the first computer system, the second computer system, and the networked computer system may be a common computer system.

In embodiments, referring to FIGS. 4A-4D, the administrative portal may comprise an accounting computer 25 and a secure location 10, as described herein.

Figure 4A:
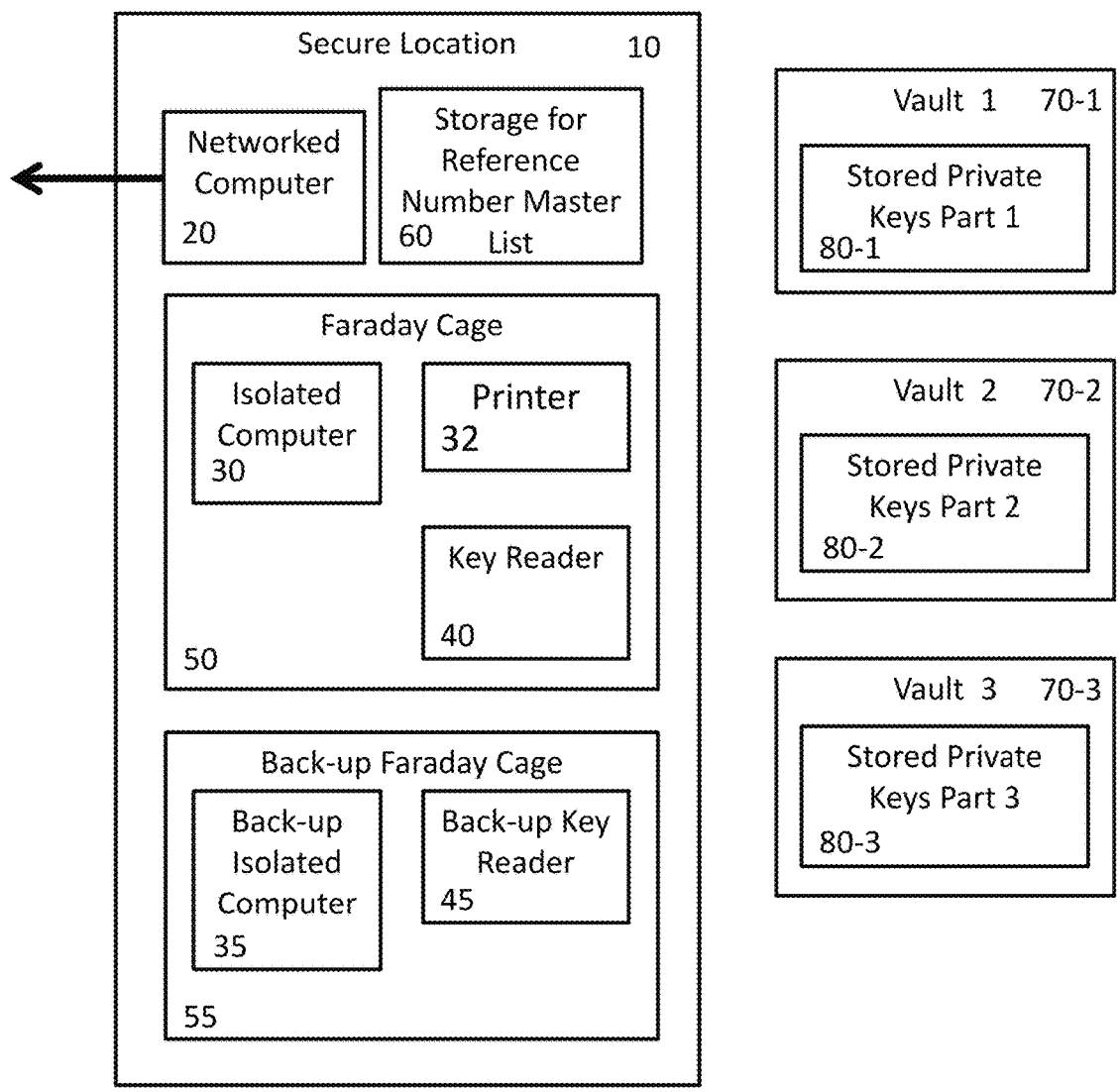
FIGS. 4A-4D are exemplary block diagrams of components of security systems for an ETP holding digital math-based assets in accordance with various exemplary embodiments of the present invention.

Referring to the exemplary embodiment illustrated in FIG. 4A, at a secure location 10, a digital asset account holder, administrator, manager, and/or custodian may maintain at least two computers. In embodiments, an administrator, manager, and/or custodian may be contracted to manage one or more digital asset accounts and/or oversee security for the accounts. In embodiments, secure location 10 may be a room with restricted entry. In embodiments, secure location 10 may have a user entry log to provide an access record for the location.

In the exemplary embodiment depicted in FIG. 4A, at secure location 10, the first computer may be a networked computer 20, which may comprise one or more computing devices. Networked computer 20 and/or other computers in the system may have the ability to cycle or otherwise change IP addresses. The second computer may be a non-networked, isolated computer 30, which may comprise one or more computing devices. In embodiments, the networked computer 20 and the isolated computer 30 may be separate aspects of one computing device. For example, a hard drive partition may be used to separate the networked and non-networked functions. In embodiments, the computers may comprise one or more processors and/or computer readable memory. Networked computer 20 and isolated computer 30 may be located in close proximity to each other, as in the same room, or may be located in separate locations within secure location 10. It will be appreciated by those in the art that secure location 10 may comprise a plurality of secure locations. In embodiments, isolated computer 30 may be located in a Faraday cage 50. The Faraday cage 50 may prevent electronic eavesdropping or interference from electromagnetic waves. In alternative embodiments, the functions ascribed above to networked computer 20 and isolated computer 30 may be performed by one or more networked and/or isolated computers at one or more locations.

In the exemplary embodiment depicted in FIG. 4A, networked computer 20 can communicate with a registry, exchange, other external entities, e.g., APs, and/or all or part of a digital asset network to send and/or receive digital assets (e.g., to create transactions), to compute balances, and/or to transmit or otherwise broadcast signed or otherwise finalized transactions. In embodiments, networked computer 20 may be used to distribute digital assets among one or more digital asset accounts and/or digital wallets. The networked computer 20 may be connected to the Internet directly (e.g., through Ethernet, Wi-Fi, Bluetooth, or any connection known in the art or hereafter developed) or indirectly (e.g., through another computer to which it is directly connected), or may be connected to a network other than the Internet.

In embodiments, the digital assets may be stored in one or more digital wallets residing on one or more computing devices, such as remote servers, personal computers, tablet devices, mobile devices, such as smart phones, or PDAs, to name a few. In the exemplary embodiment of FIG. 4A, isolated computer 30 may be used to generate electronic wallets and/or key pairs, which may include both private and public keys. In embodiments, keys comprise strings or alphanumeric characters or other characters, optionally of a pre-determined length, may comprise one or more pieces of computer code, or may comprise other formats of keys known in the art. In embodiments, digital wallets may be created on isolated computer 30 using a "clean-boot" with a bootable CD, such as a Linux Live CD. The specific version of the operating system may be maintained in secret to avoid security risks.

In embodiments, digital asset accounts and/or digital wallets may be generated by an entity upon receipt of a request to transfer digital assets to the entity and/or may be pre-generated at the time that security measures (e.g., a vault storage system) is set up, to name a few. The digital asset accounts each may be associated with unique private-public key pairs (which may include a plurality of private keys). In embodiments, the key pairs may be created as part of the digital wallet creation process. In other embodiments, the key pairs may be created before or after the creation of the one or more digital wallets and associated with the wallets as a separate step. In embodiments, the assets stored in a digital wallet may be accessed with a key pair, even if the original wallet is destroyed or otherwise unavailable. In such embodiments, only the key pair need be maintained and/or stored to retrieve the assets associated with a given digital wallet. Accordingly, in an embodiment of the present invention, digital wallets may be deleted or otherwise destroyed following the storage of their associated keys. Assets may be added to the wallet even after its destruction using the public key. Assets may thus be stored in a wallet after the wallet is destroyed. The wallet may be re-generated using its keys.

In embodiments, the private key may not be used directly with or on the networked computer 20. In embodiments, a public key (without the corresponding private key) may only be able to receive digital assets for deposit purposes. In embodiments, assets may be transferred to a wallet using its public key and without the transferor knowing the private key. Implementation of the foregoing may require customized software, e.g., software that modifies the standard digital asset protocols.

In embodiments, isolated computer 30 may also be used in conjunction with, e.g., one or more printers or other writing devices, to print the key pairs or may be used otherwise to arrange for the storage of one or more aspects and/or portions (or segments or coded and/or encrypted segments) of the key pairs. A printer 32 or other writing device to write, print, or otherwise store the keys may be provided with the isolated computer 30. Such printer(s) and/or other writing device(s) may be connected, directly and/or indirectly, to the isolated computers, such as through hardwire, wireless, or other connection. That device may also be located within a Faraday cage, which may be the same Faraday cage housing isolated computer 30. Storage of the keys is described further below.

In embodiments, one or more isolated computers 30 can be used in conjunction with one or more printers or other writing devices to write, print or otherwise store keys. It will be appreciated by one of skill in the art, that in embodiments it may be desirable to limit the number or printers or other writing devices to as few as possible to reduce risk of exposure of private keys, while in embodiments it may be desirable to have a larger number of printers or other writing devices to handle the volume of wallets and/or keys that need to be generated and/or written by the system for its operation.

Private keys may be stored in the selected format along with their corresponding public keys. In embodiments, the private key may be stored with a reference number which may correlate the private key to its corresponding public key. The reference number may be (or may be stored as) a number, alphanumeric code, bar code, QR code, to name a few. A reference number master list may identify a private key, the reference number, and the corresponding public key. The reference number master list may be printed or etched on paper or some other substrate, may be stored digitally on a tape CD, DVD, computer hard drive, or other medium, or otherwise stored in a manner known in the art. The substrates or media just described may have any suitable size, including microscopic or nano scales. In embodiments, the reference number master list may be stored in a secure storage chamber 60 at secure location 10. Storage chamber 60 may be a lockbox, fireproof box, or other secure chamber.

If storage is electronic or digital, chamber 60 may protect against electromagnetic waves.

The private and/or public keys and/or any reference number may be stored in a variety of formats, as described herein. The keys may be divided into separate segments for storage. For example, a 51-character key may be divided into three 17-character segments. The same reference number that correlates the private key to the public key or an additional reference number or other identifier may indicate which key segments are part of the same key. The reference identifier or another identifier may be provided and stored with the one or more segments to indicate their order in the assembled key. A numbering schema or other convention may also be used to identify the order of key segments. For example, a first segment may begin with an "A", a second segment may begin with a "B", and a third segment may begin with a "C". The key segments may be stored in one or more locations. In embodiments, the key segments may be divided among a plurality of vaults 70, as described herein.

In embodiments, keys and/or key segments may be stored digitally and/or electronically, e.g., on one or more computer hard drive, disk, tape, memory card, flash memory, CD-ROM, and/or DVD, to name a few. In embodiments, the keys and/or key segments may be printed on any substrate, including paper, papyrus, plastic, and/or any substrate known in the art. In embodiments, the substrate may be fireproof or fire resistant, such as a fireproof plastic. The substrate may be resistant to fluids, e.g., water resistant, or otherwise nonabsorbent. Other printing options may be holographic printing, three-dimensional printing, raised printing, such as Braille lettering, and/or invisible ink printing, such as using inks that require a special light and/or treatment, e.g., heat and/or chemicals, for viewing. In embodiments, keys may be etched, e.g., in wood, metal, glass, plastic, or other compositions known in the art, e.g., to produce a card. In embodiments, a magnetic encoding may be used to write to the card. In embodiments, etched or printed keys or key segments may take any shape, such as coin-shaped tokens or rectangular blocks, to name a few. In embodiments, keys or key segments may be printed, etched, or otherwise stored as alphanumeric strings. In embodiments, keys or key segments may be printed, etched, or otherwise stored in a form readable by programmed devices, such as scanners. Such a form may be a QR code, a bar code, another available scannable code format and/or a proprietary code format. In embodiments, quality control operations may ensure that the keys or key segments are printed accurately and/or are able to be read. In embodiments, printed or etched keys or key segments may be coated to prevent reading the key without removing or otherwise altering the coating. Such a coating may be a UV coating and/or may block X-rays or other forms of scanning or reading. The coating may be scratched off to reveal the data contained below it. The back of the substrate may also be coated to prevent reading through the substrate. Such a coating may provide an indication of whether a printed key or key segment was accessed or attempted to be accessed (e.g., it can be detected whether someone scratched the coating away).

In embodiments, security measures may be established and implemented to reduce the risk of digital wallets being compromised. Further, redundancies can be put in place to provide and/or help ensure that any information necessary to access digital math-based assets in digital wallets can be maintained and/or accessed by the account holders as appropriate, necessary, and/or desired.

Multiple private keys may be required to access a digital wallet. Multiple keys may be stored in the same manner as key segments. In embodiments, where a second private key is required, the one or more individuals or systems providing the second key may be located in different administrative portals, different rooms, and/or different geographies from the one or more individuals or systems providing the first private key. Accordingly, a plurality of administrative portals may be employed by secure digital asset storage systems in accordance with the present invention. In embodiments, a plurality of portals may be used for retrieval of stored digital assets (e.g., by requiring a signature or private key from at least two individuals located in at least two different portals). In embodiments, one portal may be used for re-assembling key segments and thus providing one private key, and an individual in a second location may be required to provide a second key or signature before a digital wallet may be accessed. The second key or signature may be encrypted and/or segmented as described herein with respect to a single private key.

In embodiments, a digital wallet may have more than one private key (e.g., multi-signature wallets). The plurality of private keys may be stored securely in the same manner as a single private key. Each private key segment pertaining to a single wallet may be stored in separate vaults, which may be electronic and/or physical vaults. By allowing for multi-signature wallets, the wallet can provide for approval/signature authority from more than one individual or entity as a further means to control access to digital assets held in such wallet. In embodiments, a signature authority may be an automated electronic signature authority, such as a computer or computer system programmed with transaction approval rules. The automated electronic signature authority may only provide a signature when a transaction satisfies the transaction approval rules. In other embodiments, required signature authorities may be individuals who may be located in different administrative portals, different rooms, and/or different geographies. Accordingly, a plurality of administrative portals may be employed by secure digital asset storage systems in accordance with the present invention. In embodiments, one portal may be used for re-assembling key segments and thus providing one private key, and an individual or system in a second location may be required to provide a second key or signature before a digital wallet may be accessed. The second location may be a second portal, a location in a different building, and/or a different geography, to name a few. The second key or signature may be encrypted and/or segmented as described herein with respect to a single private key.

Keys or key segments may be encrypted and/or ciphered, using one or more ciphers, as an additional security measure. The encryption and/or ciphers may be applied by computers running encryption software, separate encryption devices, or by the actions of one or more persons, e.g., prior to input of the encrypted and/or ciphered data into one or more computers. In embodiments, a key may be stored in reverse order and/or translated (e.g., by adding 1 to each digit and/or advancing each alphabetic character by one position in the Western alphabet, by substitution such as by mapping each character to a different character (e.g., A=3, 5=P, to name a few), to name a few). In embodiments, other encryption algorithms can comprise scrambling of a sequence of characters, addition of characters, and/or hashing. Other encryption techniques are possible. See, e.g., David Kahn, *The Codebreakers: The Story of Secret Writing*, 1967, ISBN 0-684-83130-9. See also, Bruce Schneier, *Applied Cryptography*, John Wiley & Sons, 1994, ISBN: 0-471-59756-2.

The encryption and/or ciphers may protect against use of the keys by an unauthorized entity who obtains the keys or key segments or copies thereof. The encoding and/or cipher may be maintained in secret and applied to decrypt or decode the keys only when keys must be accessed and used. In embodiments, ciphering may refer to an alphanumeric translation or reordering, while encryption may refer to higher level algorithms, including hashing algorithms. In embodiments, encryption and ciphering may refer to the same processes, in which case descriptions herein of processes involving both encryption and ciphering steps may only entail performance of one such step so as not to be repetitive.

Following storage of the key pairs, the key pairs may be erased from isolated computer 30. Erasure may occur using the computer operating system's delete features, customized software or computer code designed to remove the data from computer memory, magnets used to physically erase the data from the computer's storage drives, and/or other techniques known in the art.

A key reader 40 may be provided to assemble, read, and/or de-crypt the keys or key segments. The key reader 40 may be contained within a Faraday cage, which may be the same Faraday cage housing isolated computer 30. The key reader 40 may read keys that are printed, etched, digitally stored, or otherwise stored. Key reader 40 may be a scanner (e.g., photo scanner or bar code scanner), QR reader, laser, computer hardware, CD reader, and/or digital card reader, to name a few. Key reader 40 may include or be operationally connected to a microscope or magnifying device, such as for keys that are printed in microscopic sizes or other small sizes. In embodiments, key reader 40 may be paired with optical character recognition ("OCR") technology to create digitally recognized copies of keys that may have been printed, etched, or otherwise stored in a form not immediately readable by a computer.

In embodiments, key reader 40 may comprise an input device, such as a keyboard, touchscreen, mouse, and/or microphone, to name a few. An input device may be used for manual entry of keys and/or key segments into one or more computers so that the computer may further process the key segments. Key reader 40 may be operationally connected to isolated computer 30, which may be a direct connection (e.g., a USB cable, Ethernet cable, Bluetooth, or Wi-Fi, to name a few). In embodiments, key reader 40 may be operationally connected to networked computer 20. Key reader 40 may be operationally connected to a separate computing device.

In embodiments, reassembled keys may be input directly into a networked computer 20, which may then be used to access one or more digital wallets and/or perform one or more transactions. Key reader 40 and/or corresponding software (e.g., running on a computer operationally connected to the key reader) may be programmed or otherwise designed to assemble key segments into completed keys. Key reader 40 and/or corresponding software (e.g., running on a computer operationally connected to the key reader) may also correlate the private keys with their corresponding public keys, optionally using the reference number master list. In embodiments, one or more pieces of software may be used to retrieve, decrypt, assemble, and/or decipher keys and/or key segments. In embodiments, such software may be run on any of one or more secure storage system computers and/or user devices. In embodiments, multiple authority may be required to initiated a retrieval of stored private keys.

Figure 4B:
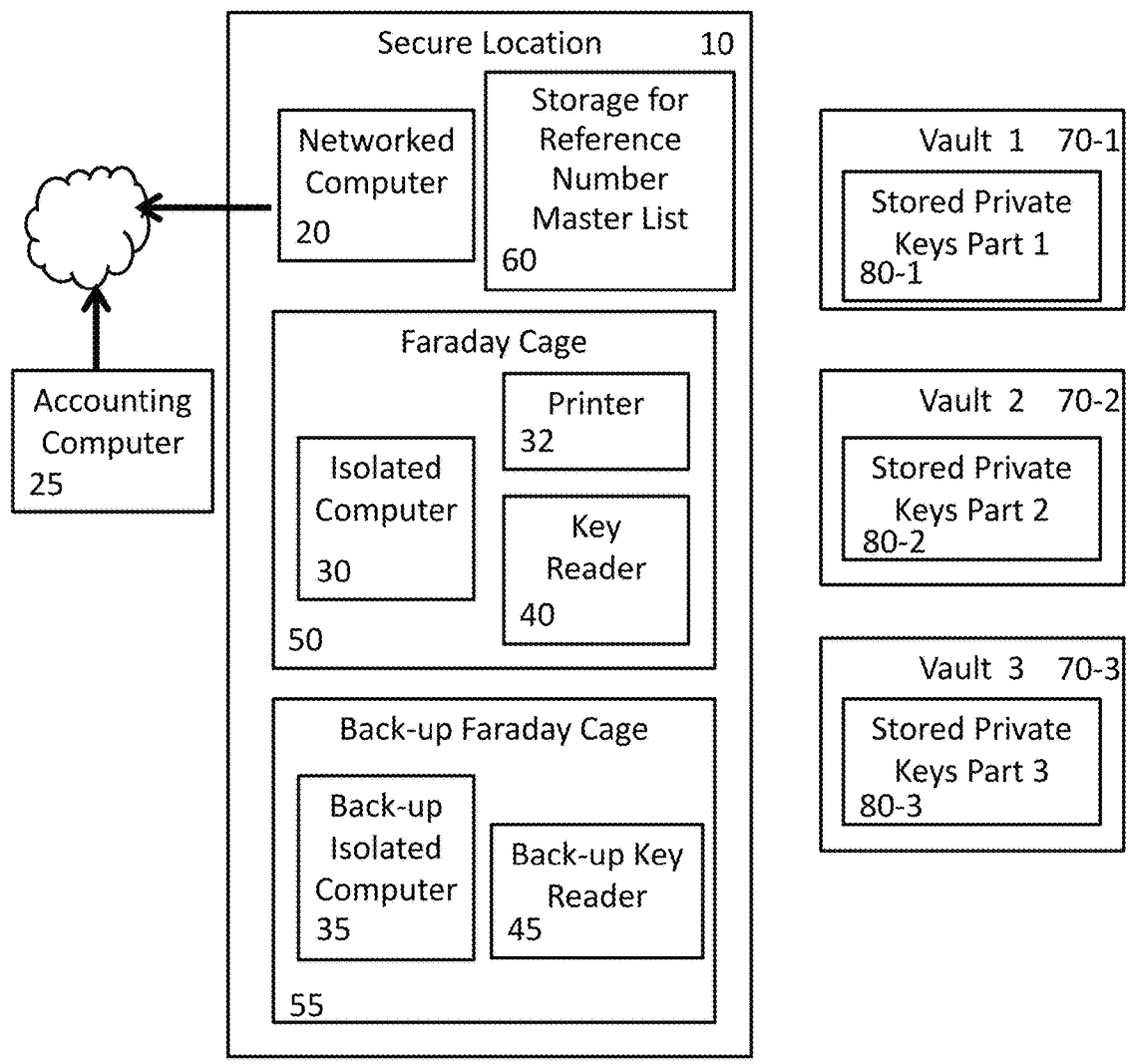
Figure 4C:
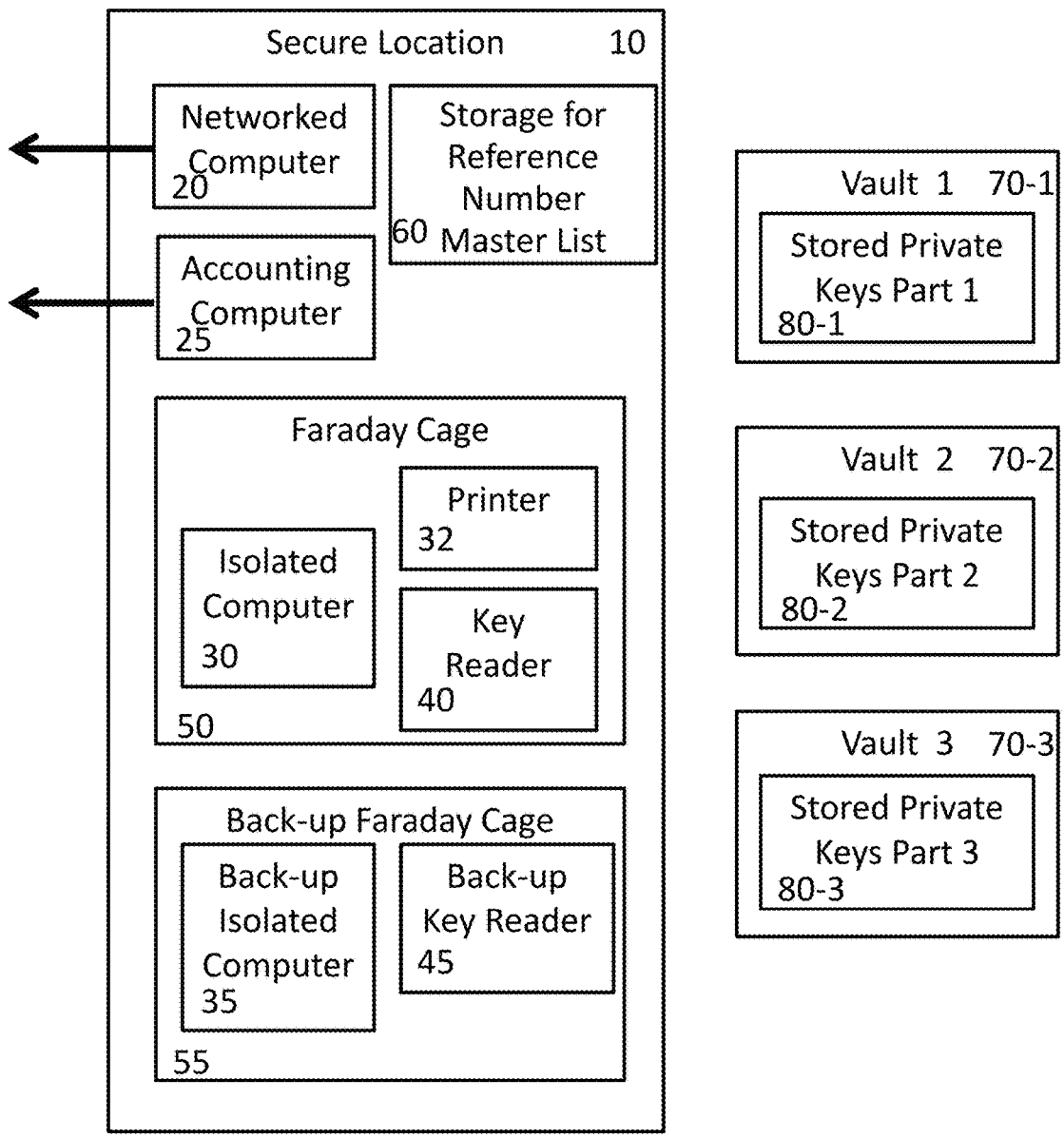

In embodiments, a back-up isolated computer 35 and/or a back-up key reader 45 may be provided at secure location 10, as illustrated in FIGS. 4A-4C. The back-up isolated computer 35 and key reader 45 may be contained in a back-up Faraday cage 55, which may be separate from main Faraday cage 50. In embodiments, all or part of the administrative portal may be duplicated and/or backed up. A duplicate administrative portal or portion thereof may be located in a separate geographic area. A duplicate portal may serve as a disaster recovery operations portal.

In embodiments, a digital math-based asset miner, such as a bitcoin miner, may be located at or within the administrative portal. The miner may be one or more computers. In embodiments, the miner may be operationally connected to any of the computers and/or devices at the administrative portal described above.

Figure 4D:
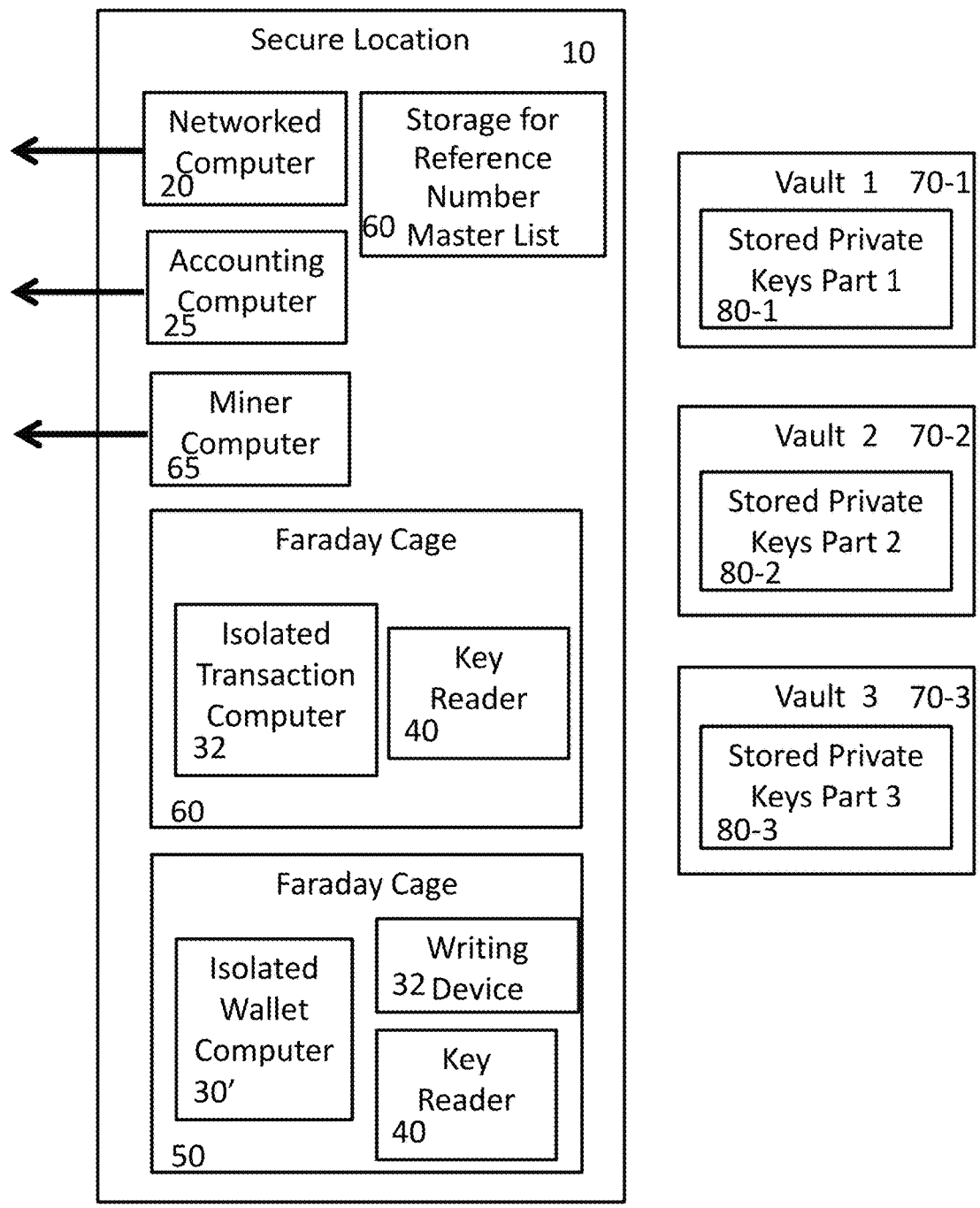

In embodiments, referring to FIG. 4D, the secure location can house one or more networked computers 20, one or more accounting computers 25, one or more digital asset miner computers 65, one or more isolated transaction computers 32 operatively connected to one or more key readers 40, and one or more isolated wallet computers 30', operatively connected to one or more writing devices 32 and, in embodiments, to one or more key readers 40. Each isolated transaction computer 60 and/or isolated wallet computer 30' may be isolated from each other and/or other computers electronically using a secure environment, such as a Faraday cage 50, 60.

One or more vaults 70, 70-1, 70-2, 70-3, 70-N, may be used to hold assets. Vaults may be any secure storage facilities, structures, and/or systems. For example, a vault may be a bank vault or a safety deposit box. Vaults may have appropriately controlled environments (e.g., regulated temperature and/or humidity, to name a few) to enable long-term storage of keys and/or key segments substrates. Vaults may be operated by one or more entities, which may be separate entities. In embodiments, only bonded employees may be permitted access to the vaults. Also, vaults may be located in one or more physical (e.g., geographic) and/or digital (e.g., residing on one or more separate computer servers or hard drives) locations. In embodiments, vaults may be used in conjunction with digital wallets and/or other devices and/or systems known in the art for storing digital assets and/or data.

In the exemplary embodiments of FIGS. 4A-D, the private keys 80 may be divided into three segments, 80-1, 80-2, and 80-3 for storage. Each segment may be stored in a separate one of vaults 70-1, 70-2, and 70-3. In embodiments, two segments, four segments, five segments or another number of segments can be used in accordance with embodiments the present invention. In embodiments, each key segment may be stored in a vault operated by the same entity or by one or more different entities.

In embodiments, one or more duplicate copies of each key or key segment may be produced. Such duplicate copies may be stored in separate vaults, e.g., three sets of keys split into three segments may be stored in nine vaults, four sets of keys split into two segments may be stored in eight vaults, and/or the copies of key segments may be distributed among some other number of vaults, to name a few. See, e.g., FIGS. 9A-9D, to name a few. Duplicate copies may serve as a back-up in case one copy of a key or key segment becomes corrupted, lost, or otherwise unreadable.

In embodiments, vaults may hold the keys in an organized or categorized fashion so as to facilitate location of one or more keys or key segments. In embodiments, a sorting reference number may be used to organize the keys or key segments. The sorting reference number may be the same as the reference number that correlates private and public keys. In embodiments, etched coins or other materials or printed keys or key segments may be stacked or otherwise arranged according to the reference number. In embodiments, an index or card catalog may describe the location of the keys. In embodiments, an automated machine may store and retrieve key segments from storage slots, which machine may receive an input to indicate which keys or key segments to retrieve.

FIG. 5A illustrates an exemplary embodiment of a process for creating digital wallets and storing their keys. In a step S02 one or more digital wallets may be created using one or more isolated wallet computers 30'. In a step S04, the public and private keys associated with the created digital wallets may be obtained using one or more isolated wallet computers 30'. In embodiments, referring to FIG. 5B, in a step S05 each private key may be ciphered. In a step S06, each private key, which may be a ciphered private key following step S05, may be divided into segments. In a step S08, one or more duplicate copies of each private key segment may be created. In some embodiments, the private key may be divided into 2, 3, 4 or more segments. In embodiments, each private key segment may be encrypted or otherwise encoded in a step S10. In embodiments, steps S08 and/or S10 may be skipped. In a step S12, each private key segment may be associated with a reference number, correlating the private key segment to the respective public key and/or indicating the order of the private key segment within the complete key. In a step S14, each encrypted private key segment may be converted to a storable medium, such as by printing each private key segment on paper. In a step S16, the private key segment as converted in the storable medium (e.g., printed) is verified to confirm it was properly and retrievable stored. In embodiments, this step may be skipped. In a step S18, each private key segment is stored along with its reference number at one or more secure locations. In a step S20, each digital wallet is deleted, leaving the stored keys as a means to regenerate the wallets.

Figures 6A, 6B:
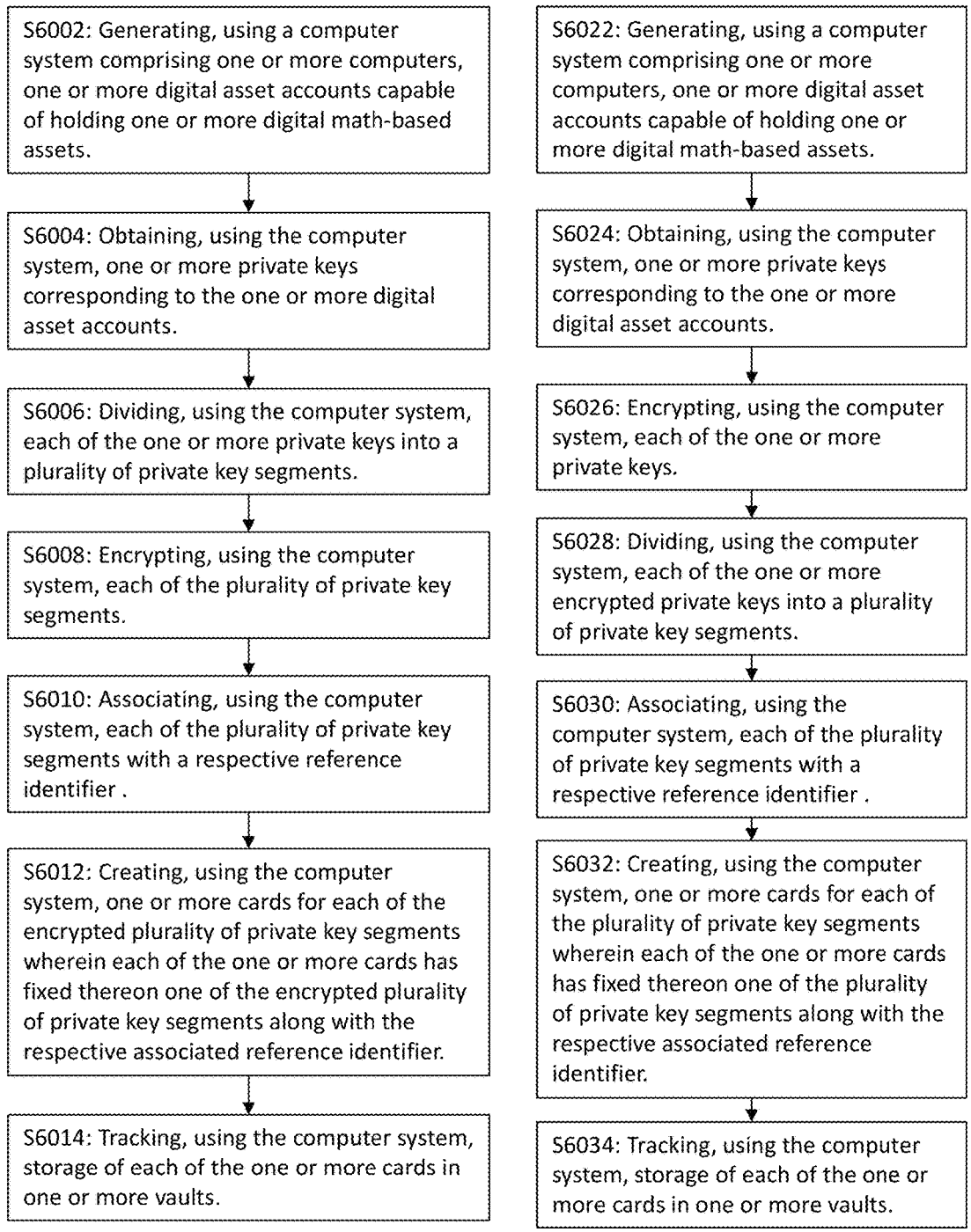
FIGS. 6A-6D are flow charts of exemplary processes for generating digital asset accounts and securely storing the keys corresponding to each account in accordance with exemplary embodiments of the present invention.

FIG. 6A is a flow chart of a process for generating digital asset accounts and securely storing the keys corresponding to each account. In embodiments, the process may be performed using one or more isolated computers not connected to any external data networks. The isolated computer may comprise a clean copy of an operating system (e.g., a clean boot) stored in computer-readable memory and running on one or more processors.

In a step S6002, a computer system comprising one or more computers may be used to generate one or more digital asset accounts capable of holding one or more digital math-based assets. In embodiments, such accounts may be associated with digital asset ownership and/or possession without physically holding a digital asset in any location. A digital asset software client, which may comprise part of a digital wallet or may be accessed using a digital wallet, may be used to generate the digital asset accounts.

In a step S6004, the computer system may be used to obtain one or more private keys corresponding to the one or more digital asset accounts. In embodiments, the private keys may be generated as part of the digital asset account creation process.

In a step S6006, the computer system may be used to divide each of the one or more private keys into a plurality of private key segments. In embodiments, such as with a multi-signature wallet, at least one private key for each digital asset account may be divided into private key segments.

In a step S6008, the one or more computers may be used to encrypt each of the plurality of private key segments. Encryption can comprise any of the techniques described herein, such as character substitution, scrambling, mapping, and/or hashing, to name a few. The computer system can apply one or more algorithms to perform the encryption. Symmetric and or asymmetric encryption algorithms may be applied.

In a step S6010, the one or more computers may be used to generate and/or associate each of the plurality of private key segments with a respective reference identifier. A reference identifier may be a number, alphanumeric sequence, or other unique sequence that can be used to identify key segments, which may be used for storage and/or retrieval of key segments. The reference identifier for each key segment may be stored on a reference identifier master list, which may be stored electronically and/or on a physical substrate. The reference identifier master list may associate with each other the reference identifiers for key segments corresponding to the same key, and/or may also associate a digital asset account identifier (e.g., a public key or public address) with the key segments.

In a step S6012, the one or more computers may be used to create one or more cards for each of the encrypted plurality of private key segments. Each card may have fixed thereon one of the encrypted plurality of private key segments along with the respective associated reference identifier. The cards may be paper, such as index cards, 8½ in.×11 in. sheets of paper, or other paper products. In other embodiments, the cards may include plastic or metal. The cards may be laminated. A writing device may fix the key segments and reference identifiers to the cards by techniques such as printing, etching, and/or magnetically encoding, to name a few. A scannable code, such as a bar code or QR code, may be used to write the keys to the cards.

In embodiments, collated sets of cards may be produced for a plurality of digital asset accounts. Each set may contain only one card per private key such that the private key segments for a single private key are divided among different sets of cards.

In embodiments, following creation of the one or more cards, quality control steps can be performed. A reading device may be used to read each of the cards to ensure readability.

In a step S6014, the one or more computers may be used to track storage of each of the one or more cards in one or more vaults. Vaults may be geographically remote. Vaults can include bank vaults and/or precious metal vaults. In embodiments, a main set of vaults and one or more sets of backup vaults may be used. A main set of vaults can be located in a geographically proximate area, such as a metropolitan area of a city, while backup sets of vaults may be located in geographically remote areas. The backup vaults may contain duplicate copies of the cards. Vault locations for each card or set of cards may be included on the reference identifier master list.

In embodiments, the process can further include receiving at the computer system a quantity of digital math-based assets, and storing those digital assets in the one or more securely stored digital asset accounts. In embodiments, storing the digital asset can comprise transferring the digital assets into accounts with securely stored private keys. Accordingly, storing can comprise generating electronic transfer instructions for an electronic transfer of the quantity of digital math-based assets to the one or more digital asset accounts and broadcasting the electronic transfer instructions to a decentralized electronic ledger maintained by a plurality of physically remote computer systems.

FIG. 6B is a flow chart of another exemplary process for generating digital asset accounts and securely storing the keys corresponding to each account.

In a step S6022, a computer system comprising one or more computers may be used to generate one or more digital asset accounts capable of holding one or more digital math-based assets, as described with respect to step S6002 of FIG. 6A.

In a step S6024, the computer system may be used to obtain one or more private keys corresponding to the one or more digital asset accounts, as described with respect to step S6004 of FIG. 6A.

In a step S6026, the computer system may be used to encrypt each of the one or more private keys.

After encryption, in a step S6028, the computer system may be used to divide each of the encrypted private keys into a plurality of key segments.

In a step S6030, the one or more computers may be used to generate and/or associate each of the plurality of private key segments with a respective reference identifier.

In a step S6032, the one or more computers may be used to create one or more cards for each of the plurality of private key segments.

In a step S6034, the one or more computers may be used to track storage of each of the one or more cards in one or more vaults.

Figure 6C:
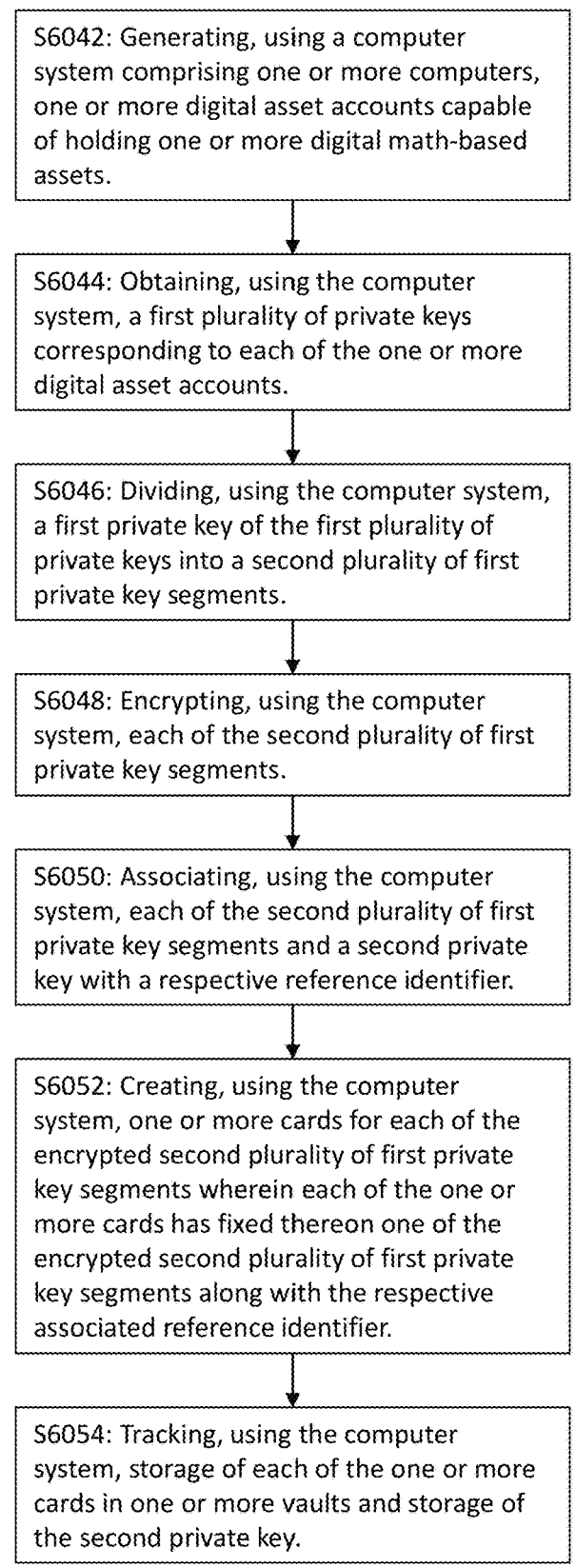

FIG. 6C is a flow chart of another exemplary process for generating digital asset accounts and securely storing the keys corresponding to each account. The exemplary process may generate and store keys for, a multi-signature digital asset account, where at least one of the private keys is divided into a plurality of key segments.

In a step S6042, a computer system comprising one or more computers may be used to generate one or more digital asset accounts capable of holding one or more digital math-based assets.

In a step S6044, the computer system may be used to obtain a first plurality of private keys corresponding to each of the one or more digital asset accounts. Each first plurality of private keys can comprise the private keys of a multi-signature account.

In a step 6046, the computer system may be used to divide a first private key of the first plurality of private keys into a second plurality of first private key segments. For a multi-signature digital asset account at least one of the private keys may be divided into private key segments.

In a step S6048, the computer system may be used to encrypt each of the second plurality of first private key segments. In embodiments, the second key may be encrypted.

In a step S6050, the computer system may be used to generate and/or associate each of the second plurality of first private key segments with a respective reference identifier.

In a step S6052, the computer system may be used to create one or more one or more cards for each of the encrypted second plurality of first private key segments wherein each of the one or more cards has fixed thereon one of the encrypted second plurality of first private key segments along with the respective associated reference identifier. In embodiments, the second key may be written, e.g. using the writing device, to one or more physical substrates, such as paper, plastic, and/or metal. In other embodiments, the second key may be stored electronically.

In a step S6054, the computer system may be used to track storage of each of the cards in one or more vaults, as well as to track storage of the second private key. A reference identifier master list may identify the storage locations of each key and key segment.

Figure 6D:
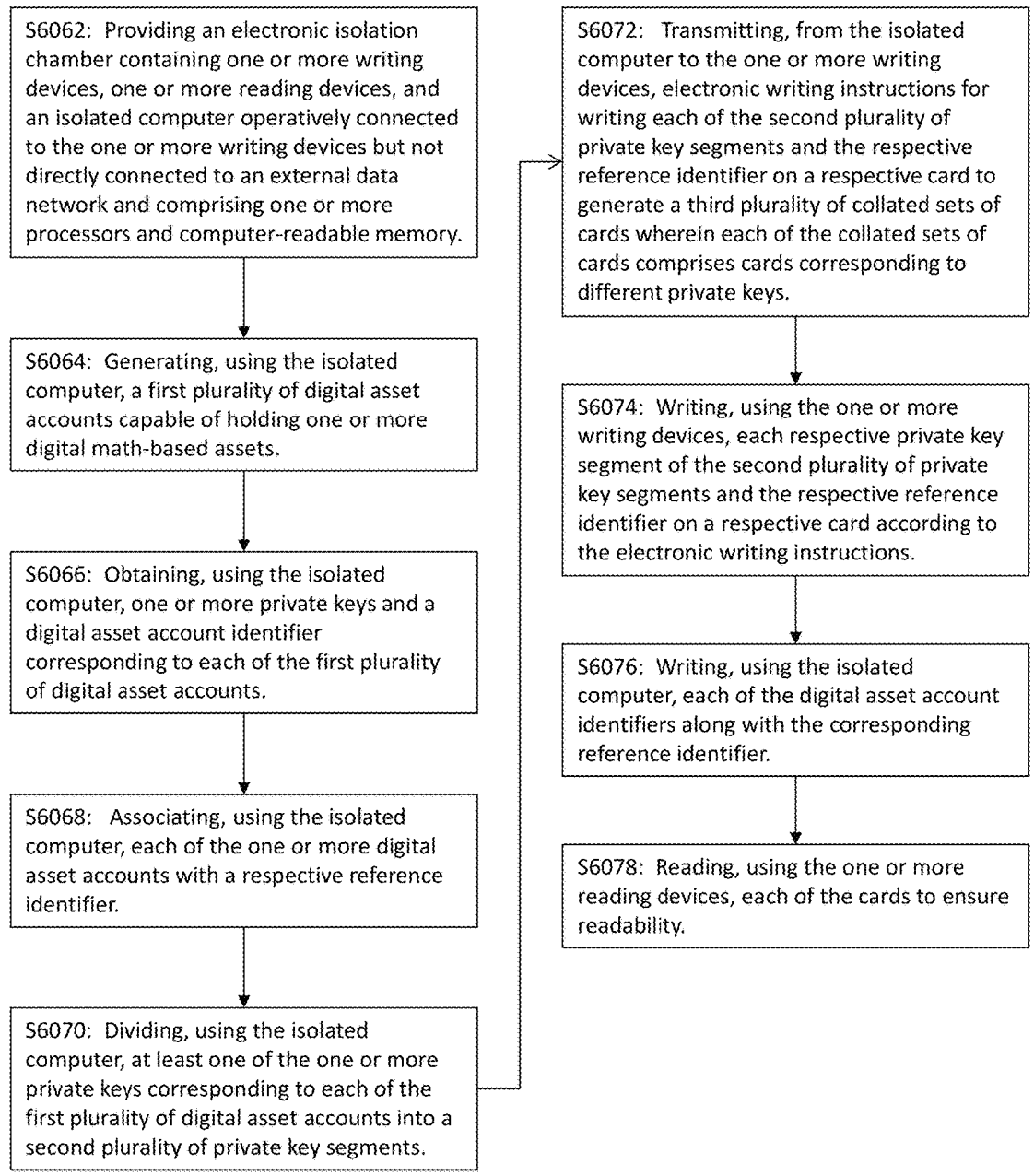

FIG. 6D is a flow chart of an exemplary process for securely generating digital asset accounts and storing associated keys using a secure portal.

In a step S6062, an electronic isolation chamber may be provided containing one or more writing devices (e.g., printers, engravers, magnetic card encoders, to name a few), one or more reading devices (e.g., scanners, bar code scanners, QR readers, magnetic card readers, to name a few), and an isolated computer operatively connected to the one or more writing devices but not directly connected to an external data network and comprising one or more processors and computer-readable memory.

In a step S6064, the isolated computer may be used to generate a first plurality of digital asset accounts capable of holding one or more digital math-based assets. In embodiments, the first plurality of digital asset accounts may comprise multi-signature digital asset accounts.

In a step S6066, the isolated computer may be used to obtain one or more private keys and a digital asset account identifier corresponding to each of the first plurality of digital asset accounts.

In a step S6068, the isolated computer may be used to associate each of the one or more digital asset accounts with a respective reference identifier. The reference identifier may comprise an alphanumeric sequence. In embodiments, respective reference identifiers may be associated with one or more keys or key segments corresponding to the respective digital asset accounts.

In a step S6070, the isolated computer may be used to divide at least one of the one or more private keys corresponding to each of the first plurality of digital asset accounts into a second plurality of private key segments. In embodiments, each private key segment may be required to regenerate the respective private key. In embodiments, a subset of the second plurality of private key segments (e.g., 3 of 5 keys) could be sufficient to regenerate the respective private key.

In a step S6072, the isolated computer may transmit to the one or more writing devices, electronic writing instructions for writing each of the second plurality of private key segments and the respective reference identifier on a respective card to generate a third plurality of collated sets of cards wherein each of the collated sets of cards comprises cards corresponding to different private keys. In embodiments, the third plurality of collated sets can include one or more duplicate sets for each of the collated sets of cards. In embodiments, the isolated computer may be used to generate the electronic writing instructions prior to transmitting them to the one or more writing devices.

In a step S6074, the one or more writing devices may be used to write each respective private key segment of the second plurality of private key segments and the respective reference identifier on a respective card according to the electronic writing instructions. In embodiments, step S6074 can comprise printing and/or etching each respective private key segment of the plurality of private key segments and the respective reference identifier on respective separate cards. In embodiments, each respective private key segment of the plurality of private key segments may be magnetically encoded on respective separate cards. The respective reference identifiers may be printed on the respective cards, e.g., to be readable without a magnetic card reader. Each respective private key segment of the second plurality of private key segments may be written, e.g., printed, as a scannable code, such as a bar code and/or a QR code.

In a step S6076, the isolated computer may be used to write each of the digital asset account identifiers along with the corresponding reference identifier. In embodiments, step S6076 can further comprise the steps of transmitting, from the isolated computer to the one or more writing devices, second electronic writing instructions for writing each of the digital asset account identifiers along with the corresponding reference identifier, and writing, using the one or more writing devices, each of the digital asset account identifiers along with the corresponding reference identifier according to the second writing instructions. In embodiments, writing according to the second writing instructions can comprise writing to an electronic storage medium, such as a flash drive, hard drive, and/or disc. In embodiments, writing according to the second writing instructions can comprise writing to a physical storage medium, such as paper.

In a step S6078, the one or more reading devices may be used to read each of the cards to ensure readability. In embodiments, step S6078 may be performed after step S6076. In embodiments, step S6078 may be performed before step S6076.

In embodiments, the process illustrated by FIG. 6D can further comprise the step of writing, using the isolated computer, the respective digital asset account identifiers to a removable electronic storage medium, e.g., for transfer to an accounting computer.

In embodiments, the process can further comprise the step of destroying the isolated computer, the one or more writing devices, and the one or more reading devices, or destroying any one of those devices.

In embodiments, the method can further comprise the step of encrypting, using the isolated computer, each of the second plurality of private key segments. In embodiments, encryption techniques can include symmetric-key encryption, asymmetric-key encryption, scrambling, substitution, hashing, or adding characters.

In embodiments, the method can further comprise the step of tracking, using the isolated computer, storage of each of the third plurality of collated sets of cards. In embodiments, each of the third plurality of collated sets of cards may be stored in a vault. In embodiments, each collated set of cards may be stored in a separate vault.

FIGS. 4B and 4C illustrate exemplary embodiments of the present invention where one or more computers 25 running accounting software to account for the assets and/or expenses of an account holder can be located either within the secure location 10 (e.g., FIG. 4B) or outside of the secure location 10 (e.g., FIG. 4C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of ETP redemptions and/or creations) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 4D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer.

Figure 7:
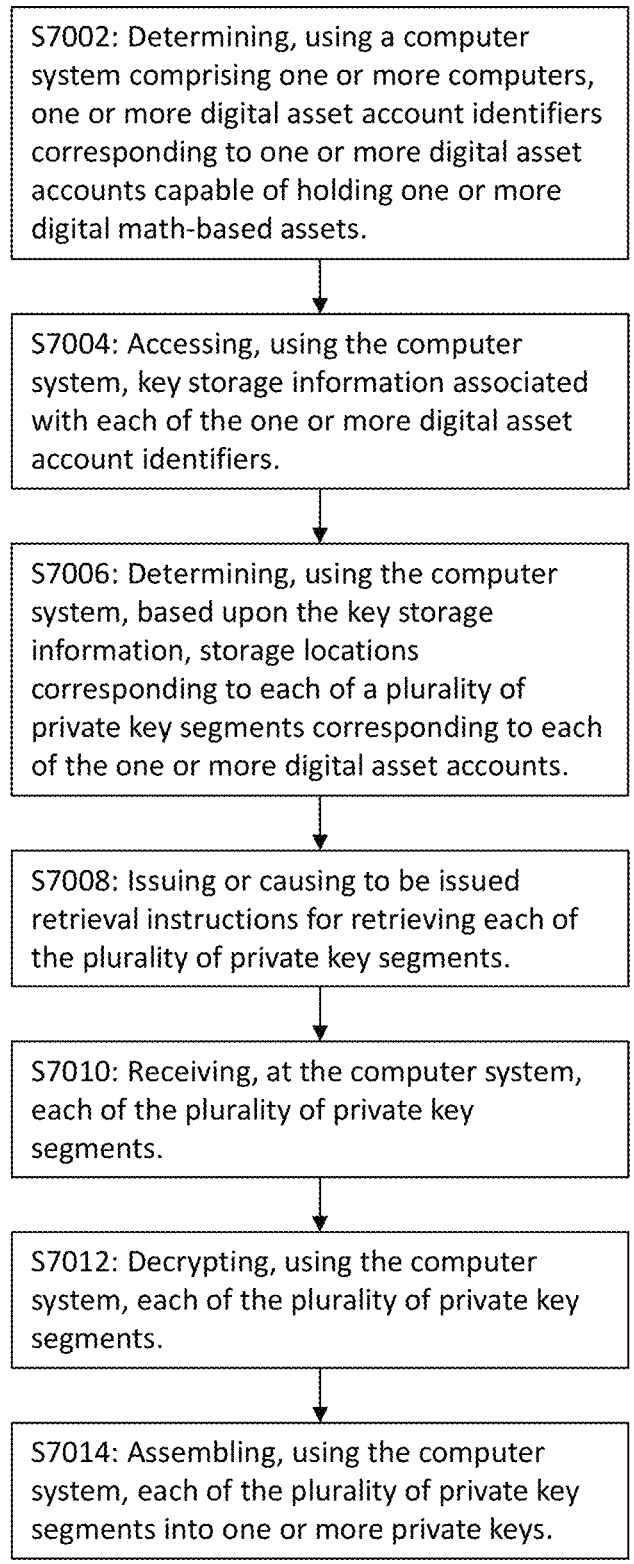
FIG. 7 is a flow chart of an exemplary process for retrieving securely stored keys associated with a digital asset account in accordance with exemplary embodiments of the present invention.

FIG. 7 is a flow chart of a process for retrieving securely stored private keys in accordance with exemplary embodiments of the present invention.

In exemplary embodiments, in step S7002, a computer system comprising one or more computers may be used to determine one or more digital asset account identifiers corresponding to one or more digital asset accounts capable of holding one or more digital math-based assets.

In a step S7004, the computer system may be used to access key storage information associated with each of the one or more digital asset account identifiers. In embodiments, the key storage information may comprise a reference identifier associated with one or more stored private key segments.

In a step 7006, the computer system may be used to determine, based upon the key storage information, storage locations corresponding to each of a plurality of private key segments corresponding to each of the one or more digital asset accounts.

In a step 7008, retrieval instructions for retrieving each of the plurality of private key segments may be issued or caused to be issued.

In a step 7010, each of the plurality of private key segments may be received at the computer system.

In a step 7012, the computer system may be used to decrypt each of the plurality of private key segments.

In a step 7014, the computer system may be used to assemble each of the plurality of private key segments into one or more private keys.

In embodiments, the process depicted in FIG. 7 may further comprise the step of accessing, using the computer system, the one or more digital asset accounts associated with the one or more private keys. In further embodiments, the process depicted in FIG. 7 may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

Figure 8:
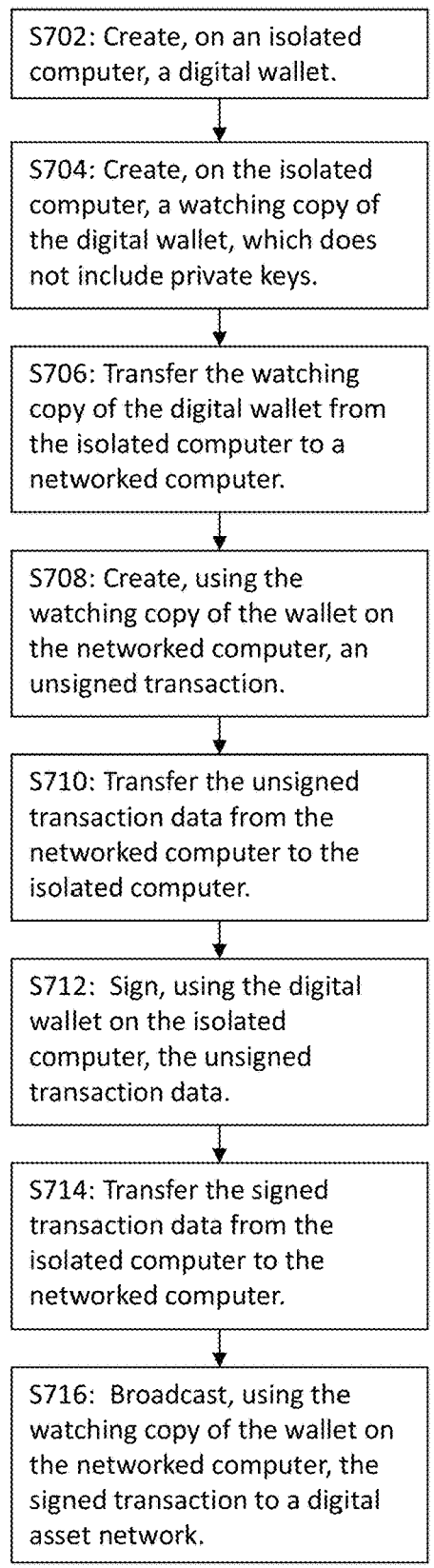
FIG. 8 is a flow chart of a method of performing a secure transaction in accordance with exemplary embodiments of the present invention.

FIG. 8 describes an exemplary method of performing secure transactions. In a step S702, a digital wallet may be created on an isolated computer. In a step S704, a watching copy of the digital wallet, which may not include any private keys, may be created on the isolated computer. In a step S706, the watching copy of the digital wallet may be transferred from the isolated computer to a networked computer. In a step S708, an unsigned transaction may be created using the watching copy of the wallet on the networked computer. In a step S710, data associated with the unsigned transaction may be transferred from the networked computer to the isolated computer. In a step S712, the unsigned transaction data may be signed using the digital wallet on the isolated computer. In a step S714, the signed transaction data may be transferred from the isolated computer to the networked computer. In a step S716, the signed transaction data may be broadcast, using the watching copy of the wallet on the networked computer, to a digital asset network. In embodiments, the broadcast of a signed transaction may complete a transaction and/or initiate a verification process that may be performed by the network.

In embodiments, processes for generating digital asset accounts and/or storing associated keys may be performed by a secure system, e.g., an administrative portal. The system can comprise an electronic isolation chamber, such as a Faraday cage. The system can further comprise one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier. The system can further comprise one or more writing devices located within the electronic isolation chamber and configured to perform the electronic writing instructions, including collating the plurality of cards into the plurality of sets. The system can also comprise one or more reading devices located within the electronic isolation chamber and configured to read the plurality of private key segments along with the respective associated reference identifier from the one or more cards. The reading devices may be used for quality control, to ensure that the cards are readable.

In embodiments, the security systems and methods described herein may be used, e.g., as security protocols, associated with various financial products, such as a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product.

Cold Storage

In embodiments, a digital asset account holder may operate one or more computers to manage, process, and/or store the transactions and/or digital assets. In embodiments, a portion, consisting of some or all, of the digital assets may be stored in cold storage, which involves no outside connections. Cold storage may be a bank vault, a precious metal vault, a lockbox, or some other secure room or area. There may be no communication channels connecting to the cold storage area. In embodiments, electronic vaults may be used. Electronic vaults may comprise cloud storage, one or more hard drives, flash drives, memory cards or like storage technology, to name a few. Electronic vaults may hold one or more keys and/or key segments, which may be encrypted and/or encoded as described herein.

In embodiments, the cold storage may comprise a divided storage system. In a divided storage system, components or portions of components may be stored at multiple locations. Components may be at least digital wallets, public and/or private keys, or assets.

Figure 9A:
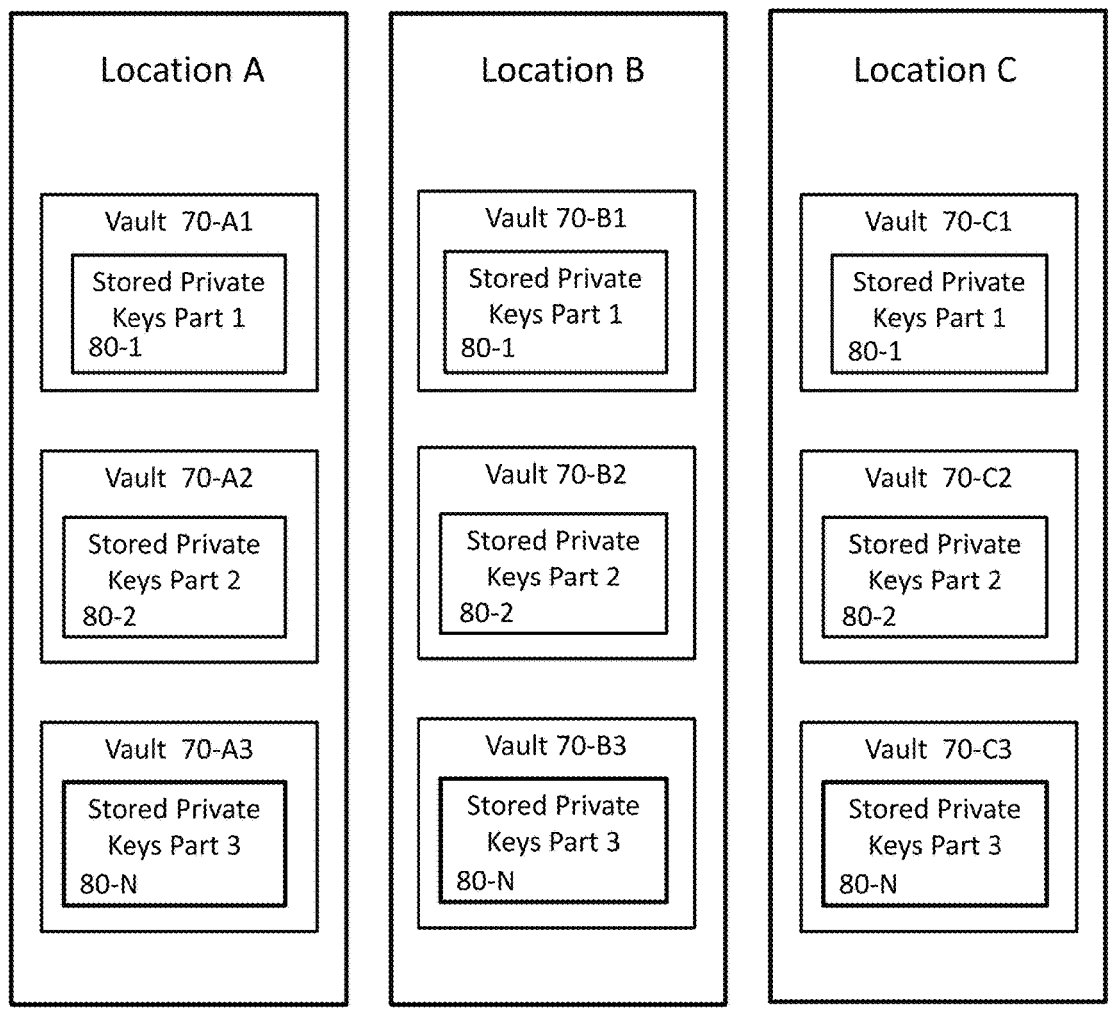
FIGS. 9A-9D are schematic diagrams of cold storage vault systems in accordance with exemplary embodiments of the present invention.

FIG. 9A is a schematic diagram of a cold storage vault system in accordance with exemplary embodiments of the present invention. In embodiments, each private key to be stored in vaults 70 for cold storage may be divided into one or more segments 80. In embodiments, each segment can be stored in a separate vault 70. In this manner, the risk of each of the segments 80 being reassembled into a complete key may be reduced due to the segregation of each piece of each key. Each vault may then be located at different locations, e.g., Locations A, B, and C. In embodiments, each vault (e.g., 70-Aa, 70-A2, 70-A3) may be located at different locations in the same general vicinity (e.g., the general vicinity of Location A, which may be New York City). Each vault may have a user entry log to provide a record of access to the vault and/or may employ security measures to ensure only authorized access.

Duplicate sets of the segmented private keys may then be made and stored in separate vaults (e.g., one duplicate copy divided between Vaults 70-B1, 70-B2, and 70-B3, and another duplicate copy divide between Vaults 70-C1, 70-C2, and 70-C3). Each set of segmented keys 80 may be located in the same general vicinity (e.g., Location B for Vaults 70-B1, 70-B2, and 70-B3 and Location C for Vaults 70-C1, 70-C2, and 70-C3), with each general vicinity being different from other general vicinities (e.g., Location B may be Philadelphia and Location C may be Indianapolis, Ind.). Locations may include domestic and/or international locations. Locations can be selected based on at least one or more of the following parameters: ease of access, level of security, diversity of geographic risk, diversity of security/terror risk, diversity of available security measures, location of suitable vaults in existence (e.g., custodian vaults for a trust associated with an ETP), space available at vaults, jurisdictional concerns, to name a few. In embodiments, three geographic locations can be used wherein Location A is within a short intraday time of transit (e.g., 1 hour), Location B is within a longer intraday time of transit (e.g., 3-4 hours), and Location C is within one or more day times of transit (e.g., 1-2 days). In embodiments, the location of the vaults may be within a distance that allows segments of key pairs to be retrieved within a redemption waiting period (e.g., 3 days). A complete key set (e.g., stored private keys parts 1-3) may be stored in each vault general location (e.g., Location A, Location B, Location C).

Figure 9B:
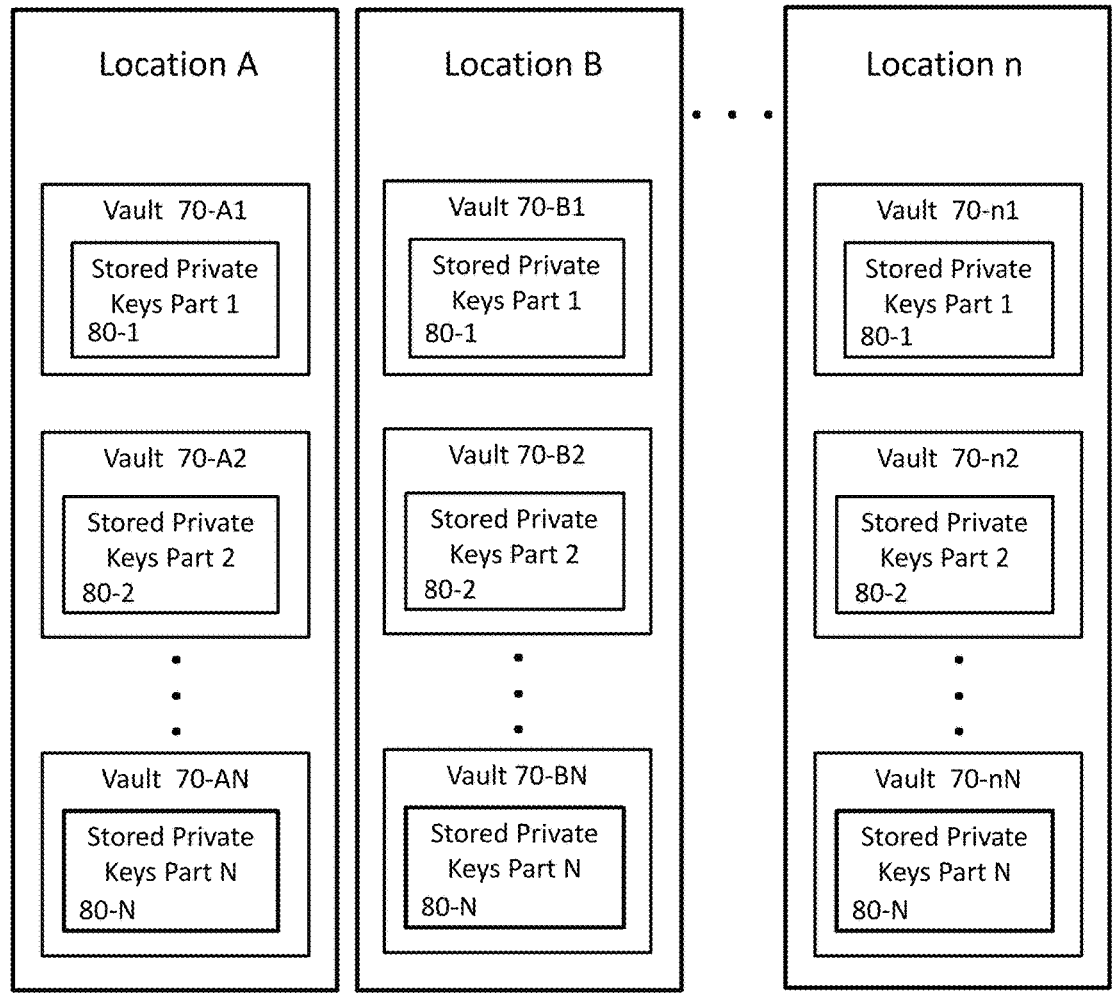

In FIG. 9A, three segments have been used, but other numbers of segments can also be used consistent with embodiments of the present inventions. FIG. 9B illustrates that any number of vault general locations (e.g., A-N) may be used, which may entail n number of complete key sets. In embodiments, the keys may be broken into any number of key segments, 1-N. In embodiments, in order to reassemble one complete key, all N segments may have to be reassembled together.

Figure 9C:
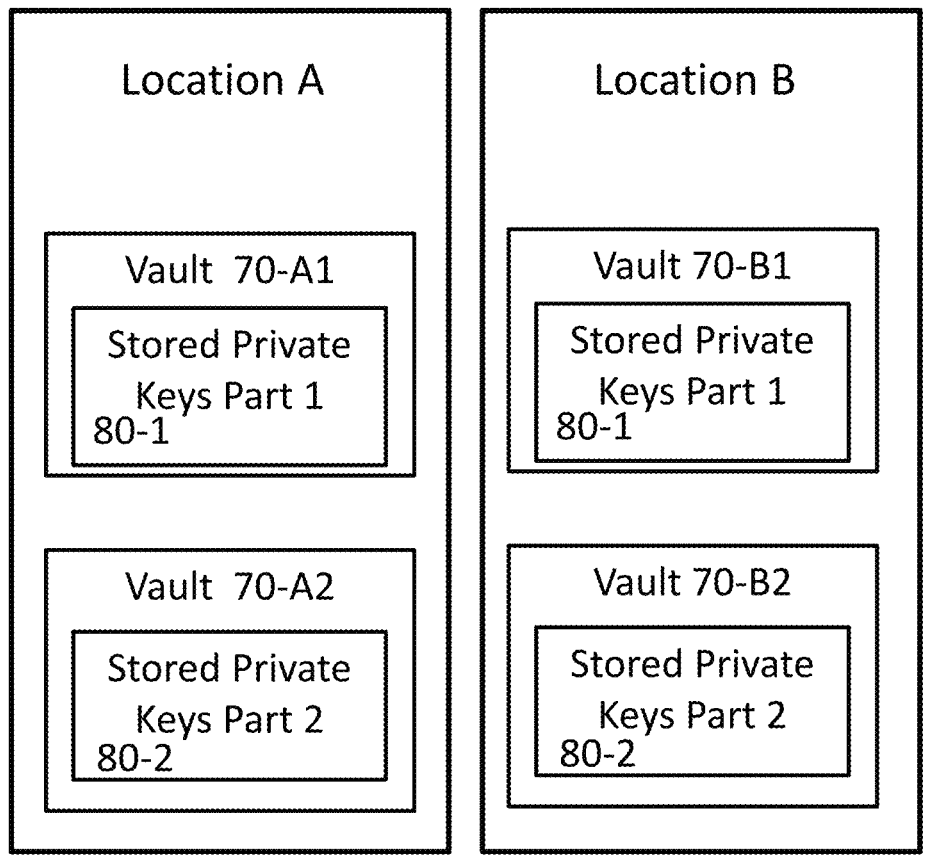

In embodiments, there may be two sets of segmented keys, as illustrated in FIG. 9C, which may be located in two general locations (e.g., A and B). In embodiments, the keys may be parsed into two segments (e.g., 80-1 and 80-2), as illustrated in FIG. 9C.

Figure 9D:
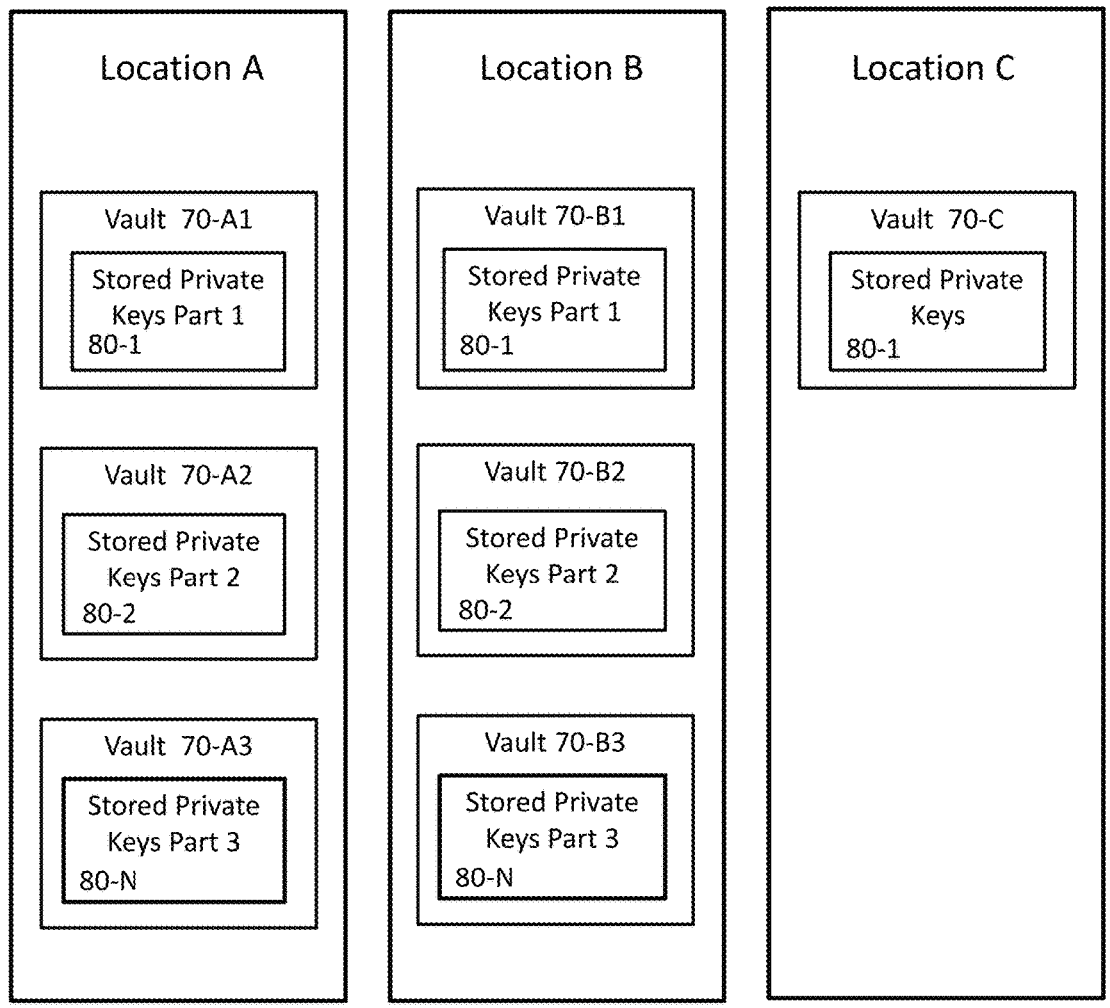

In embodiments, duplicate sets may not be embodied in same form as the original set and/or other duplicate sets. For example, two sets may be stored on paper, and a third set is stored on papyrus. In embodiments, at least one set of segmented keys can be stored on paper, while at least one set is stored on one or more disks, memory sticks, memory cards, tapes, hard drives, or other computer readable media. In embodiments, the same number of segments can be used for each set. In embodiments, a different number of segments can be used for at least two of the sets (e.g., 3 segments for 1 set, and 4 segments for 1 set). In embodiments, different types of coding and/or encryption can be used for at least two sets. FIG. 9D illustrates three sets of key copies, where the third copy 80 stored in vault 70-C may not be divided into segments. Such a key copy may be encrypted like any of the other key segments.

A cold storage back-up may be provided by a one-way electronic data recordation system. The system can function as a write-only ledger. Upon deposit of digital assets into cold storage, the corresponding private keys may be transmitted to the recordation system, which will store a record of the transaction. When digital assets are removed from a wallet, a record of the removal and/or wallet destruction can be sent to the system. In the event that wallet keys must be retrieved, the recordation system can be accessed to determine the wallet keys. Accessing the recordation system to retrieve keys can be designed to be a difficult operation, only to be performed in the event of an emergency need to recover wallet keys.

Key Storage Service

Digital asset storage services and/or digital asset protection may be provided in accordance with the present invention. Digital asset storage may use any of the secure storage systems and methods described herein, including those described with respect to a digital asset ETP. In embodiments, a digital asset storage service may be provided to other entities (e.g., a trust associated with an ETP, authorized participants in the trust, retailers, banks, or other digital asset users), to provide secure storage of digital assets. Such a storage service may use any of the security measures described herein. In embodiments, a digital asset storage service may comprise, form a part of, and/or be associated with a digital asset insurance system, as described herein.

Digital asset protection can be digital asset insurance and/or digital asset warranties. Digital asset insurance may be insured key storage, which may entail secure storage of one or more keys, such as private keys, where the secure storage service may guarantee the return of the stored private key and will pay out some amount if the key cannot be returned. In embodiments, a digital asset warranty can be a warranty against key loss, which may be a warranty against key loss by a digital asset storage service.

A digital asset storage service and/or a digital asset protection system may be associated with and/or accessed through one or more digital wallets. In embodiments, digital asset protection and/or storage services may only be available when using a particular digital asset wallet and/or when employing particular storage mechanisms or procedures. In embodiments, a digital wallet may provide an option to request and/or accept protection and/or an option to request and/or accept storage of one or more keys associated with the wallet. In embodiments, a wallet may prompt and/or require a user to store the private key of the wallet, e.g., using the secure digital asset storage service.

Figure 10A:
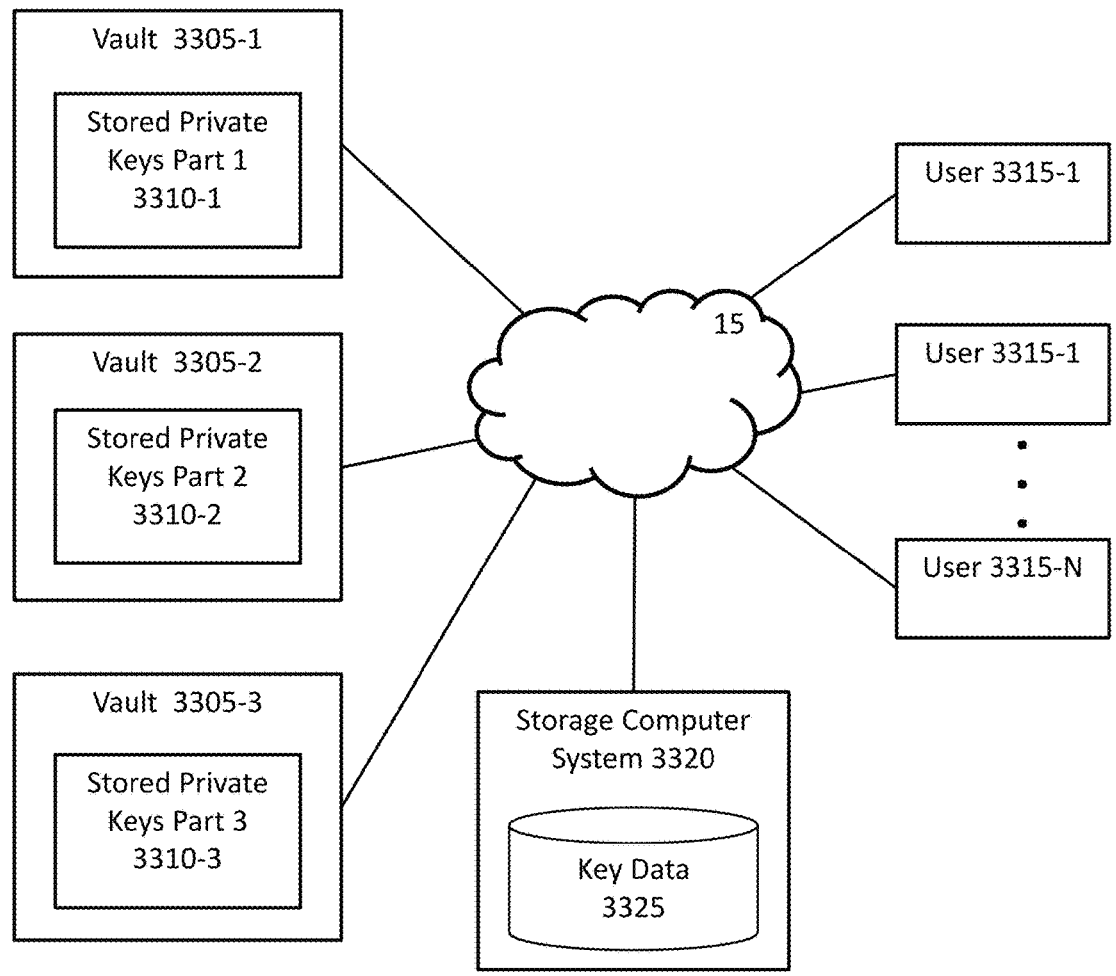
FIGS. 10A and 10B are schematic diagrams of vault arrangements for a digital asset network in accordance with exemplary embodiments of the present invention.

FIG. 10A illustrates an exemplary system for providing secure digital asset storage and/or protection. A storage computer system 3320 may store in computer-readable media or otherwise be connected to one or more databases containing data 3335 relating to one or more digital asset or key storage policies. In embodiments, data 3335 can also include information relating to a stored or insured digital wallet, such as public keys, public addresses, and/or key storage information, which may comprise identification codes or other indicators of where keys or key segments are stored. The storage computer system 3320 may store key data 3325 in internal or external computer-readable memory comprising one or more databases. Key data 3325 can include public key data, information identifying a key owner or wallet owner, information (e.g., an identifying code) identifying or correlating a wallet's keys or key segments, and/or information identifying location and/or retrieval information for stored keys or key segments, to name a few.

The exemplary system illustrated in FIG. 10A can include a plurality of secure storage locations, such as vaults 3305-1, 3305-2, and 3305-3. Private keys or key segments 3310-1,

3310-2, and 3310-3 may be stored in each vault in accordance with the secure storage systems and methods discussed herein, such as cold storage vaulting in different locations. Vaults may be connected to a network 15 at times and disconnected at other times. The network 15 may be any data network or a plurality of connected networks, internal, such as an intranet, or external, such as the Internet. A plurality of keys corresponding to a multi-key wallet may be stored in separate vaults. In embodiments, one or more keys may be divided into segments, which can be stored in separate vaults. Keys may be divided whether from single private key wallets or multi-key wallets.

One or more users 3315 may be, e.g., customers and/or claimants of a digital asset storage and/or protection system. Users 3315 may obtain key storage for one or more digital wallets containing digital assets in one or more denominations. Users 3315 may access or otherwise participate in a digital asset storage and/or protection system using one or more user device. In embodiments, the same digital wallet may be accessed from a plurality of user devices using the same key combinations (e.g., private and public keys).

Figure 10B:
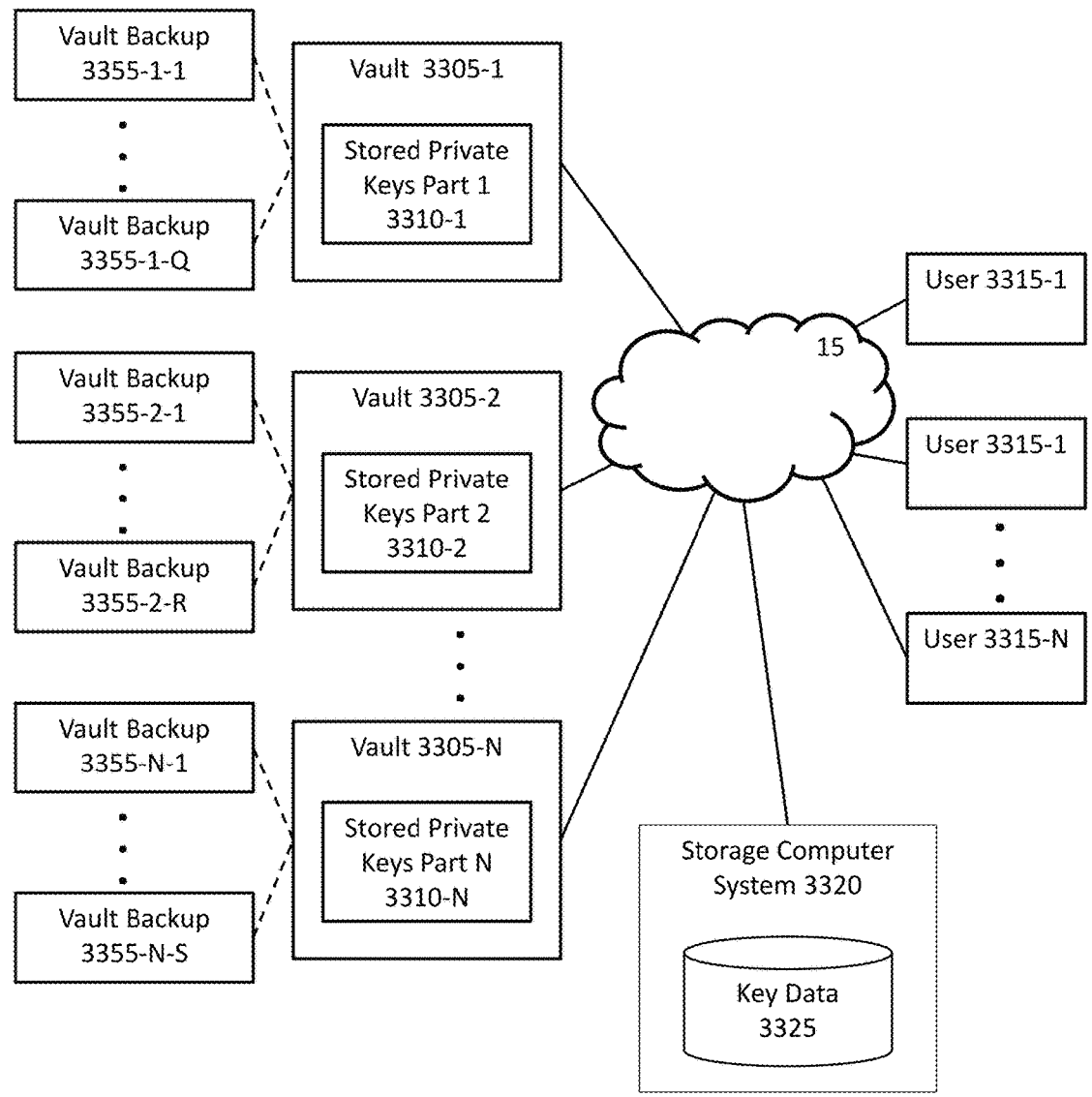

FIG. 10B shows another exemplary embodiment of a system for providing secure digital asset storage and/or protection. A plurality of vaults 3305-1 to 3305-N may be employed to store keys or key segments in segregated locations. In embodiments, vaults may be secure locations, such as safety deposit boxes, bank vaults, rooms with controlled access, to name a few. Vaults may be physical and/or electronic repositories for keys or key segments. In addition, each vault may have one or more backups 3355 (e.g., Q number of backups for vault 3305-1, R number of backups for vault 3305-2, and S number of backups for vault 3305-N). Vault backups may be other vaults or other secure storage facilities, units, or devices. Vault backups may utilize the same or different types of storage from each other and/or from the primary vault. For example, a primary vault may include printed paper copies of keys or key segments stored in a bank lockbox, while a backup may comprise an offline encrypted hard drive storing data corresponding to keys or key segments. Vault backups 3355 can be any of physical storage of printed or transcribed keys or key segments, remote cloud storage, hard drive, disk, CD, DVD, memory card, flash drive, tape drive, and/or tape library, to name a few.

Storage of Keys by a Digital Asset Storage Service

Figure 11A:
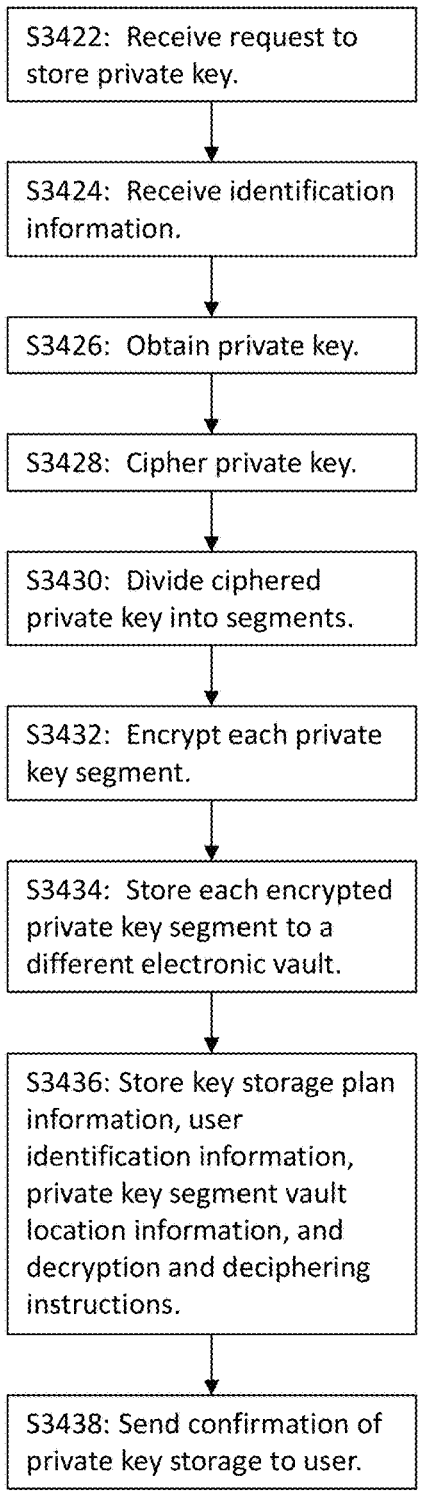
FIGS. 11A-11B are flow charts of processes for generating key storage and insurance in accordance with exemplary embodiments of the present invention.
Figure 11B:
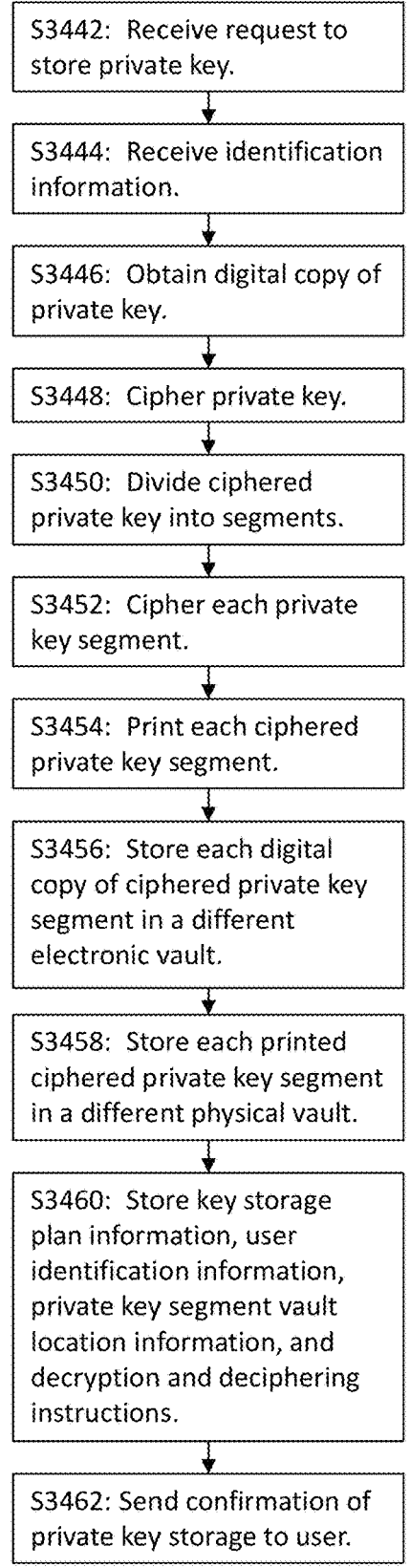

As discussed herein, a digital asset storage service may be provided to users of a digital asset network to provide secure storage of digital assets. In embodiments, the secure storage service may be used in conjunction with a digital asset protection plan, such as an insurance or warranty plan, although the storage service may also be used without insurance or warranties. FIGS. 11A-11B describe exemplary processes for storing private keys, which may be used solely as a key storage service or in conjunction with protection plans, such as insurance or warranty plans.

In embodiments, a user of a digital asset network may provide one or more keys or key segments to the key storage service for storage. Keys or key segments may be provided to the storage service via email or other electronic data transfer, any of which may be secure or otherwise encrypted. A user may use software to generate a wallet with one or more private keys and/or to divide the keys into segments. The software may include the ability to transmit, e.g., via a secure connection, the keys or key segments to the secure storage company. In embodiments, keys may be delivered to a key storage company in person, via mail, or via fax. Such keys may be stored in accordance with the secure and cold storage vault security mechanisms discussed herein, which may include dividing the keys into segments if not already divided.

Keys may also be generated at the secure storage company, e.g., at the secure storage site. Accordingly, a user may log into a website or otherwise connect to a portal for accessing wallet generation software. Such software may be running on one or more processors located at the secure storage company. The user may use the wallet generation software to create a wallet with one or more private keys. The user may also use such software to split one or more keys into key segments. Each key or key segment may then be printed, transcribed, or otherwise prepared for storage. In embodiments, the software may be programmed to transmit each key or key segment to a different printer, printing device, or electronic storage device, any of which may be located in different rooms, on different premises, in different geographies, and/or in separate vaults, to name a few. Thus, the key storage service may then store each key or key segment in separate locations, in accordance with the secure storage mechanisms discussed herein, such as the cold storage vault systems. Accordingly, the key storage company may never have access to an assembled key or to the required plurality of keys to a multi-key wallet.

Upon a user's request for retrieval of a stored key or keys, the secure key storage company may send to the user originals or copies, physically or electronically, of the keys or key segments. In embodiments, the key storage company may never reassemble keys or access a digital wallet itself. The secure key storage company may charge fees at setup and/or at retrieval, as well as recurring storage fees.

FIG. 11A describes an exemplary embodiment of a process for secure key storage and arranging for insurance or warranties against lost private keys, which process may be performed using a digital asset storage system, as discussed herein. The digital asset storage system may comprise and/or form a part of a digital asset protection system. FIG. 11A refers to the storage of private keys, but the process may apply to the storage of both private and public keys.

FIG. 11A is a flow chart of an exemplary process for securely storing private key information, which may be performed by a secure digital asset storage system. In a step S3422, a request to store a private key may be received at the secure digital asset storage system. In embodiments, such a request may comprise a request for insured private key storage. Such a request may originate from one or more other computers or electronic devices, such as a mobile phone, digital asset transaction kiosk, and/or personal computer, to name a few.

In a step S3424, a user may provide identification information, which may be received at the storage system Identification information may comprise any of a name, contact information (e.g., address, telephone number, e-mail address, to name a few), government ID information (e.g., an image of a driver's license, a driver's license ID number, a passport number, to name a few), biometric information (e.g., a voice sample, current photograph, eye scan, fingerprint, to name a few), username, password, and/or one or more security questions, to name a few. The identification information may be provided by and/or correspond to the requestor of private key storage and/or the private key owner. In embodiments, the digital asset insurance system may receive and/or store a user's identification information.

In a step S3426, the storage system may obtain a private key to be stored. The storage system may receive the key or fetch it, e.g., from a user electronic device, such as a mobile phone. In embodiments, the storage system may also obtain a public key to be stored.

In a step S3428, the storage system may cipher the private key, as described herein. In embodiments, the private key may not be ciphered before dividing it into segments. In other embodiments, the private key may be encrypted.

In a step S3430, the digital asset storage system may divide the ciphered private key into any number of segments. In the case of a multi-key wallet, the keys may not be divided into segments. However, keys to a multi-key wallet may be encrypted and/or ciphered.

In a step S3432, the storage system may encrypt each private key segment. In embodiments, encryption and/or ciphering may occur only before or only after dividing a key into segments. In embodiments, the key segments may not be encrypted after the segments are created. The key segments may be ciphered or not processed further.

In a step S3434, the storage system may transfer each encrypted private key segment to a different electronic vault for storage. In embodiments, the vaults may not be electronic, and the key segments may be printed or otherwise transcribed on a physical substrate and stored in the vaults. Any number of vaults may be used (e.g., one vault for each key segment, multiple vaults for redundant copies of each key segment, one or more vaults with two or more key segments stored together, to name a few). A code, such as a bar code or QR code, may be provided along with the key segments (e.g., printed with a physically transcribed copy of a key segment electronically saved with an electronic key segment, or appended to an electronic key segment, to name a few). The code may identify the key segments (e.g., which key segments are part of the same key) and/or the order of the key segments.

In a step S3436, the storage system may store, in one or more databases, key storage plan information (e.g., a subscription for key storage costing $1.99/month), user identification information, private key segment vault location information, and decryption and deciphering instructions. The databases may be computer-readable databases or physical (e.g., paper) databases that may be scanned and then read by one or more computers. In embodiments, the stored information may be sent to a user and/or an storage system administrative coordinator, which may be a computer that can handle retrieval of stored keys.

In a step S3438, the digital asset storage system may send confirmation of private key storage (e.g., over a data transfer network) to the user (e.g., requestor of private key storage or other person associated with the received identification information) and/or a third party. Confirmation of storage may be recorded by the storage system and/or another entity associated with the storage system.

FIG. 11B illustrates that physical back-ups of the secured private key may be employed by a secure digital asset storage system. In a step S3442, a request to store a private key may be received at the storage system.

In a step S3444, the storage system may receive user or digital wallet owner account identification information.

In a step S3446, the storage system may obtain (e.g., receive or fetch) a private key.

In a step S3448, the storage system may cipher the private key. In embodiments, no ciphering may occur before dividing the key into segments.

In a step S3450, the storage system may divide the private key (or ciphered private key) into segments.

In a step S3452, the storage system may cipher each private key segment.

In a step S3454, the storage system may print each ciphered private key segment. One or more copies of the key segments may be printed and/or otherwise transcribed onto any substrate and/or multiple substrates (e.g., paper, plastic, metal, to name a few). A code, such as a QR code or bar code, may be used to identify corresponding key segments and/or the order of the key segments. Such a code may be printed or otherwise provided with the key segments.

In a step S3456, the digital asset storage system may store each ciphered private key segment, as discussed herein. The key segments may be stored in electronic vaults (e.g., hard drives, tape drives, solid state memory, to name a few). Separate vaults may be used for each key segment, although multiple key segments corresponding to multiple different private keys may be stored in the same vault.

In a step S3458, the storage system may store each printed key segment in a physical vault, which may be separate vaults for each key segment.

In a step S3460, the storage system may store, in one or more databases, key storage plan information, user identification information, private key segment vault location information, deciphering instructions, and decryption instructions, where applicable.

In a step S3462, the storage system may send confirmation of private key storage to the user.

Recovering Stored Keys from a Digital Asset Key Storage Service

A user of a secure storage service or system may request access to a stored key, which may be a means of recovering a lost key.

Figure 12A:
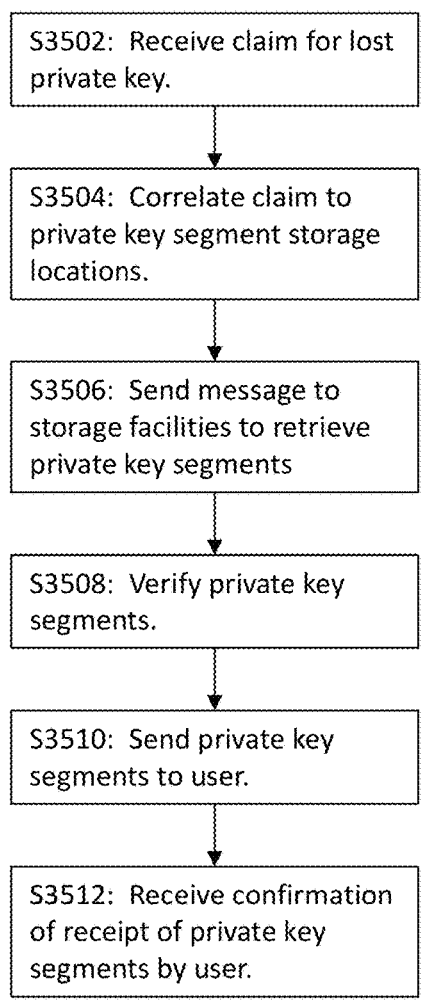
FIGS. 12A-12C are flow charts of processes for recovering key segments in accordance with exemplary embodiments of the present invention.

FIG. 12A is a flow chart describing an exemplary process for recovering a key, which may be performed by one or more computers. In embodiments, the process may entail recovering (e.g., retrieving from storage) a plurality of keys or key segments.

In a step S3502, a user may submit a claim for a lost private key, which may be received by a computer system of a secure storage service storing a copy of the user's private key. A claim may be a request for retrieval of one or more stored keys.

In a step S3504, the storage system, using the computer system, may correlate the received claim to one or more locations where private key segments are stored. For example, the computer system may access a database of policy information to determine where (e.g., in which vaults) a claimants keys or key segments are stored.

In a step S3506, a message, which may constitute instructions, may be transmitted to one or more storage facilities to retrieve the private key segments. A computer system may automatically generate such a message based upon the information pertaining to stored keys or key segments. Such a key retrieval message can include a security code or other authorization to access a secure storage location. In embodiments, the computer system may employ security measures, such as a secure code or digital signature, to provide verification and/or authentication of a retrieval message.

In a step S3508, the private key segments may be verified. Keys or key segments may be retrieved from their respective storage locations. Quality control measures may verify that the correct key segments were retrieved and/or that the keys or key segments are readable, e.g., by a specially programmed scanning device, such as a QR scanner.

In a step S3510, the private key segments may be transmitted to a device and/or account corresponding to the user. One or more secure transmissions may be used. Two-factor authentication may be required of the recipient before a transmission is sent and/or opened by the recipient. In embodiments, the system may decrypt, reassemble, and/or decipher private keys and/or key segments before returning the keys and/or key segments to a user. In embodiments, a user may be provided with the option of having the system perform the decrypting, reassembling, and/or deciphering steps. In embodiments, software may be provided to a user to enable such steps to be performed by a user or under a user's control. In embodiments, the computer system may never decrypt keys or key segments that were encrypted by a user. Accordingly, in step S3510, the user may be provided with key segments and/or reassembled keys, which may be in various states of security (e.g., ciphered, segmented, and/or encrypted).

In a step S3512, the system may receive confirmation that the user received the private keys or key segments. A user device may automatically generate and/or transmit a confirmation upon receipt of the keys or key segments, upon reassembling thereof, upon opening a corresponding digital asset wallet, or upon instruction for a user, to name a few. Such confirmation may provide an indication that the secure storage service and/or protection service met its obligation, e.g., to the customer.

Figure 12B:
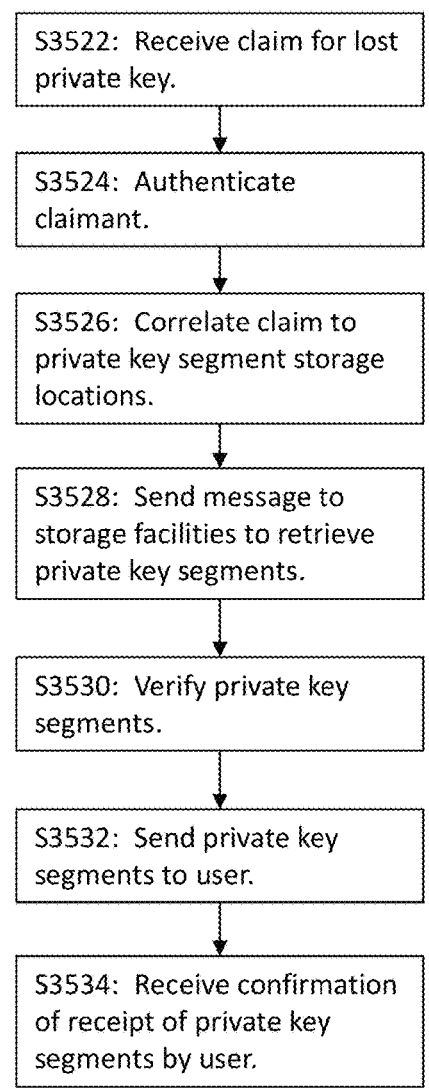

FIG. 12B illustrates another exemplary process for recovering a key. Such process may be performed by one or more computers. The process may be considered the same as the process of FIG. 12A, except with the addition of a user authentication step S3524.

Thus, in a step S3522, a user may submit a claim for a lost private key, which may be received by a secure storage service storing a copy of the user's private key.

In a step S3524, the secure storage system may authenticate the identity of the claimant. Authentication may involve any of receipt of any of a user's identification information, such as name, username, password, biometric information, or the like. In embodiments, three forms of identification information may be required. In embodiments, a claimant may receive a phone call, which may be auto-generated and auto-executed by the system, which may provide the claimant with a code to input at a user device. In embodiments, the user may be required to repeat a phrase, which may be a unique phrase. Voice analysis and/or recognition techniques may be employed. The user may be required to submit a current picture or video. The system may compare the received identification information to a database of authorized user identification information in order to authenticate the identity of the claimant.

In a step S3526, the system may correlate the received claim to one or more locations where private key segments may be stored.

In a step S3528, a message, which may constitute instructions, may be transmitted to one or more storage facilities to retrieve the private key segments.

In a step S3530, the private key segments may be verified.

In a step S3532, the private key segments may be transmitted to a device and/or account corresponding to the user. In embodiments, decryption, reassembly, and or deciphering of private keys and/or key segments may occur before or after returning the keys and/or key segments to a user and may be performed by the system or by a user, who may use software provided by the system.

In a step S3534, the system may receive confirmation that the user received the private key segments.

Figure 12C:
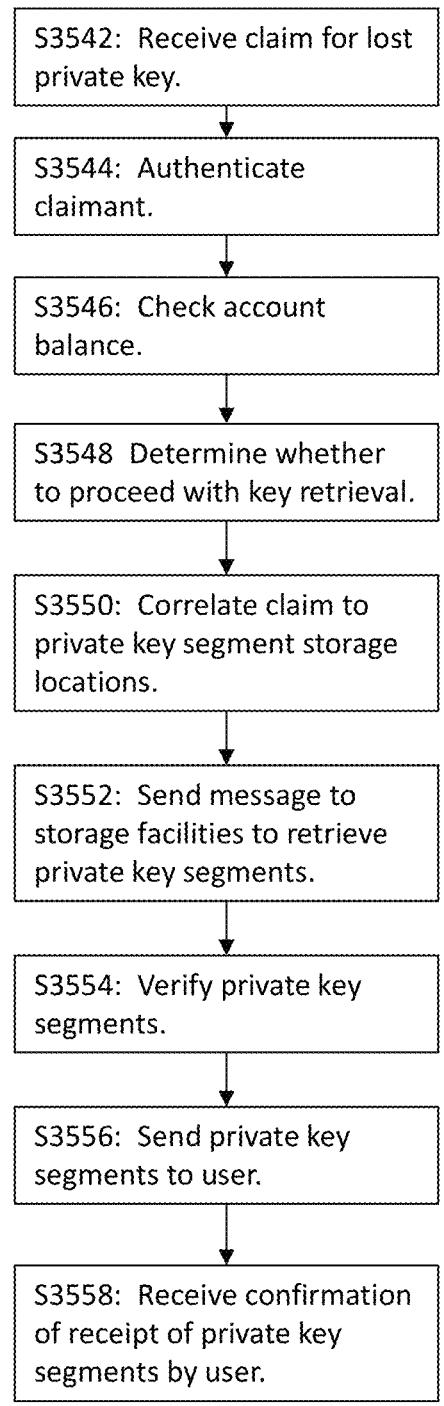

Another exemplary process for recovering a key is provided in FIG. 12C. Such process may be performed by one or more computers. The process may be considered the same as the process of FIG. 12B, except with the addition of steps to check the account balance of the account and a determination step of whether to proceed with the key retrieval.

Thus, in a step S3542, a user may submit a claim for a lost private key, which may be received by a secure storage service storing a copy of the user's private key.

In a step S3544, the secure storage system may authenticate the identity of the claimant, in manners described for step S3524 of FIG. 12B.

In a step S3546, the system may check the account balance of the account.

In a step S3548, the system may determine whether to proceed with the requested key retrieval. In embodiments, retrieval may be halted if an account balance is above a threshold or below a threshold.

In a step S3550, the system may correlate the received claim to one or more locations where private key segments may be stored.

In a step S3552, a message, which may constitute instructions, may be transmitted to one or more storage facilities to retrieve the private key segments.

In a step S3554, the private key segments may be verified.

In a step S3556, the private key segments may be transmitted to a device and/or account corresponding to the user of the account. In embodiments, decryption, reassembly, and or deciphering of private keys and/or key segments may occur before or after returning the keys and/or key segments to a user and may be performed by the system or by a user, who may use software provided by the system.

In a step S3558, the system may receive confirmation that the user received the private key segments.

ETP

In embodiments, an ETP can be provided using a digital math-based asset, such as bitcoins, Namecoins, Litecoins, PPCoins, Tonal bitcoins, IxCoins, Devcoins, Freicoins, I0coins, Terracoins, Liquidcoins, BBQcoins, BitBars, and PhenixCoins, to name a few. An ETP may be a special purpose entity, statutory trust, business trust, or other corporate form established under the laws (e.g., of a state of the United States) that continuously issues and/or redeems its shares in exchange for a portfolio of specified assets, such as digital assets, currencies, physical commodities, securities and/or other assets. The ETP may issue equity securities which it may register with the US Securities and Exchange Commission. The ETP may list the equity securities for trading in the secondary market at intraday prices on a stock exchange. Each issued share of an ETP may represent a ratable undivided interest in its underlying portfolio of assets. In embodiments, shares of an ETP may be created only in large blocks or lot sizes, such as creation units. In embodiments, only large market participants may be authorized participants ("APs") who may obtain creation units in exchange for a deposit of a specified amount of assets into the ETP's portfolio. APs may hold or sell into the secondary market the individual shares comprising the creation units issued.

In embodiments, an AP can be a person or entity who is a registered broker-dealer or other securities market participant such as a bank or other financial institution which is not required to register as a broker-dealer to engage in securities transactions, is a participant in a third-party clearing agency, such as the DTC, has entered into an Authorized Participant Agreement with the trustee and the sponsor, and/or has established an AP custody account. In embodiments, only APs may place orders to create or redeem one or more baskets of trust shares. For example, a basket of shares can be a block of 10,000 shares, 20,000 shares, 30,000 shares, 40,000 shares, 50,000 shares, 75,000 shares, 100,000 shares, and/or some other denomination of shares.

In embodiments, an Authorized Participant Agreement can be an agreement entered into by an AP, the sponsor and/or the trustee which provides the procedures for the creation and redemption of baskets of trust shares and for the delivery of the digital math-based assets, e.g., bitcoins, Namecoins, Litecoins, PPCoins, Tonal bitcoins, IxCoins, Devcoins, Freicoins, I0coins, Terracoins, Liquidcoins, BBQcoins, BitBars, and PhenixCoins, required for such creations and redemptions.

In embodiments, an AP custody account can be a segregated account for digital math-based assets, e.g., a segregated bitcoin account, owned by an AP and established with the trustee and/or custodian by an Authorized Participant Custody Account Agreement. An AP custody account can be used to facilitate the deposit and withdrawal of digital math-based assets, such as bitcoins, Namecoins, Litecoins, PPCoins, Tonal bitcoins, IxCoins, Devcoins, Freicoins, I0coins, Terracoins, Liquidcoins, BBQcoins, BitBars, and PhenixCoins, to name a few, by an AP in creation and redemption processes, as discussed herein by way of example with respect to FIGS. 17A-B and 19A-C.

In embodiments, an Authorized Participant Custody Account Agreement can be the agreement between an AP and the trustee which can establish an AP custody account.

In embodiments, in order to initiate the issuance of shares, an AP may place a creation order with the trustee and/or administrator of the ETP. Upon the trustee's acceptance of the order, the trustee and/or administrator, using the trust computer system, may notify the AP of the exact amount or quantity of portfolio assets that is required to be deposited into the ETP's account in exchange for one or more creation baskets, which are valued at their current net asset value. In embodiments, the trustee and/or administrator may hold the ETP's portfolio assets on behalf of all shareholders. In embodiments, the trustee and/or administrator may be authorized to make transfers from the trust account to third parties only under certain specific circumstances, such as to pay for the ETP's permitted operational expenses or to redeem creation units tendered for redemption by an AP. A redemption of creation units may be the reverse of a creation; the AP may place a redemption order with the trustee. Upon the trustee's and/or administrator's acceptance of the order, the AP may tender to the trustee the stated number of creation units for redemption and in exchange may receive the pro rata amount or quantity of portfolio assets represented by such shares. The trustee and/or administrator may then cancel and/or instruct a third party clearing agency (e.g., DTC) to cancel all shares comprising the creation units so delivered. This continuous issuance and redemption feature of an ETP provides an arbitrage mechanism for APs, who may either create or redeem creation units when the current trading price of the individual shares on the secondary market deviates from the underlying net asset value of such creation units, thereby reducing such deviation between the trading price and the underlying net asset value.

In embodiments, the trust may have an investment objective for shares to reflect the performance of a blended price of digital math-based assets, e.g., a blended bitcoin price of bitcoins, less expenses of the trust's operations. The shares can be designed for investors who want a cost-effective and convenient way to invest in digital math-based assets with minimal credit risk.

In embodiments, the trust can directly hold digital math-based assets, such as bitcoins, Namecoins, Litecoins, PPCoins, Tonal bitcoins, IxCoins, Devcoins, Freicoins, I0coins, Terracoins, Liquidcoins, BBQcoins, BitBars, and PhenixCoins, using the trust's hardware and/or software security system, which in embodiments may include storage of the trust's digital assets and/or the private keys relating to the digital wallets holding the trust's digital assets in one or more locations in, for example, high security vaults.

In embodiments, the trust may hold any combination assets, including digital math-based assets, physical commodities, securities and/or other assets. A trust agreement may specify and/or limit which assets a particular trust may hold.

ETP Participants

Figure 13:
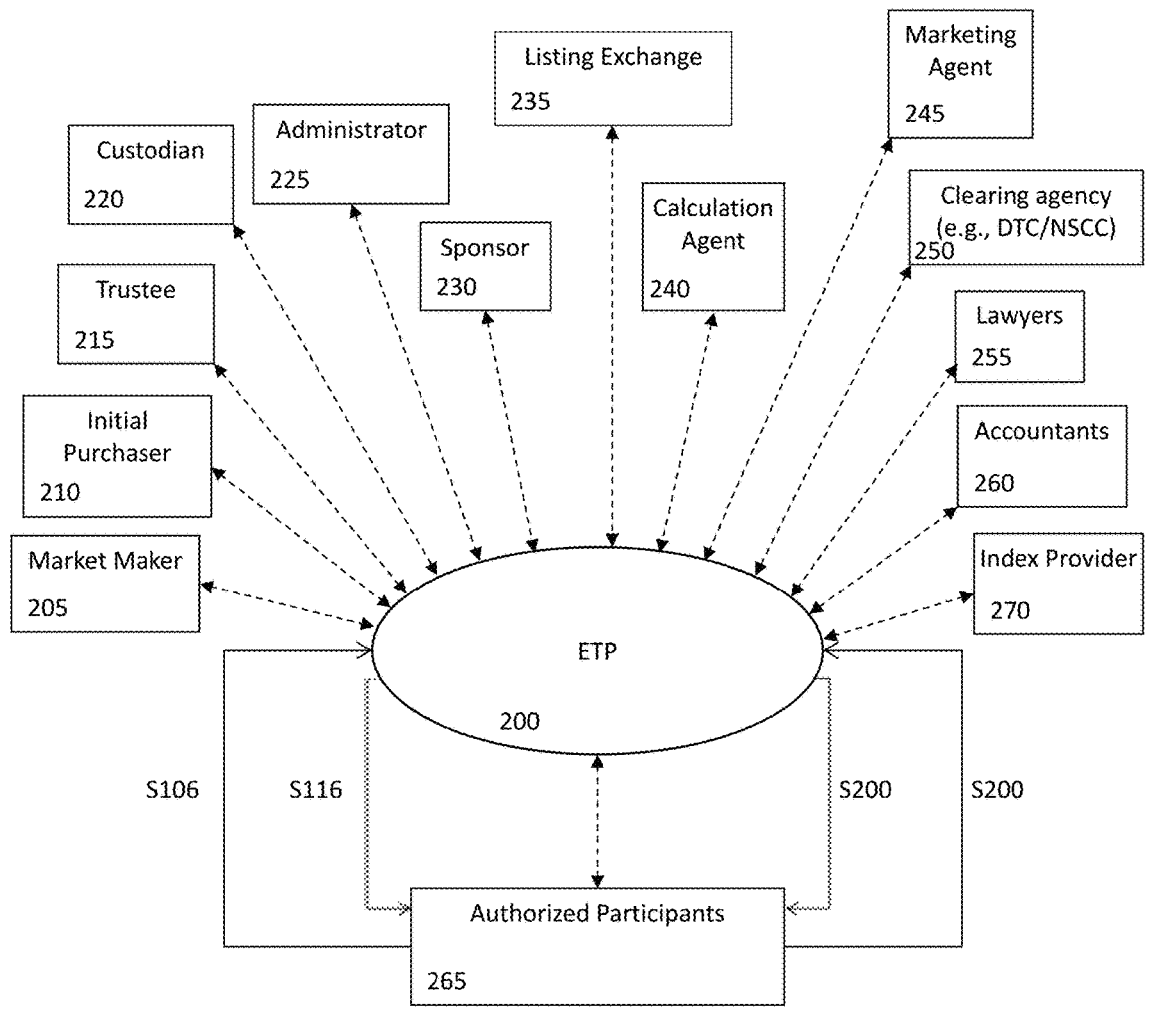
FIG. 13 is a schematic diagram of the participants in an ETP holding digital math-based assets in accordance with exemplary embodiments of the present invention.

As illustrated in FIG. 13, in exemplary embodiments, an ETP may include one or more participants, such as one or more market makers 205, purchasers 210, trustees 215, custodian 220, administrator 225, sponsor 230, listing exchange 235, calculation agent 240, marketing agent 245, third-party clearing agency 250 (e.g., the DTC or NSCC), attorneys 255, accountants 260, and/or authorized participants 265, to name a few. In embodiments, one or more of these roles may be performed by the same entity (e.g., the same entity may be the custodian and the administrator). In embodiments, more than one entity may perform the same role or part of a role, such as more than one market maker may be used for the same ETP. Various combinations of entities can be used consistent with exemplary embodiments of the present invention.

In embodiments, an ETP may involve an underlying trust and one or more of the entities discussed herein. FIG. 13 provides an overview of at least some of the possible participants in an ETP. A sponsor 230 may establish the ETP, which generally may be established as a common law or statutory trust under state law. One trust may be created or multiple trusts for different ETPs may be established at one time. A single trust established as a series trust may also create multiple series for different ETPs. The sponsor 230 may have contractual rights involving the trust. The sponsor 230 may pay SEC registration fees and may provide seed capital for the trust, to name a few. Additionally, the sponsor 230 may prepare, sign, and/or file trust registration statements and/or other formation documents, periodic SEC reports, and/or registration statement updates. The sponsor 230 may create free-writing prospectuses and other promotional materials about the trust and may file such materials with the SEC, as required by government regulation. The sponsor 230 may participate in marketing activities for the trust, such as road shows. The sponsor 230 may maintain the trust's public website for viewing by the holders of the trust's securities, prospective purchasers of its shares, and/or any entity desirous of viewing the trust's public website.

An initial purchaser 210 may provide seed capital to the trust in exchange for a set number of creation units of the same value. A market maker 205 may undertake to buy or sell creation units in the trust at specified prices at all times.

A custodian 220 can safe keep the trust's assets and can engage one or more sub-custodians to do so in different locations. In embodiments, the one or more sub-custodians may comprise different entities. In embodiments, the one or more sub-custodians may comprise different aspects of the same entity or may be affiliated entities. A custodian 220 may hold copies of segmented private keys in one or more vaults.

An administrator 225 can keep books and records for the trust, conduct other ministerial duties and/or may calculate the trust's daily net asset value, daily share price, and/or other pertinent information about the trust, the trust's assets, and/or the trust shares.

The trustee 215, the custodian 220 and/or the administrator 225 may be the same person or entity, may be different operations of the same person or entity, may be different persons or entities, or may be multiple persons or entities performing the same and/or overlapping functions.

A listing exchange 235 is a venue where shares registered with the SEC may be listed and traded during business days. The listing exchange 225 can track using one or more computers and publish electronically using one or more computers an estimated intraday indicative value ("IIV") of a trust regularly, e.g., every 15 seconds. A calculation agent 240 using one or more computers may also perform daily calculations of trust assets using methods known in the art and may provide the IIV. The trustee 215 and/or the administrator 225 may also serve as the calculation agent 240 and may be the same person and/or entity, different operations of the same person and/or entity, and/or may be different persons.

A marketing agent 245 may also be engaged to provide services to the trust relating to the public marketing of its shares for sale. The marketing agent 245 may review marketing documents for regulatory compliance, e.g., rules of the Financial Industry Regulatory Authority ("FINRA") and/or relevant regulatory authority. The marketing agent may file the trust's marketing materials with FINRA and/or relevant regulatory authority.

The processes of clearance and settlement of trust shares may be performed by a clearing agency or a registered third-party entity 250, such as the Depository Trust Company ("DTC") and/or the National Securities Clearing Corporation ("NSCC"). Shares may be available only in book-entry form, meaning that individual certificates may not be issued for the trust's shares. Instead, shares may be evidenced by one or more global certificates that the trustee may issue to a clearing agency or a registered third-party entity 250, e.g., DTC. The global certificates may evidence all of the trust's shares outstanding at any time. As a result, in embodiments, shares may be only transferable through the book-entry system the third-party clearing agency 250. Shareholders may hold and/or transfer their shares directly through the third-party clearing agency 250, if they are participants in the clearing agency 250, or indirectly through entities that are participants in the clearing agency 250 (e.g., participants in DTC). Transfers may be made in accordance with standard securities industry practice.

An index provider 270 may license its intellectual property to the trust for pricing, portfolio selection, and/or other services, and may, using one or more computers, calculate and/or upkeep the index during the term of the license. In embodiments, for example, an index of digital asset values (such as bitcoin values) or blended digital asset prices (such as blended bitcoin prices) may be used to price the digital assets transferred to and/or from the trust and/or held by the trust. Other forms of valuation of the digital assets (such as bitcoins) can also be used as discussed herein.

Lawyers 255 and accountants 260 may provide services to the sponsor 230 and/or the trust and/or other participants in the trust.

In embodiments, transactions with the trust may be restricted to one or more APs 265. The trust may establish requirements for becoming an AP, e.g., must be an entity of a certain size, financially or otherwise, must be a large market investor, like a broker-dealer and/or a bank, must seek and obtain formal approval from the trustee, must enter into an agreement with the trustee and/or other such requirements known in the art, to name a few. In embodiments, APs may be broker-dealers and/or banks. APs may enter into an AP agreement with the trust and/or the sponsor 230, which may include rules for the issuance and/or redemption of creation units. Depending on the nature of the trust's intended assets, an AP may be required to hold and deliver specific commodities, e.g., a digital math-based asset, directly to the trust.

In embodiments, a trustee 215 may be generally responsible for the day-to-day administration of the trust. A trustee 215 (or its designee, such as the custodian 220 and/or administrator 225) may perform one or more of the following tasks associated with the trust:

establishing and/or having established, using one or more computers, wallets for digital math-based assets (e.g., bitcoins, Namecoins, Litecoins, PPCoins, Tonal bitcoins, IxCoins, Devcoins, Freicoins, I0coins, Terracoins, Liquidcoins, BBQcoins, BitBars, and PhenixCoins, to name a few) to be used by the trust associated with an ETP holding such digital math-based assets (e.g., bitcoins, Namecoins, Litecoins, PPCoins, Tonal bitcoins, IxCoins, Devcoins, Freicoins, I0coins, Terracoins, Liquidcoins, BBQcoins, BitBars, and PhenixCoins, to name a few);

establishing and/or having established, using one or more computers, digital wallets for custody and other accounts to be used on behalf of participants in the trust, e.g., AP custody accounts 315, sponsor custody accounts 310, trust custody accounts 300, trust expense account 305, and/or vault accounts 320, to name a few;

transferring and/or having transferred, using one or more computers, digital math-based assets from and/or to one or more digital wallets associated with one or more digital wallets associated with one or more accounts, including AP custody accounts 315, trust custody accounts 300, trust expense accounts 305, sponsor custody account 310, and/or vault accounts 320, to name a few;

determining and/or having determined, using one or more computers, expenses and fees to be paid by the trust, including, e.g., sponsor fees, legal fees, accounting fees, extraordinary expenses fees, and/or transaction fees, to name a few;

paying and/or having paid, using one or more computers, expenses and fees to be paid by the trust, including, e.g., sponsor fees, legal fees, accounting fees, extraordinary expenses, and/or transaction fees, to name a few;

calculating or having calculated, using one or more computers, an ANAV, an ANAV per share, a NAV, and/or a NAV per share;

receiving and/or processing, using one or more computers, orders from APs to create and/or redeem creation units and/or baskets and/or coordinating the processing of such orders with a clearing agency or a registered third-party entity 250;

transferring and/or having transferred and/or facilitating transfers, using one or more computers, of digital math-based assets of the trust as needed into and/or out of custody accounts and/or vault accounts to cover redemptions and/or to pay expenses and fees to be paid by the trust, including, e.g., sponsor fees, legal fees, accounting fees, extraordinary expenses fees, and/or transaction fees, to name a few;

selling and/or arranging for sale remaining digital math-based assets of the trust at termination of the trust and/or distributing the cash proceeds to the shareholders of record;

supervising and/or arranging for the supervision of the safekeeping of the digital math-based assets deposited with the trust by APs in connection with the creation of creation units and/or baskets;

administering and/or having administered and/or maintaining and/or having maintained custody accounts on behalf of the trust, APs, the sponsor and/or others;

administering and/or having administered and/or maintaining and or having maintained and/or supervising the maintenance, upkeep and/or transfer of private key information to and/or from vaults; and/or generating and/or having generated, using one or more computers, encryption, splitting, QR coding (or other bar coding) and printing the paper tokens, to name a few.

As described in greater detail herein with respect to FIGS. 5 and 17, an AP may provide assets to the trust in exchange for shares in the trust, and an AP may redeem shares in the trust for assets.

Secondary Market Activities

Figure 14:
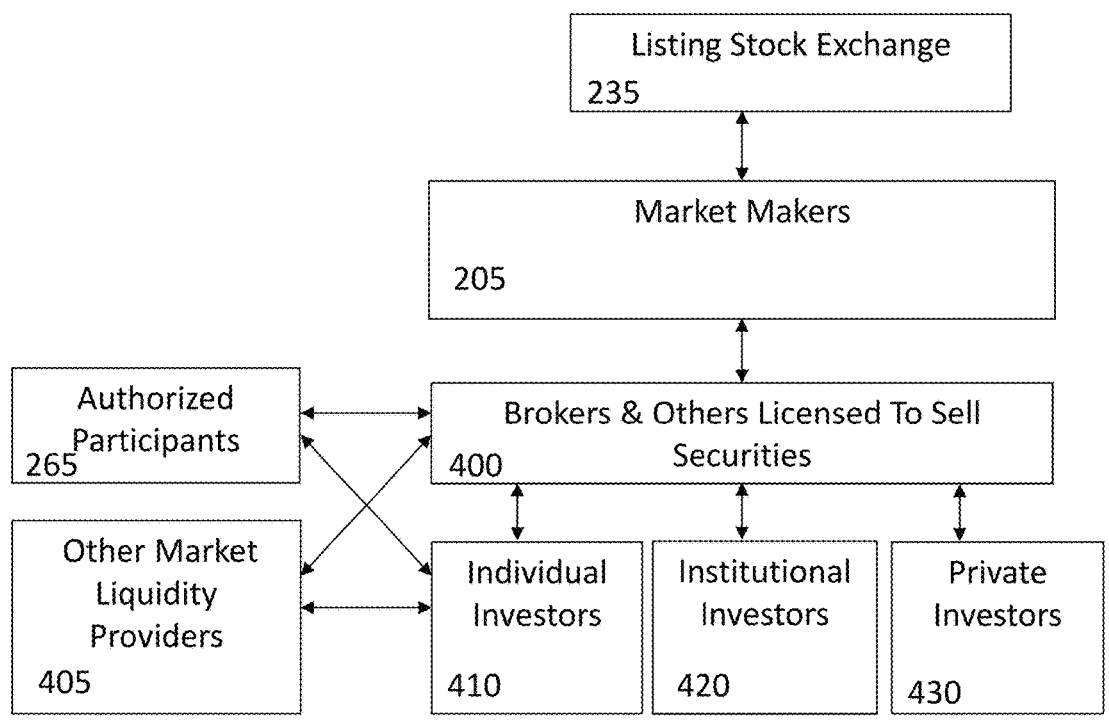
FIG. 14 is a schematic diagram of an exemplary secondary market for shares in the trust in accordance with exemplary embodiments of the present invention.

FIG. 14 is a schematic diagram of an exemplary secondary market for shares in the trust in accordance with exemplary embodiments of the present invention. In embodiments, the secondary market can include one or more listing stock exchanges 235 (e.g., NYSE, NASDAQ, AMEX, LSE, to name a few), one or more market makers 205, one or more brokers and/or other licensed to sell securities 400, authorized participants 265, other market liquidity providers 405, individual investors 410, institutional investors 420 and private investors 430, to name a few.

As described earlier, in the primary market APs 265 may obtain and/or redeem shares in the trust through the creation and redemption redeem processes. APs 265 may then sell shares in a secondary market. APs 265 may also buy shares in the secondary market. In an exemplary secondary market for shares in the trust for a digital math-based asset ETP, e.g., a Bitcoin ETP, a listing stock exchange 235 may be the primary listing venue for individual ETP shares. In embodiments, the listing stock exchange 235 may be required to file listing rules with the SEC if no applicable listing rules already exist. The listing exchange 235 may enter into a listing agreement with the sponsor 230. In embodiments, the listing exchange 235 may appoint the lead market maker and/or other market makers 205. The market makers 205 may facilitate the secondary market trading of shares in the trust underlying the ETP. Market makers 205 may facilitate creations and/or redemptions of creation units through one or more APs. In embodiments, such creations and/or redemptions may be related to market demand, e.g., to satisfy market demand.

Still referring to FIG. 14, individual investors 410, institutional investors 420, and/or private investors 430 may buy and/or sell one or more shares in the trust. In embodiments, these investors may buy and/or sell shares through brokers 400 or others licensed to sell securities. Brokers 400 and/or others licensed to sell securities may receive cash and/or other assets from investors in order to buy one or more shares in the trust. Brokers 400 and/or others licensed to sell securities may receive one or more shares from investors to sell for cash and/or other assets.

Other market liquidity providers 405 may also participate in the secondary market. In embodiments, other market liquidity providers 405 may buy and/or sell one or more shares on a list stock exchange 235. In embodiments, other market liquidity providers 405 may buy and/or sell one or more creation units through one or more APs 265. Other market liquidity providers 405 may include, by way of example, arbitragers, prop traders, "upstairs", private investors, dark pools, to name a few.

ETP Setup

In an exemplary embodiment, the ETP may be based on an ownership stake in a digital asset investors trust, such as a Bitcoin investors trust. A trust may be created as a common law trust or a statutory trust that may elect, grantor trust status. It will be appreciated by those in the art that other forms of trust are possible, including but not limited to master trusts, owner trusts, and revolving asset trusts. Such a trust may register its shares with the SEC under the Securities Act of 1933, as amended, to sell shares to the public. A trust may hold portfolio assets that may require the sponsor or administrator of the trust to register as a commodity pool operator under the Commodity Exchange Act with the U.S. Commodity Futures Trading Commission ("CFTC").

In embodiments, the trust's assets may be digital math-based assets, such as bitcoins, held in one or more digital wallets maintained by and/or for the trustee 215. Other forms of asset storage and security are discussed herein. In embodiments, the trust assets can include other forms of digital math-based assets, such as other forms of digital assets, digital math-based assets, peer-to-peer electronic cash system, digital currency, synthetic currency, or digital crypto-currency. Exemplary digital assets can include bitcoins, Namecoins, Litecoins, PPCoins, Tonal bitcoins, IxCoins, Devcoins, Freicoins, I0coins, Terracoins, Liquidcoins, BBQcoins, BitBars, and PhenixCoins, to name a few. In embodiments, the trust's assets can include additional assets besides digital math-based assets, such as, other commodities, currencies, futures, derivatives, and/or securities, to name a few.

The trust's assets may be held in various forms of storage using any of the security systems and methods described herein. In embodiments, the trust may employ a hardware and/or software security system to protect the digital math-based assets, such as bitcoin assets. In embodiments, the trustee 215, the administrator 225, the custodian 220, and/or some other entity may perform operations related to creations and redemptions from a secure administrative portal. In embodiments, digital asset accounts and/or digital wallets may be created after a request for a deposit is made, at the time the trust's security measures are set up (e.g., 10,000 wallets created at the outset), at some intermediate point during the life of the trust, or at any other time where digital wallets are deemed necessary or desirous, e.g., to ensure that the amount of assets in any given wallet remains below some threshold.

At set up of a trust, seed baskets and/or initial baskets may be issued to one or more initial purchasers 210 in connection with the formation of the trust.

In embodiments, creations may involve the transfer of assets to the trust, and redemptions may involve the withdrawal of assets from the trust, as discussed herein. In embodiments, the trust may be passive, such as not actively managed, in which case it may be subject to the additions or reductions in the asset inventory caused by creations and/or redemptions. In embodiments, the trust may restrict issuance and/or redemption of shares to creation units. In embodiments, creation units may describe the specific number of shares that may be exchanged for digital assets of the same value. Creation units may be lot sizes of a pre-defined number of shares. In embodiments, creation units may be large lot sizes of shares. For example, in embodiments, a creation unit may be 10,000 shares, 20,000 shares, 30,000 shares, 40,000 shares, 50,000 shares, 75,000 shares, 100,000 shares, and/or some other denomination of shares. In embodiments, the creation unit may be based on some fractional amount of shares. In embodiments, a creation unit may correlate to a creation deposit (for creations) or withdrawal proceeds (for redemptions) that comprise a lot size of assets, securities, to name a few. For example, in embodiments a creation of 50,000 shares may correlate to a creation deposit of 10,000 digital assets (e.g., bitcoins). In embodiments, a creation unit may correlate to a creation deposit or withdrawal proceeds that comprise a lot size of fractional denominations of assets, e.g., 100 Satoshis, 200 Satoshis, 10,000 Satoshis, or some other denomination of Satoshi.

In embodiments, one or more creation units may be created in a process in which one or more creation deposits is transferred to the trust in exchange for issuance a specified set number of shares in the fund, e.g., 50,000 shares. For a redemption, as described herein, an AP may redeem one or more creation units in exchange for the related withdrawal proceeds and resulting in the cancellation of a corresponding set number of shares. In embodiments, an AP may only transact in whole creation units. Thus, the AP may only deposit assets equal to one or more whole creation units. Similarly, the AP may relinquish shares amounting to one or more whole creation units in order to redeem those creation units. In embodiments, transactions involving fractional amounts of a creation unit may be allowed.

Transactions may occur on a daily basis. In embodiments, transactions may occur multiple times each day. In embodiments, the frequency of transactions may be limited by rule so as to limit the number of transactions, e.g., one transaction per week, three transactions in a given month, to name a few. In embodiments, transactions may be limited by rule to occurring during certain time periods, such as only on a given day of the week (e.g., Mondays) or only on a given day of the month (e.g., the first day of the month), after 3 P.M., to name a few. In embodiments, transactions may be limited to occurring on business days.

The trust may accept only a single commodity, currency or other asset. In embodiments, multiple types of commodities, currencies or assets may be accepted, for example, like a basket currency model. Those in the art will appreciate that the asset may be a commodity, currency and/or other asset which may be physical, digital, or otherwise existing.

In embodiments, only an AP may obtain shares in the trust. Thus, in the primary market for shares only APs can participate. However, in a secondary market, APs may sell or otherwise transfer shares in whatever manner and for whatever consideration they choose. In embodiments, APs may sell shares for cash and/or other remuneration. A shareholder can own beneficial interest in shares in the trust. In embodiments, an AP's ability to transfer shares may be limited by securities laws, FINRA, and/or corporate compliance procedures, to name a few. Shares in a trust may include units of fractional undivided beneficial interest in and ownership of a trust.

Figure 15A:
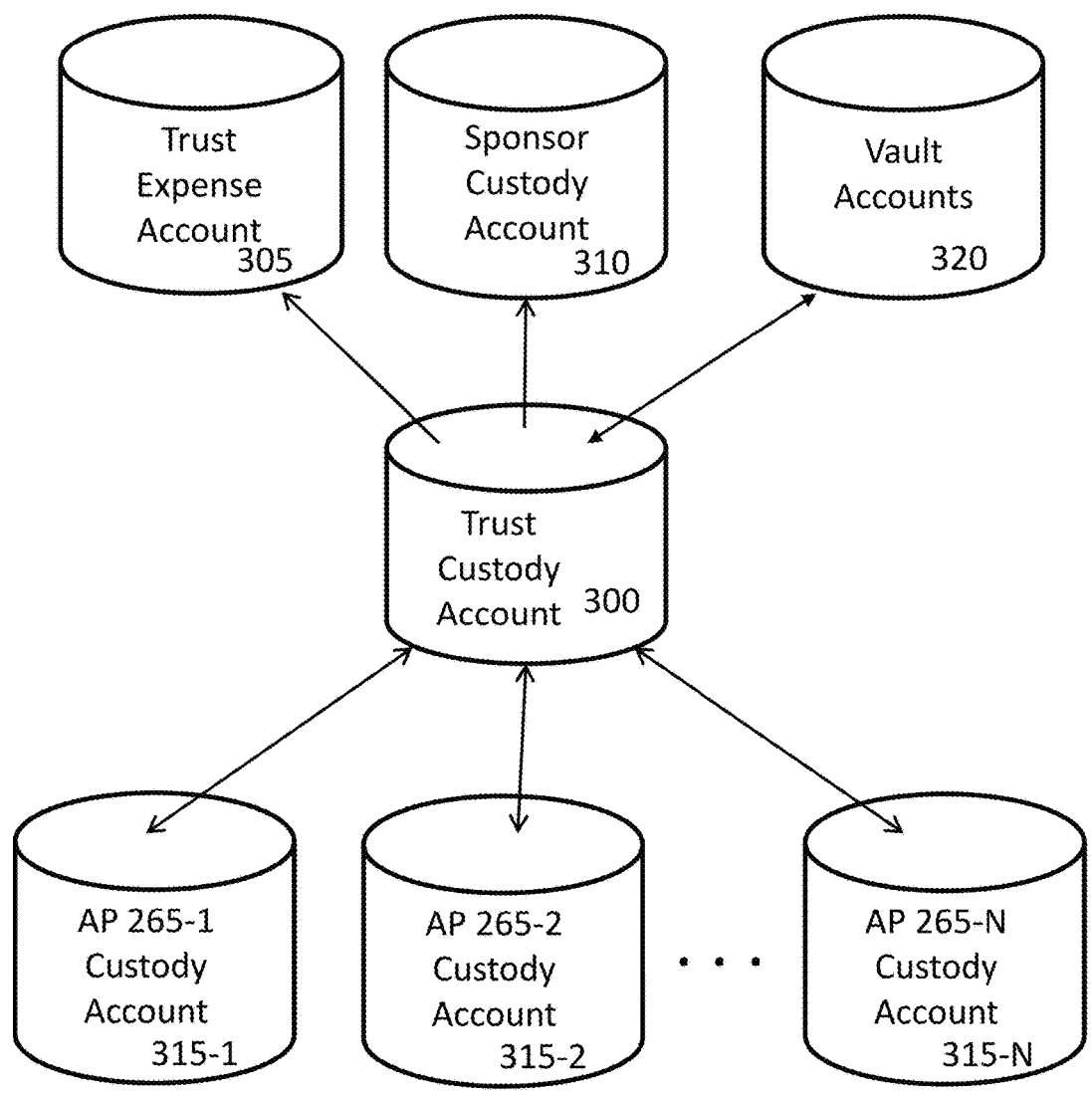
FIGS. 15A and 15B are schematic diagrams of the accounts associated with a trust in accordance with exemplary embodiments of the present invention.

Administration of the trust may involve the use of one or more accounts, including one or more custody accounts. In embodiments, referring to FIG. 15A, such accounts may include AP custody accounts 315, trust custody accounts 300, vault accounts 320, sponsor custody accounts 310, and/or trust expense accounts 305, to name a few.

Figure 15B:
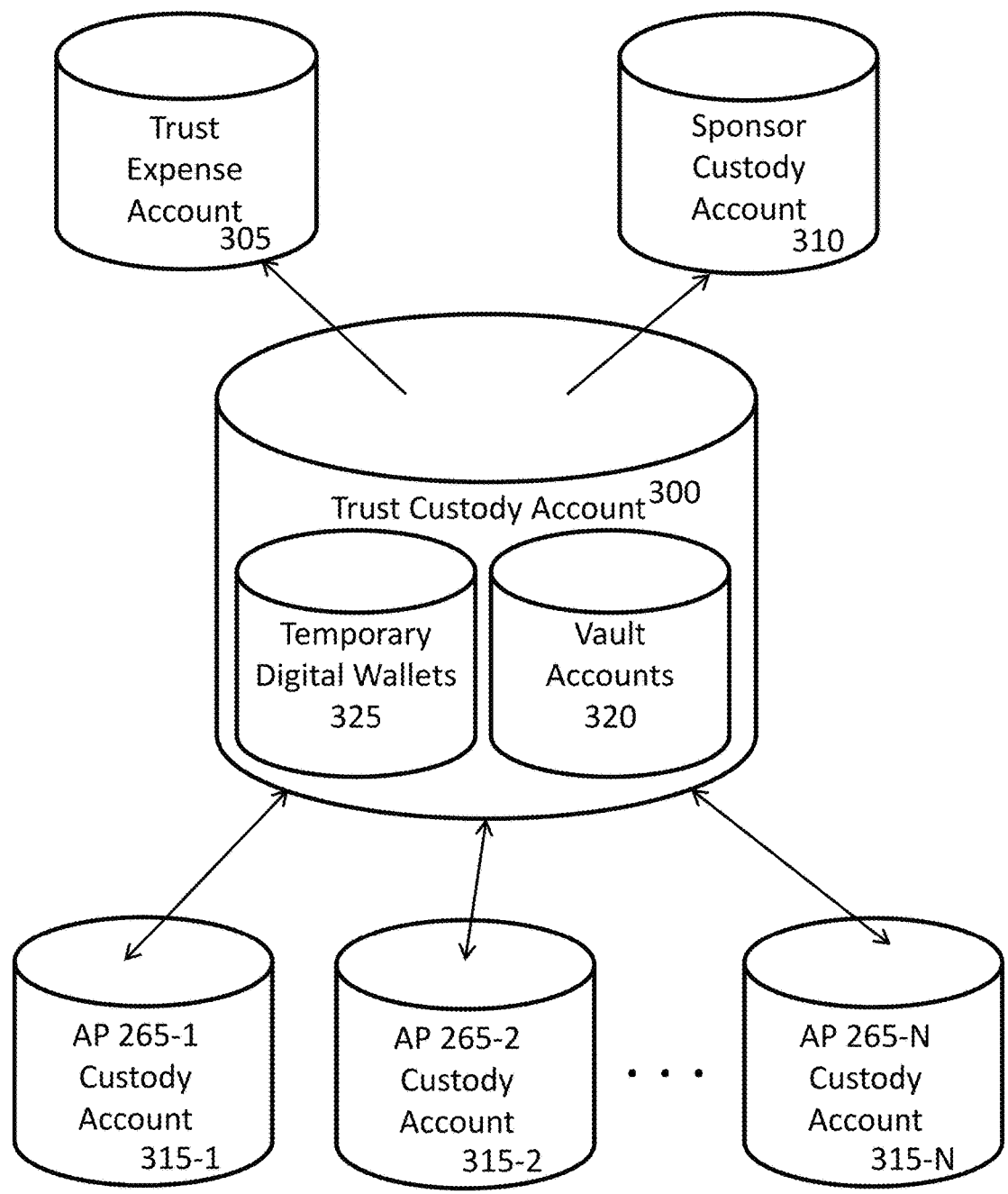

A custody account can be a segregated account operated by the trustee on behalf of another involved with the trust, e.g., sponsor or AP, to name a few. In embodiments, a custody account may be a digital wallet, a digital asset account, and/or a Bitcoin account. In embodiments, a custody account may be created, e.g., by the trustee, for each new transaction, e.g., creation, redemption, payment of sponsor's fee, to name a few. Referring to the exemplary embodiment illustrated in FIG. 15A, a trust custody account 300 may be owned by the trust. The trust custody account 300 may be the primary holder of the trust's assets, e.g., bitcoins. In an exemplary embodiment of the present invention, the trust custody account 300 may store public and private keys for one or more digital wallets holding the trust's digital assets, e.g., bitcoins. In embodiments, referring to FIG. 15B, the trust custody account 300 may comprise one or more temporary digital wallets 325 and/or one or more vault accounts 320. Vault accounts 320 may be digital wallets. Vault accounts 320 may be stored in a secure manner as discussed herein. Vault accounts 320 may be used for longer-term storage of digital assets. Temporary digital wallets 325 may be hot storage, which may be accounts and/or wallets that are accessed with greater frequency than vault accounts 320 in order to, for example, perform transactions. In embodiments, the trust custody account 300 may be a segregated account, segregating the assets it holds from all other assets held by the custodial operations of the trustee. The trust custody account 300 may facilitate the acceptance of creation deposits from an AP custody account 315, the distribution of assets, e.g., bitcoins, to an AP as part of a redemption, and/or the distribution of assets to a trust expense account 305 and/or a sponsor custody account 310. The trust expense account 305 may be owned by the trustee 215. In embodiments, a trust expense account 305 can be a segregated digital asset account, such as a segregated Bitcoin account, of the trustee 215 to which the trustee can transfer digital assets, e.g., bitcoins, from a trust custody account 300 in order to pay expenses of the trust not assumed by the sponsor 230. A trust expense account 305 can be established with the trustee 215 by a trust agreement.

In embodiments, trust expense account 305 may be used by the trustee 215 to pay extraordinary expenses that have not been assumed by the sponsor 230. Indirect payment of such expenses may occur when assets are distributed to the trustee's trust expense account 305. The trustee 215 may then sell or otherwise transfer assets from the trust expense account in order to satisfy expenses. A sponsor custody account 310 may be used to accept payments by the trust of a sponsor's fee. In embodiments, payments may be made in digital math-based assets, such as bitcoins. Payment of the sponsor's fee may be a periodic, e.g., monthly, event. One or more AP custody accounts 315-1 . . . 315-N may be owned by one or more APs, 265-1 . . . 265-N. AP custody account 315 may be used to receive deposits of assets from an AP for use in a creation, as detailed in FIGS. 17A and 17B and/or may be used to receive distributions of assets to an AP during a redemption, as detailed in FIG. 19A.

It should be appreciated by those of skill in the art that each of these accounts may be made up of one or more accounts, and/or one or more digital wallets.

The trustee and/or administrator and/or custodian may use one or more trust computers in performance of the processes and/or tasks described herein. A trust computer system may be located at an administrative portal. As illustrated in FIG.

16, a trust computer system may contain exchange transaction data 500, which may, for one or more transactions (e.g., each transaction), store exchange data, currency data, time data, price data, and/or volume data, to name a few. A trust computer system may contain trust account data 510, which may, for one or more accounts, store account types, public keys, correlation numbers, private keys and/or private key IDs (which may indicate the location of stored private keys and/or key segments), transaction history data, and/or account balance data, to name a few. A trust computer system may also contain expense data 520 and/or fee data 530.

Figure 16:
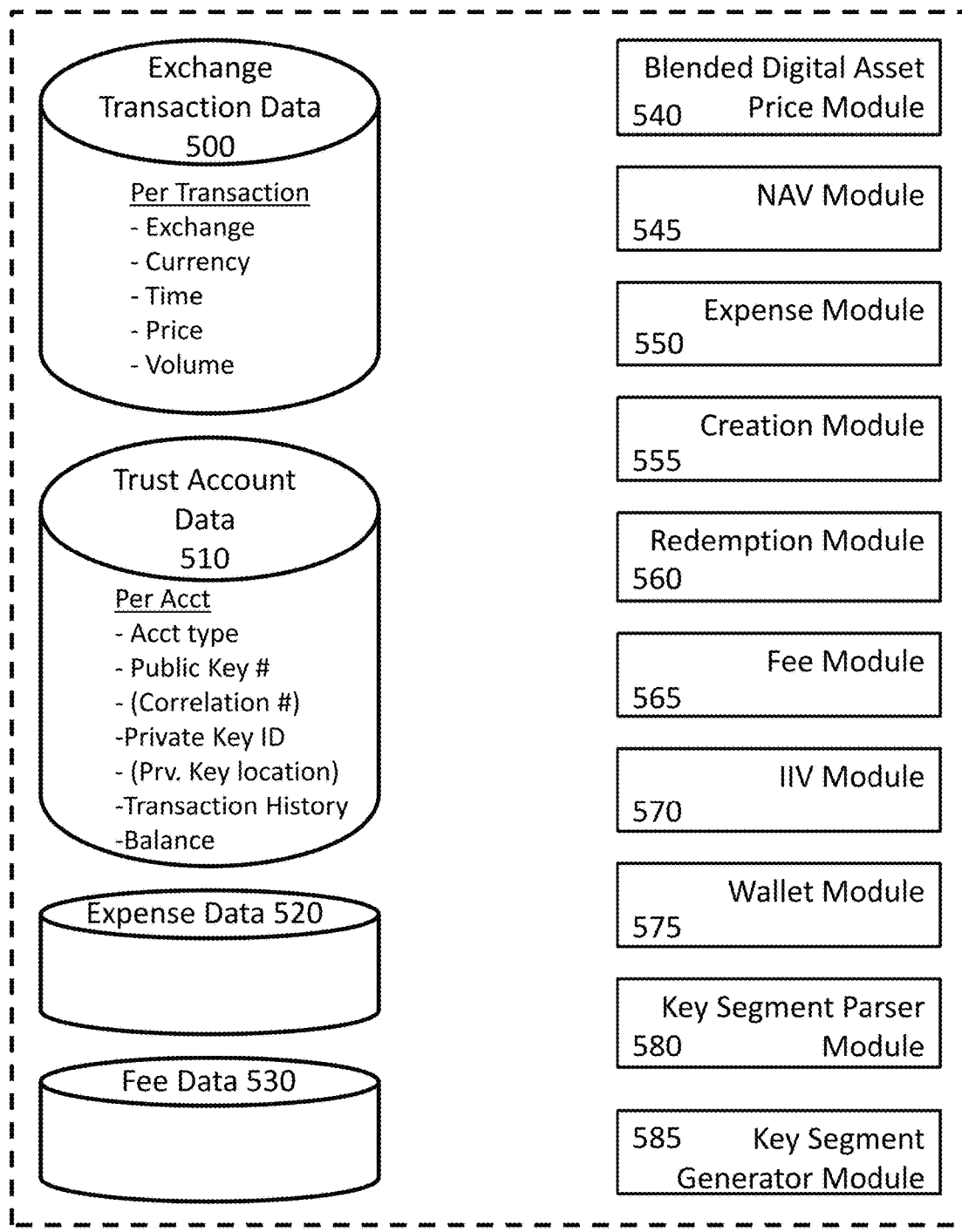
FIG. 16 is a block diagram of the data and modules in an exemplary embodiment of a trust computer system in accordance with the present invention.

Still referring to FIG. 16, a trust computer system may contain a blended digital asset price module 540, a NAV module 545, an expense module 550, a creation module 555, a redemption module 560, a fee module 565, an IIV module 570, a wallet module 575, a key parser module 580, and/or a key segment generator module 585, to name a few.

Investments into ETP

In embodiment, the trust for the ETP can create and/or redeem shares from time to time. In some embodiments, the creation and/or redemption must be in whole baskets, e.g., a block of a fixed number of shares, e.g., 50,000 shares. The creation and/or redemption of baskets can require, respectively, the delivery to the Trust or the distribution from the Trust of the number of bitcoins represented by the baskets being created and/or redeemed, the amount of which can be based on the combined NAV of the underlying assets relating to the number of shares included in the baskets being created and/or redeemed. In embodiments, an initial number of bitcoins required for deposit with the Trust to create Shares can be a fixed amount per basket. In embodiments, the number of bitcoins required to create a basket or to be delivered upon the redemption of a basket may change over time, due to, e.g., the accrual of trust's expenses, the transfer of the trust's bitcoins to pay sponsor's fee and/or the transfer of the trust's bitcoins to pay any trust expenses not assumed by the Sponsor, to name a few.

In embodiments, the number of whole and fractional bitcoins in the deposit required for a basket ("Creation Basket Deposit") may be determined by dividing the number of bitcoins held by the trust by the number of baskets outstanding, as adjusted for the number of whole and fractional bitcoins constituting estimated accrued but unpaid fees and expenses of the trust. Fractions of a bitcoin smaller than a Satoshi (i.e., 0.00000001 of a bitcoin) which are included in the Creation Basket Deposit amount are disregarded in the foregoing calculation. All questions as to the composition of a Creation Basket Deposit will be conclusively determined by the Trustee. The Trustee's determination of the Creation Basket Deposit shall be final and binding on all persons interested in the Trust.

In embodiments, baskets may be created and/or redeemed only by APs, such as APs who pay a transaction fee for each order to create and/or redeem Baskets and/or have the right to sell the shares included in the Baskets they create to other investors. In embodiments, the Trust may or may not issue fractional baskets.

In embodiments, a method for purchasing shares of a trust associated with an exchange traded product holding digital math-based assets may comprise receiving, at a trust computer system from an AP computer system, a request from an AP to purchase shares in the trust; providing or creating, at the trust computers system, one or more digital wallets associated with a trust custody account to hold digital math-based assets, each digital wallet have a respective public key and a respective private key; providing, from the trust computer system to the AP computer system, each respective public key; receiving, at the trust computers systems, into the one or more digital wallets a first amount of digital math-based assets, from one or more digital wallets associated with an AP; sending, from the trust computer system to a digital asset network, an asset notification to provide for the asset transfer recorded on a public transaction ledger of a digital asset network to reflect the transfer of the first amount of digital math-based assets; receiving, at the trust computer system, confirmation from the digital asset network, that the transfer is valid; and sending instructions to a third-party clearing entity to transfer a first amount of shares in the trust to the AP.

Figure 17A:
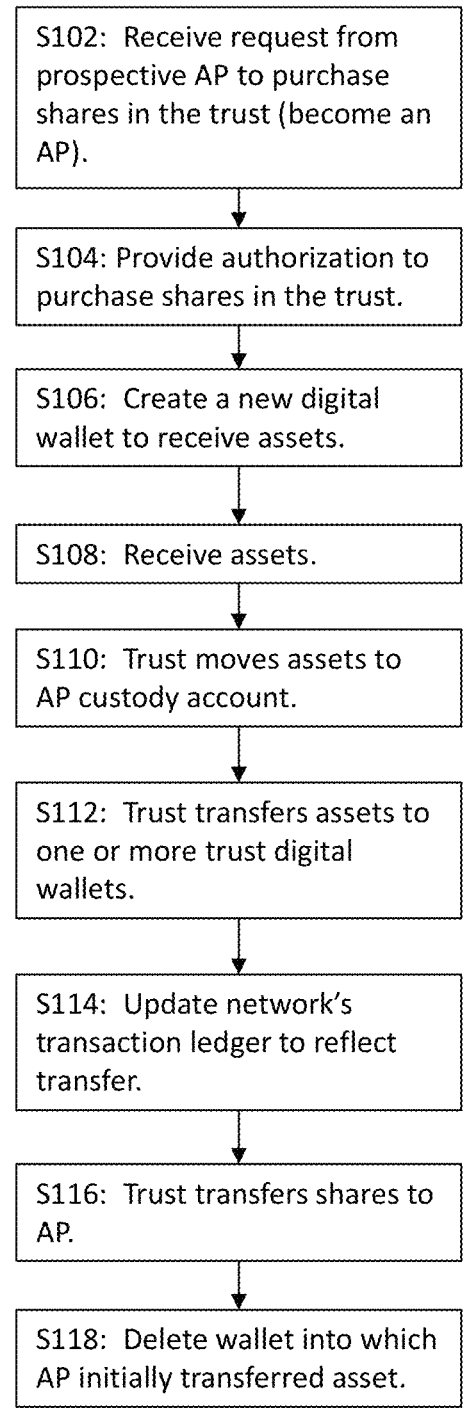
FIGS. 17A and 17B are flow charts of processes for investing in the trust in accordance with exemplary embodiments of the present invention.

FIG. 17A is a flow chart of a process for investing in the trust in accordance with exemplary embodiments of the present invention. In embodiments, the process depicted in FIG. 17A may be performed by the trustee, the administrator, the custodian, and/or one or more computers operated by one or more of those entities or another entity. In exemplary embodiments, in step S102, a request may be received from a prospective AP to become an AP and/or to purchase shares in the trust. At this point the prospective AP may be made an AP with the trust for the ETP. In a step S104, authorization may be provided, e.g., from the trustee, to purchase shares in the trust. In embodiments, step S104 may begin a settlement process. In embodiments, the settlement process will comprise a window, e.g., a 3-day window, during which an AP may hedge its position in the market. In embodiments, the AP may obtain digital assets amounting to a creation deposit to create the creation unit. For example, the AP may purchase bitcoins required for the creation deposit, or may otherwise have sufficient bitcoins, e.g., stored in a digital wallet, to settle a creation unit order. In a step S106, the trustee may create one or more new digital wallets to receive assets from an AP. In a step S108, the trust may receive assets, e.g., from an AP. In embodiments, the assets may comprise one or more creation units. In embodiments, the assets may be deposited by the AP directly into an AP custody account. Where assets are not deposited directly into an AP custody account, in a step S110 the trustee may move the assets into an AP custody account. In a step S112, the trustee may transfer assets to one or more trust digital wallets. In embodiments, these digital wallets may be vault digital wallets which may be intended to hold assets for long term storage. In a step S114, the trustee may send an asset notification to provide for the asset transfer recorded on a network's transaction ledger or may otherwise update or cause to be updated the network's transaction ledger to reflect the transfer. In step S116, the trustee may transfer or direct the transfer, e.g., by a third-party clearing agency 250 (e.g., the DTC), of shares in the trust to the AP. In step S118, the trustee may delete the wallet or wallets into which the AP initially transferred the assets.

In an exemplary embodiment, the fund asset can be a digital asset. In exemplary embodiments, the digital asset can be a bitcoin. To obtain shares in the trust, an AP may convert cash or anything of value to one or more digital assets. This conversion may be performed independently of the ETP or may be performed through an entity or system related to the ETP or may be performed through the ETP. In an exemplary embodiment, the AP obtains digital assets through an exchange. The AP may also have stored digital assets, e.g., an inventory of assets, which it may choose to deposit with the ETP. The AP may then deposit the digital assets with the ETP in exchange for one or more creation units of shares. Deposit of digital assets may occur via a public registry. The transfer of digital assets may occur as a peer-to-peer ("P2P") transaction, also known in the art as an end-user to end user transaction.

In embodiments, the AP may first place a creation order with the trustee, e.g., by transmitting the creation order to an administrative operations division of the trustee. In embodiments, as described above, shares may only be issued in creation units and/or in exchange for digital assets of pre-defined amounts. For example, one creation unit may consist of 50,000 shares and may be issued by the trustee in correlation with a deposit of the requisite amount of digital assets into the trust's account.

The trustee may accept the AP's creation order, which may begin a settlement period, e.g., a 3-day settlement period, during which the AP may engage in a settlement process. The settlement process may allow an AP time to hedge, with one possible goal being to avoid or limit risk. In embodiments, no-limit risk may be applicable. In embodiments, a goal of the hedging process may be to protect, e.g., from price movements, the AP's position in the digital assets being delivered to the trust.

In embodiments, the trustee, using one or more computers, may establish one or more digital wallets for each creation. In embodiments, the one or more digital wallets may comprise an AP custody account, which may receive assets deposited by an AP. In embodiments, an AP custody account may remain open throughout the process, and new digital wallets within the account may be created as needed and/or desired to fulfill orders and allow transfers. In embodiments, the trust may provide its own digital wallet system, which may include an interface and a programmed back end, or the trust may use an existing system. In embodiments, an AP may identify the public address of the digital wallet from which it will transfer assets to the trust.

At or before the close of the settlement window, the AP may instruct the trustee to transfer the required digital assets from the AP custody account for deposit into the trust. Upon such transfer from the AP to the trust, the AP may have satisfied its obligation. The trust, through a third-party clearing agency 250 (e.g., the DTC), may then issue shares in the required number of creation units to the AP.

In an exemplary embodiment, digital assets may be transferred from the AP to the trust by transferring the assets first from the AP's one or more outside digital wallets to the AP custody account's one or more digital wallets and, second, from the AP custody account's one or more digital wallets to the trust custody account's one or more digital wallets. In embodiments, both the transferor and the transferee's digital wallets may be required to report the transaction(s) to a registry or other system or entity in order for the transaction(s) to complete. In embodiments, there may be a time window within which both wallets must report the transaction(s). In embodiments, a transaction ledger will be updated to reflect the transfer(s).

Figure 17B:
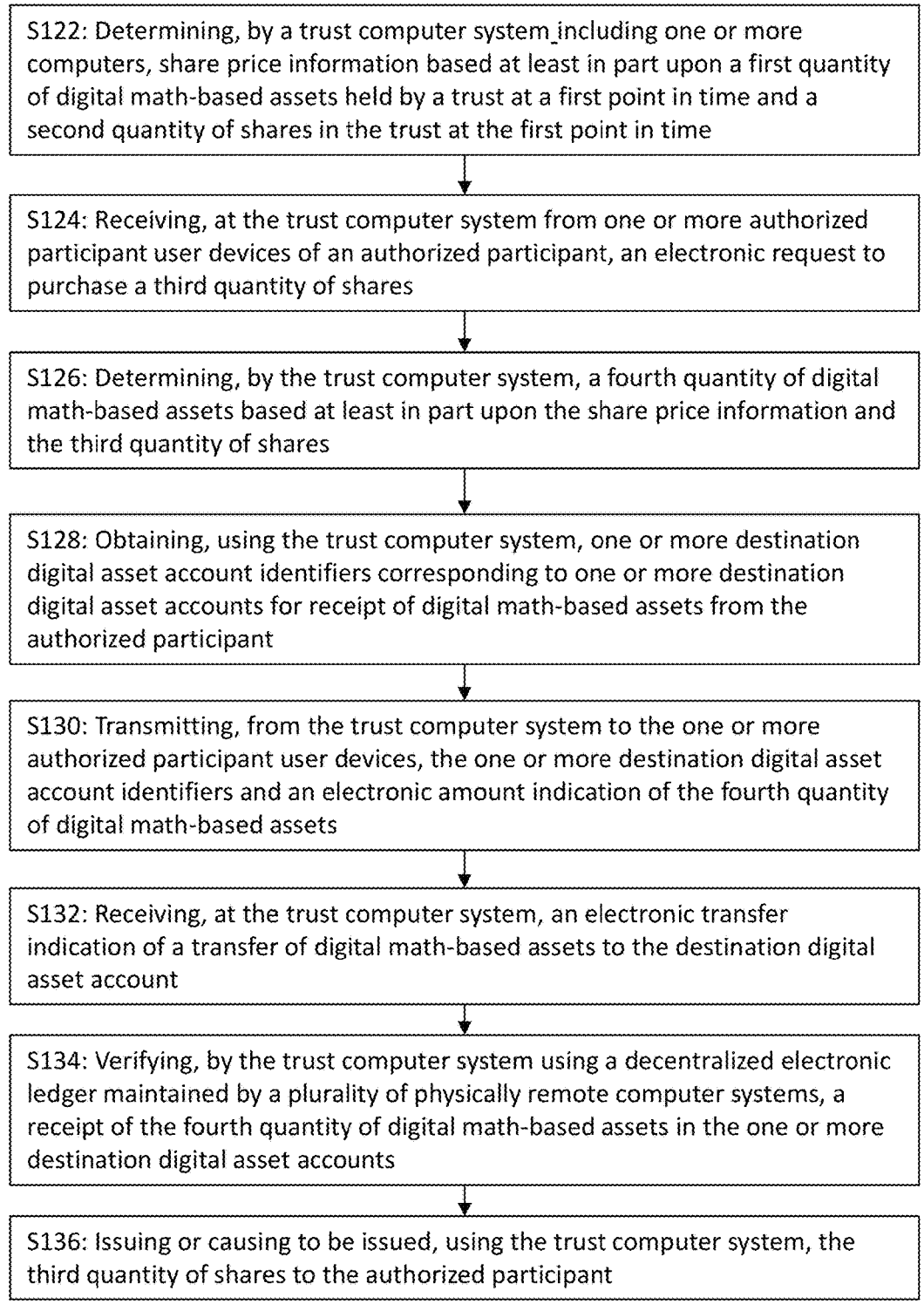

FIG. 17B is a flow chart of a process for investing in the trust in accordance with exemplary embodiments of the present invention. In embodiments, the process depicted in FIG. 17B may be performed by the trustee of the trust, the administrator of the trust on behalf of the trust, the custodian, and/or one or more computers operated by one or more of those entities or another entity. In exemplary embodiments, in step S122, a trust computer system including one or more computers may determine share price information based at least in part upon a first quantity of digital math-based assets held by a trust at a first point in time and a second quantity of shares in the trust at the first point in time.

In embodiments, the share price information may then be transmitted from the trust computer system to the one or more authorized participant user devices. In embodiments, the step S122 may further comprise the steps of determining, by the trust computer system, a fifth quantity of digital math-based assets held by the trust that are attributable to shareholders; determining, by the trust computer system, a sixth quantity of digital math-based assets by subtracting from the fifth quantity a seventh quantity of digital math-based assets associated with trust expenses; and dividing the sixth quantity by an eighth quantity of outstanding shares. In embodiments, the share price information, may be a quantity of digital math-based assets per share and/or per a basket of shares corresponding to a number of shares associated with one creation unit of shares. In embodiments, the basket of shares may comprise one or more quantities of shares selected from the group consisting of: 5,000 shares, 10,000 shares, 15,000 shares, 25,000 shares, 50,000 shares, and 100,000 shares.

In a step S124, the trust computer system may receive, from one or more authorized participant user devices of an authorized participant, an electronic request to purchase a third quantity of shares.

In a step S126, the trust computer system may determine a fourth quantity of digital math-based assets based at least in part upon the share price information and the third quantity of shares.

In a step S128, the trust computer system may be used to obtain one or more destination digital asset account identifiers corresponding to one or more destination digital asset accounts for receipt of digital math-based assets from the authorized participant. In embodiments, the one or more destination digital asset account identifiers may comprise one or more digital asset account addresses and/or public keys.

In a step S130, the one or more destination digital asset account identifiers and an electronic amount indication of the fourth quantity of digital math-based assets may be transmitted from the trust computer system to the one or more authorized participant user devices.

In a step S132, an electronic transfer indication of a transfer of digital math-based assets to the destination digital asset account may be received at the trust computer system. In embodiments, the electronic transfer indication may further comprise an identification of one or more origin digital asset accounts.

In a step S134, the trust computer system may verify, using a decentralized electronic ledger maintained by a plurality of physically remote computer systems, a receipt of the fourth quantity of digital math-based assets in the one or more destination digital asset accounts. In embodiments, step S134 may further comprise the steps of accessing, using the trust computer system, a plurality of updates to the decentralized electronic ledger; analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger. In embodiments, the plurality of updates to the decentralized electronic ledger may comprise new blocks added to a bitcoin blockchain.

In a step S136, the trust computer system may be used to issue or cause to be issued the third quantity of shares to the authorized participant.

In embodiments, the process depicted in FIG. 17B may further comprise the step of transferring, using the trust computer system, the fourth quantity of digital math-based assets into one or more digital asset accounts associated with a trust custody account. In further embodiments, the process depicted in FIG. 17B may further comprise the step of transmitting, from the trust computer system to the one or more authorized participant user devices, an electronic receipt acknowledgement indicating the receipt of the fourth quantity of digital math-based assets. In still further embodiments, the process depicted in FIG. 17B may further comprise the step of transmitting or causing to be transmitted, to the one or more authorized participant user devices, an electronic share issuance indication of the issuing of the third quantity of shares.

In embodiments a system for determining and/or providing a blended digital math-based asset price can comprise one or more processors and one or more computer-readable media operatively connected to the one or more processors and having stored thereon instructions for carrying out the steps of: (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

Deposit Distribution Waterfalls Among Wallets

The creation process involves the deposit of digital assets into the trust's accounts. During a creation, assets or other funds may be deposited into one or more trust accounts. In embodiments, a trust may limit the number of assets or amount of funds stored in each of its wallets, e.g., for security reasons to reduce exposure if any one wallet is compromised. In multi-wallet structures, various asset distributions among the wallets are possible, and various distribution methods or waterfalls may be employed.

In embodiments, wallets may be filled in a pre-determined order. In embodiments, wallets may be filled according to one or more desired capacities or account balances, e.g., deposit 10,000 bitcoins in each wallet before proceeding to deposit in the next wallet.

Figure 18A:
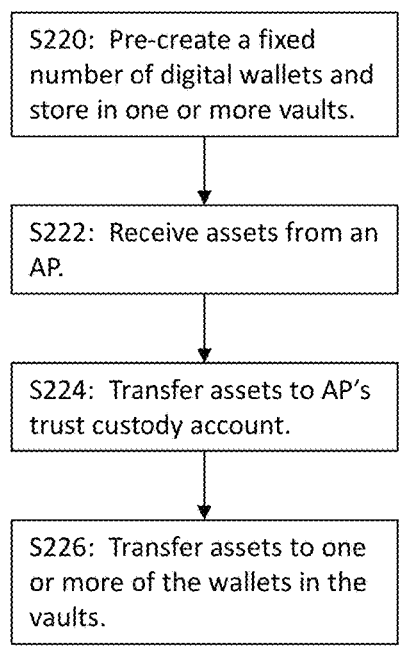
FIGS. 18A and 18B are flow charts of various exemplary processes for assigning digital math-based assets, such as bitcoins, obtained during a creation and distributing them among digital wallets in accordance with embodiments of the present invention.
Figure 18B:
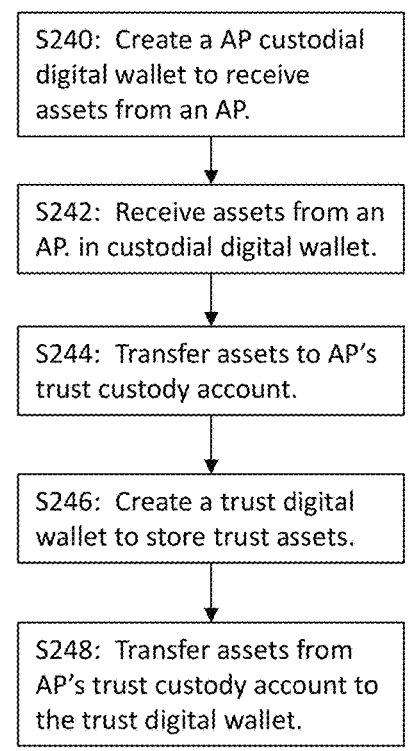

FIGS. 18A and 18B are flow charts of various exemplary processes for assigning digital assets (e.g., bitcoins) obtained at creation and distributing them among digital wallets in accordance with embodiments of the present invention.

For example, with reference to FIG. 18A, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S220, a fixed number of digital wallets to be stored in one or more vaults can be created in advance of anticipated use. In creating the digital wallets, as described herein e.g., in relation to FIG. 5A, the private key for each wallet may be parsed into two or more segments and/or encoded and stored in paper form. In embodiments, the key segments may be further encrypted before storing in paper form. The corresponding public key may be kept readily available for the administrator and/or custodian to access.

In step S222, an AP using an AP computer system can send to the trustee, custodian and/or administrator using a trust computer system, which in turn receives, assets (e.g., digital math assets such as bitcoins) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoins) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In embodiments, in step S224, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In step S226, the digital assets in the digital wallets associated with the AP trust custody account may be transferred using the trust computer system in whole or part into one or more of the previously created digital wallets whose private key segments are stored in vaults. In embodiments, the digital assets may be distributed by the trust computer system to trust wallets, such as discussed in the context of FIG. 18B herein, or according to another distribution algorithm.

With reference to FIG. 18B, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S240, an AP custodial digital wallet can be created using the trust computer system to receive assets from an AP digital wallet on an AP computer system.

In step S242, an AP using an AP computer system can send to the trustee, custodian and/or administrator using a trust computer system (which in turn receives) assets (e.g., digital math assets such as bitcoins) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoins) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In step S244, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In embodiments, the creation distribution methodology/algorithm can depend at least in part upon one or more of the following criteria or parameters:

- setting a maximum amount of digital assets stored in each wallet (e.g., limiting to 10,000 bitcoins in each wallet);
- setting a minimum amount of digital assets stored in each wallet (e.g., at least 100 bitcoins in each wallet);
- setting a maximum ratio of maximum amount to minimum amount of digital assets stored in each wallet (e.g., a 10-to-1 ratio);
- setting a random amount of digital assets to be stored in each wallet, wherein the random amount is greater than a minimum amount and less than a maximum amount;
- limiting the number of uses of each wallet (e.g., never using the same wallet more than once);
- resetting the maximum amount and the minimum amount of digital assets stored in each wallet based at least in part on increased or decreased volume of digital assets held by the trust;
- setting a maximum amount of digital assets transferred to each wallet in any given transaction (e.g., limiting to 10,000 bitcoins in each wallet);
- setting a minimum amount of digital assets transferred to each wallet in any given transaction (e.g., at least 100 bitcoins in each wallet);
- setting a maximum ratio of maximum amount to minimum amount of digital assets transferred to each wallet in any given transaction (e.g., a 10-to-1 ratio);
- setting a random amount of digital assets to be transferred to each wallet in any given transaction, wherein the random amount is greater than a minimum amount and less than a maximum amount;
- limiting the number of transfers to a given wallet (e.g., never using the same wallet more than once, never make more than two transfers to the same wallet during a year period, to name a few);
- resetting the maximum amount and the minimum amount of digital assets transferred to and/or from each wallet based at least in part on increased or decreased volumes of digital assets held by the trust; and/or
- performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day).

Redemptions from ETP

In embodiments a method for redeeming shares in a trust associated with an exchange traded product holding digital math-based assets may comprise receiving, at a trust computer system from an AP computer system, a redemption order from an AP to redeem a first number of shares in the trust; determining, using the trust computer system, one or more trust wallets to access to satisfy the redemption order; generating, using the trust computer system, instructions to a custodian to retrieve at least one copy of each private key segment corresponding to the one or more trust wallets; sending the instructions to the custodian; reassembling, using the trust computer system, the one or more trust wallets using the at least one copy of each private key segment; transferring, using the trust computer system, from the one or more trust wallets a first number of digital math-based assets to an AP wallet associated with the AP; generating, using the trust computer system, instructions to the third-party clearing agency to cancel the first number of shares in the trust of the AP; and sending the instructions to the third-party clearing agency. In embodiments, the trustee using the trust computer system may approve the redemption order and/or send confirmation (e.g., electronically) of the order.

In embodiments, the redemption distribution from the trust may consist of a transfer to the redeeming AP's Authorized Participant Custody Account of the number of the bitcoins held by the trust in the Trust Custody Account evidenced by the shares being redeemed. In embodiments, fractions of a bitcoin included in the redemption distribution smaller than a Satoshi (i.e., 0.00000001 of a bitcoin) may be disregarded. In embodiments, redemption distributions may be subject to the deduction of any applicable tax or other governmental charges that may be due.

FIG. 19A is a flow chart of a process for redeeming shares in the trust in accordance with exemplary embodiments of the present invention. In embodiments, the processes depicted in FIG. 19A may be performed by the trustee, the administrator, the custodian, and/or a trust computer system comprising one or more computers operated by one or more of those entities or another entity.

In step S202, the trust computer system may receive a request, e.g., a redemption order, from an AP computer system for an AP to redeem shares in the trust. In embodiments, the trustee using the trust computer system may approve the redemption order and/or send confirmation (e.g., electronically) of the order. In embodiments, a settlement process entailing, for example, a 3-day settlement window, may be triggered. Other durations of settlement periods may be used as convenient. In embodiments, the trust computer system may receive from the AP computer system one or more public keys associated with AP wallets and/or AP accounts to which redemption proceeds are designated by the AP to be distributed. For example, public key information may be sent electronically from the AP computer system to the trust computer system using, e.g., a digital wallet, e-mail, text message, a digital asset exchange, electronic communications, to name a few. In embodiments, the trustee may designate one or more existing trust custody wallets and/or create one or more new wallets using the trust computer system to be used as AP custody accounts. In embodiments, the trustee may determine the number of digital assets (e.g., bitcoins) required for the redemption, e.g., by using the trust computer system to multiply the number of shares to be redeemed by the NAV value per share less any transaction fees associated with the redemption. In embodiments, depending upon the timing of the redemption, an ANAV value per share may be used in lieu of the NAV value per share. The trust may request and/or receive, e.g., through the third-party clearing agency 250 (e.g., the DTC), shares to be redeemed.

In step S204, the trust computer system may determine one or more wallets to access to satisfy the redemption. The determination as to how many and which wallets should be used to redeem assets may be based at least in part on one or more of the parameters discussed herein (see, e.g., Redemption Distribution Waterfalls Among Wallets).

In step S206, the trustee may instruct the custodian to retrieve from one or more vaults a copy of each private key segment comprising one or more private keys corresponding to the digital wallets that will be accessed to satisfy the redemption. In embodiments, special security measures may be implemented to limit the risk of one or more key segments being lost, damaged and/or stolen in transport. For example, bonded armored cars can be used to transport key segments. The timing of key segment retrieval and transport may be spaced so that only one segment is transported at a time. The timing and/or route of retrieval may also be randomized and/or varied to avoid predictability of transport of key segments from the vault to the administrative portal.

In step S208, the trustee, administrator and/or custodian using the trust computer system may use the retrieved private key segments to reassemble the private keys. In embodiments, this may be performed by decrypting the private key segments and reassembling the segments into a complete private key. In embodiments, the retrieved private key segments may be scanned using key reader 40, and decrypted (as necessary) using decryption software on the isolated computer 30 as part of the trust computer system, and combined and associated with the corresponding public key to regenerate a trust wallet.

In embodiments, as described in a step S208' in FIG. 19B, the trustee, administrator, and/or custodian using the trust computer system may decrypt the private key segments, reassemble the key segments into full keys, and/or reverse any cipher that was previously applied. In embodiments, these sub-steps of step S208' may be performed in any order which will result in a properly reassembled private key. In embodiments, they are performed in the reverse order of the steps used to secure and store the keys. In embodiments, the key segments are decrypted first, then reassembled into a complete key, then deciphered. The complete deciphered key may then be used to access and/or transact using a digital wallet.

In step S210, the trust computer system may identify and/or correlate the one or more private keys with the associated public keys to create one or more digital wallets to access the digital assets. In embodiments, preassembled wallets may be generated on one or more isolated transaction computers 32 to hold public key and private key information and transfer instructions awaiting closing. In embodiments, the use of preassembled wallets may expedite the wallet generation process associated with digital math based assets. In embodiments, the trust computer system may include one or more digital asset miners (e.g., bitcoin miners) to allow for prompt transfer of ledger information to reassembled digital wallets. In embodiments, digital math-based assets earned by the digital asset miners may be added to the trust and/or paid to the administrator and/or sponsor as a fee.

In step S212, the trust computer system may reassemble, regenerate, or otherwise access the one or more trust custody account digital wallets (which may, in embodiments, be vault wallets) using the private and/or public keys. The trust computer system may transfer, from the one or more vault wallets to one or more digital wallets in the AP custody account, the assets being redeemed, and then transfer such assets being redeemed to the AP's one or more outside digital wallets. In embodiments, the AP wallet may be an AP custodial wallet. In embodiments, the trust computer system may delete or destroy one or more wallets involved in the transaction, e.g., the AP custody wallet and/or any vault wallets that were emptied, to name a few.

In step S214, the trustee may cancel and/or instruct to cancel, e.g., using the third-party clearing agency 250 (e.g., DTC), the AP's shares corresponding to the number of assets withdrawn and delivered to the AP.

In embodiments, in step S216, the AP may convert the assets to some other asset or currency or use them to conduct one or more transactions.

In embodiments, security measures, such as described with respect to FIG. 8, may be implemented. In embodiments, a wallet created on the isolated computer 30 may be copied in part to create a watching wallet that may create unsigned transactions and/or broadcast already signed transactions. In embodiments, the watching wallet may not contain private key data. The watching wallet may be loaded onto the networked computer 20. The networked computer 20 may then be used to create one or more unsigned transactions. The unsigned transaction data may be transferred from the networked computer 20 to the isolated computer 30. Such transfer may be manual, such as by downloading the unsigned transaction data to a removable storage device comprising computer readable medium (e.g., a USB flash drive, CD, CD-ROM, DVD, removable hard drive, disk, memory card, to name a few), physically disconnecting the storage device from the networked computer 20, operatively connecting the storage device to the isolated computer 30, and uploading the unsigned transaction data to the isolated computer 30. In embodiments, networked computer 20 may be connected, directly or indirectly, to isolated computer 30, which connection may comprise security measures, such as a firewall, designed to prevent unauthorized access of the isolated computer 30. After receiving the unsigned transaction data, the digital wallet on the isolated computer 30 may be used to sign the transaction. The signed transaction data may then be transferred from the isolated computer 30 to the networked computer 20 in any of the manners described herein. The networked computer 20 may then broadcast the signed transaction data to the network, which may complete the transaction.

FIG. 19C is a flow chart of another exemplary process for redemption of shares in an ETP.

In a step S2022, a trust computer system comprising one or more computers may determine share price information based at least in part upon a first quantity of digital math-based assets held by a trust at a first point in time and a second quantity of shares in the trust at the first point in time. In embodiments, the share price information may be transmitted to one or more authorized participant user devices. The share price information can comprise a net asset value per share, an adjusted net asset value per share, and/or a net asset value per a basket of shares (e.g., where the number of shares comprising the basket of shares may be associated with one creation unit of shares), to name a few. In embodiments, the basket of shares can comprise any of 5,000 shares, 10,000 shares, 15,000 shares, 25,000 shares, 50,000 shares, or 100,000 shares, to name a few.

In a step S2024, the trust computer system may receive from one or more authorized participant user devices of an authorized participant, an electronic request (e.g., a redemption order) to redeem a third quantity of shares.

In a step S2026, the trust computer system may determine a fourth quantity of digital math-based assets based at least in part upon the share price information and the third quantity of shares. Determining the fourth quantity of digital assets can comprise obtaining a net asset value per share; determining a digital math-based asset value of the third quantity of shares based upon the net asset value per share; determining transaction fees (e.g., denominated in a unit of the digital math-based asset) and/or expenses associated with the electronic request to redeem shares; and determining the fourth quantity of digital math-based assets by subtracting the transaction fees from the digital math-based asset value of the third quantity of shares.

In a step S2028, the trust computer system may obtain one or more destination digital asset account identifiers corresponding to one or more destination digital asset accounts for receipt by the authorized participant of a transfer of the fourth quantity of digital math-based assets from the trust. The destination digital asset accounts may correspond to an authorized participant custody account.

In a step S2030, the trust computer system may obtain one or more origin digital asset account identifiers corresponding to one or more origin digital asset accounts for the transfer. In embodiments, the origin digital asset accounts may be securely stored accounts, as described herein. The origin digital asset accounts may correspond to a trust custody account.

In a step S2032, the trust computer system may initiate the transfer of the fourth quantity of digital math-based assets from the one or more origin digital asset accounts to the one or more destination digital asset accounts. Initiating a transfer of assets from the trust can comprise retrieving or causing to be retrieved (e.g., issuing retrieval instructions) one or more private keys associated with the one or more origin digital asset accounts, and accessing the one or more origin digital asset accounts using at least the one or more private keys.

Retrieving keys can comprise issuing retrieval instructions for retrieving a plurality of encrypted private keys corresponding to the one or more origin digital asset accounts; receiving, at the trust computer system, the plurality of encrypted private keys; and obtaining, using the trust computer system, one or more private keys by decrypting the plurality of private keys.

In other embodiments, retrieving keys can comprise issuing, using the trust computer system, retrieval instructions for retrieving a plurality of private key segments corresponding to the one or more origin digital asset accounts; receiving, at the trust computer system, the plurality of private key segments; and obtaining, using the trust computer system, one or more private keys by assembling the plurality of private keys.

In still other embodiments, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; and obtaining, using the trust computer system, one or more private keys by decrypting the plurality of private key segments and assembling the segments into one or more private keys.

For a multi-signature digital asset account, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; obtaining, using the trust computer system, one or more first private keys by decrypting the plurality of private key segments and assembling the segments into one or more first private keys; and obtaining, using the trust computer system, at least one second private key corresponding to the one or more origin digital asset accounts.

In a step S2034, the trust computer system may broadcast the transfer to a decentralized electronic ledger maintained by a plurality of physically remote computer systems.

In a step S2036, the trust computer system may verify, using the decentralized electronic ledger, a receipt of the fourth quantity of digital math-based assets at the one or more destination digital asset accounts. Transaction verification can comprise accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In a step S2038, the trust computer system may cancel or cause to be canceled (e.g., by issuing instructions to a third-party clearing agency) the third quantity of shares from the authorized participant.

In embodiments, the process can include determination of and/or institution of a settlement period associated with the electronic request to redeem shares.

In embodiments, the trust computer system may be operated by a trustee and/or an administrator of the trust.

In embodiments a system for determining and/or providing a blended digital math-based asset price can comprise one or more processors and one or more computer-readable media operatively connected to the one or more processors and having stored thereon instructions for carrying out the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

Redemption Distribution Waterfalls Among Wallets

In embodiments, a redemption distribution waterfall may be implemented using one or more computers based at least in part on one or more parameters. In embodiments, such parameters may include at least one or more of the following:
  the order in which the wallet was created (e.g., first wallet created is first wallet used, last wallet created is last wallet used, to name a few);
  the order in which the wallet was filled (e.g., first wallet filed is first wallet used, last wallet created is last walled used, to name a few);
  a random order in which the wallet was created;
  a random order in which the wallet was filled;
  a random selection of the wallet;
  the vault in which the wallet is stored;
  the custodian of a vault storing the pair segments associated with a wallet;
  the amount of digital assets needed for a redemption compared to available in the wallet;
  the relative amount of digital assets held in the wallet (e.g., use the largest wallets first, use the smallest wallets first, to name a few); and/or
  the risk that a wallet has been compromised, to name a few.

Examples of Financial Products Associated with ETPs Holding Digital Assets

In embodiments, insurance may be provided for digital assets. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 Bitcoins stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

NAV Calculation

In embodiments, an ETP may use a blended digital math-based asset price as a benchmark. Accordingly, a net asset value ("NAV") of shares in a trust for an exchange traded product holding digital math-based assets may be calculated based in part upon a blended digital math-based asset price or a digital asset index, which may in turn comprise a plurality of blended digital math-based asset prices. A NAV may be determined by obtaining, using one or more computers from one or more exchange computers, a value of digital math-based assets held by the trust at a defined time; calculating or obtaining, using the one or more computers, a blended digital asset value of the digital math-based assets during the predefined period of time; calculating, using the one or more computers, the value of the digital math-based assets held by the trust at a defined time by multiplying the units of each digital math-based asset held by the trust by the price per unit of each such digital math-based asset; determining or obtaining, using the one or more computers, estimated accrued but unpaid expenses, including sponsor fees, incurred by the trust since the last payment of a sponsor fee up to, but not included, the date on which the valuation is made; calculating, using the one or more computers, the adjusted net asset value of the trust by subtracting the estimated accrued but unpaid fees and expenses since the last payment of a sponsor fee up to, and included, the last valuation date of the digital math-based assets held by the trust on such date; determining or obtaining, using the one or more computers, estimated unpaid fees and expenses incurred by the trust since the last valuation date; calculating, using the one or more computers, net asset value of the trust by subtracting estimated accrued but unpaid fees and expenses incurred since the last valuation date form the adjusted net asset value of the trust; calculating, using the one or more computers, net asset value per share of the trust by dividing the net asset value of the trust by a number of outstanding shares of the trust; storing in one or more databases on computer readable media operatively connected to the one or more computers the accrued but unpaid fees and expenses, adjusted net asset value, net asset value and the net asset value per share of the trust; and publishing, from the one or more computers to one or more publication systems, the net asset value and the net asset value per share of the trust. In embodiments a time period of 12 hours, 24 hours, or 36 hours may be used.

In embodiments, NAV of a trust or its equivalent can be calculated by a computer system comprising one or more computer. For example, in embodiments, a NAV can be calculated using one or more computers on a daily basis (for each evaluation day, e.g., a day on which the trust shares are available to be created, redeemed and/or exchanged). In embodiments, a NAV can use one or more formulas to estimate a fair market value of a unit of a digital asset and/or a share in a trust at a given point in time. In embodiments, an industry standard formula can be used to calculate a NAV. In embodiments, a proprietary formula can be used to calculate a NAV. For example, one or more computers may calculate a digital asset price using data from the largest exchanges in the digital asset exchange market. In embodiments, a blended digital asset price can be calculated by one or more computers using an averaged price.

In embodiments, a blended digital asset price can be the price for digital assets determined each valuation day at a set time, such as, e.g., 3:00 p.m. Eastern Time. In embodiments, a blended digital math-based asset price may be obtained from a blended digital math-based asset index, which may be accessed via an API. In embodiments, the system may calculate a blended digital asset price, by obtaining transaction data from one or more exchanges selected from a list of exchanges approved by, e.g., the sponsor, to determine either the average of the high and low prices on each exchange or the weighted (based on volume of shares traded) average of the transaction prices for the prior fixed time period (e.g., 12 or 24 hours) of trading activity on such one or more exchanges. In embodiments, the system may then average the price for each exchange, using weighting based on each exchange's volume during the period. Other methodologies can be used by the system to calculated the blended digital asset prices. For example, three exchanges, four exchanges, five exchanges, ten exchanges, or any number of exchanges as may be appropriate in view of the market for the math-based assets may be selected to determine the blended digital asset price. In embodiments, a time period of other than 12 or 24 hours may also be used depending upon the volume and volatility of the math-based asset price. For example, in a low volume period the time period may be increased to, e.g., 36 hours, while in a high volatility period the time period may be decreased to, e.g., 4 hours. In embodiments, a blended digital math-based asset price may be calculated by computing a volume weighted exponential moving average of actual transactions (e.g., considering price and volume of each executed transaction) from one or more digital asset exchange. In embodiments, the moving average may be taken over a period such as 2 hours. In embodiments, other periods may be used, such as 24 hours, 1 hour, 30 minutes, and/or 15 minutes, to name a few.

Figures 20A, 20B:
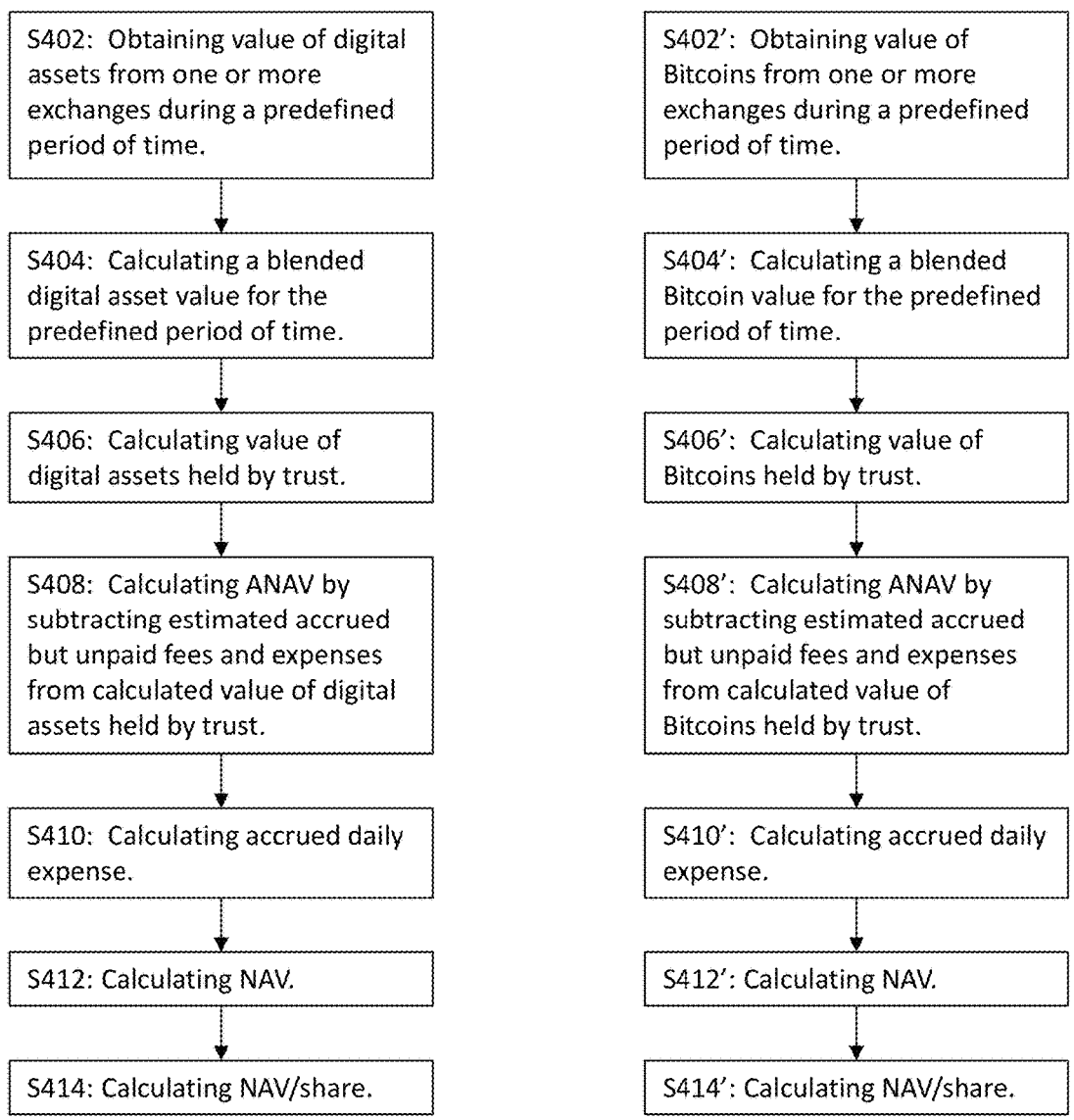
FIG. 20A is a flow chart of processes for calculating the NAV value of shares in a trust holding digital assets in accordance with embodiments of the present invention.
FIG. 20B is a flow chart of processes for calculating the NAV value of shares in a trust holding bitcoins in accordance with embodiments of the present invention.

FIG. 20A is a flow chart of processes for calculating the NAV value of shares in a trust holding digital assets in accordance with embodiments of the present invention. In embodiments, these processes may be performed by a calculation agent 240, by one or more computers, and/or by some other entity using one or more computers. In a step S402, the one or more computers may obtain from one or more exchanges the value of digital assets during a predefined period of time. In a step S404 a blended digital asset value may be calculated for the predefined period of time. In embodiments, the blended digital asset value may also be obtained from an external computer system, such as an electronic published index system. In a step S406, the value of digital assets held by the trust may be calculated. In a step S408, the ANAV may be calculated. In embodiments, the ANAV may be calculated by subtracting estimated accrued but unpaid fees and expenses from the calculated value of digital assets held by the trust. In a step S410, the accrued daily expense may be calculated. In a step S412, the NAV may be calculated. In a step S414, the NAV per share (NAV/share) may be calculated.

FIG. 20B is a flow chart of processes for calculating the NAV value of shares in a trust holding bitcoins in accordance with embodiments of the present invention. In embodiments, these processes may be performed by a calculation agent 240, by one or more computers, and/or by some other entity using one or more computers. In a step S402', the one or more computers may obtain from one or more exchanges the value of bitcoins during a predefined period of time. In a step S404' a blended bitcoin value may be calculated for the predefined period of time. In a step S406', the value of bitcoins held by the trust may be calculated. In a step S408', the ANAV may be calculated. In embodiments, the ANAV may be calculated by subtracting estimated accrued but unpaid fees and expenses from the calculated value of bitcoins held by the trust. In a step S410', the accrued daily expense may be calculated. In a step S412', the NAV may be calculated. In a step S414', the NAV per share (NAV/share) may be calculated.

Figures 21A, 21B:
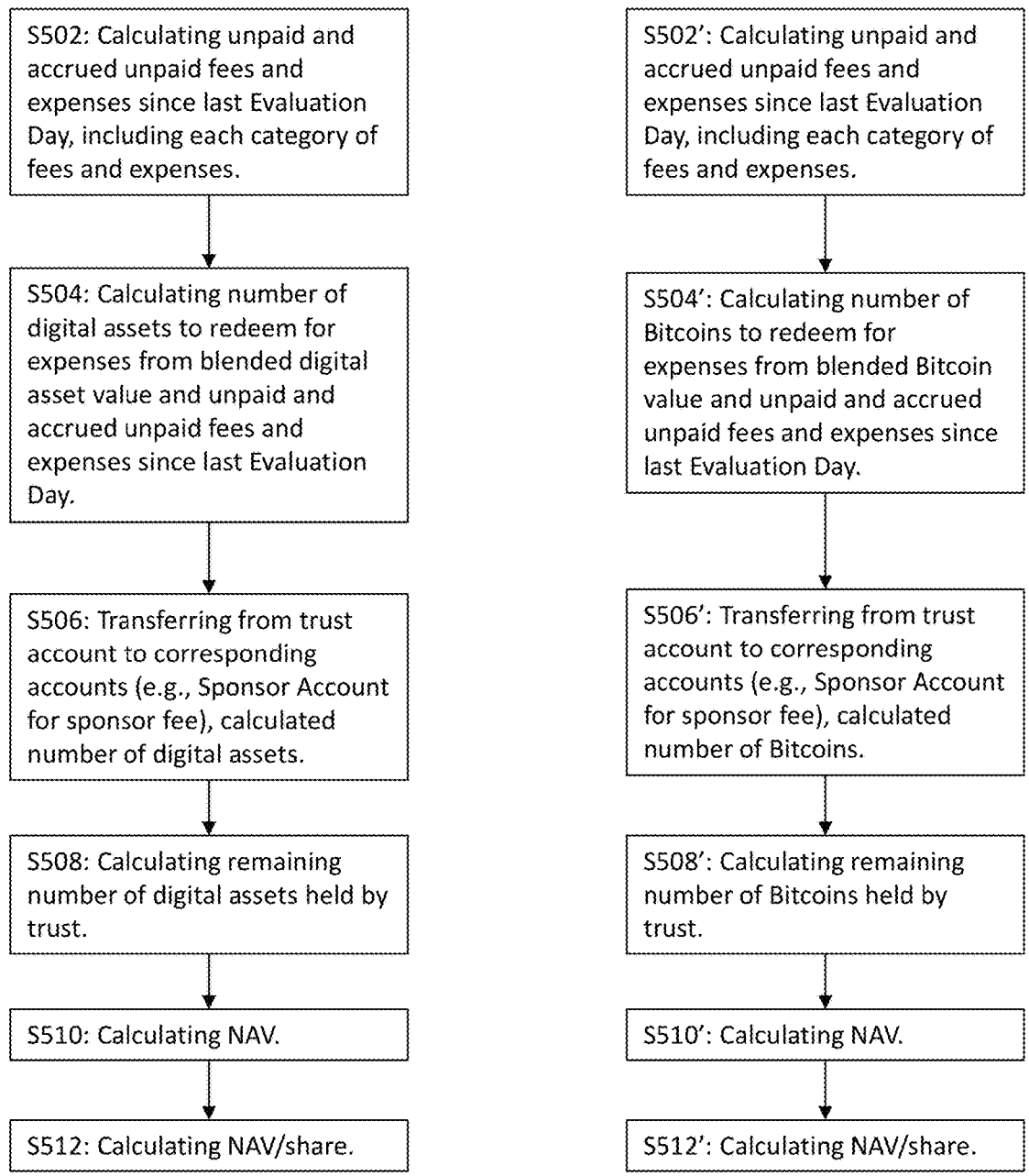
FIG. 21A is a flow chart of additional processes associated with evaluation day for calculating NAV value of shares in a trust holding digital assets in accordance with embodiments of the present invention.
FIG. 21B is a flow chart of additional processes associated with evaluation day for calculating NAV value of shares in a trust holding bitcoins in accordance with embodiments of the present invention.

FIG. 21A is a flow chart of additional processes associated with the evaluation day for calculating NAV value of shares in a trust holding digital assets in accordance with embodiments of the present invention. The processes described by FIG. 21A may be performed by one or more computers operated by one or more entities, such as a calculation agent 240. In a step S502, the unpaid and accrued unpaid fees and expenses since the last evaluation day, which may include each category of fees and/or expenses, may be calculated. In a step S504, the number of digital assets to redeem for expenses may be calculated from the blended digital asset value and the unpaid and accrued unpaid fees and expenses since the last evaluation day. In a step S506, the calculated number of digital assets may be transferred from the trust to corresponding accounts, e.g., a sponsor account for the sponsor fee. In a step S508, the remaining number of digital assets held by the trust may be calculated. In a step S510, the NAV may be calculated. In a step S512, the value of the NAV per share may be calculated.

FIG. 21B is a flow chart of additional processes associated with the evaluation day for calculating NAV value of shares in a trust holding bitcoins in accordance with embodiments of the present invention. The processes described by FIG. 21B may be performed by one or more computers operated by one or more entities, such as a calculation agent 240. In a step S502', the unpaid and accrued unpaid fees and expenses since the last evaluation day, which may include each category of fees and/or expenses, may be calculated. In a step S504', the number of bitcoins to redeem for expenses may be calculated from the blended bitcoin value and the unpaid and accrued unpaid fees and expenses since the last evaluation day. In a step S506', the calculated number of bitcoins may be transferred from the trust to corresponding accounts, e.g., a sponsor account for the sponsor fee. In a step S508', the remaining number of bitcoins held by the trust may be calculated. In a step S510', the NAV may be calculated. In a step S512', the value of the NAV per share may be calculated.

The NAV and NAV per Share can be published daily after its calculation using one or more computers. A third party agent can be employed to perform the calculation and to electronically publish it. In embodiments, the following process can be used:

Step 1: Valuation of Digital Assets

In embodiments, a NAV and NAV per Share, can be struck using one or more computers each evaluation day (e.g., each day other than a Saturday or Sunday or any day on which the listing exchange 235 is not open for regular trading).

The NAV and NAV per Share striking can occur at or as soon as reasonably practicable after a predetermined time of day (e.g., 4:00 p.m. Eastern time) each evaluation day and can be conducted by the trustee.

The first step for striking the NAV may be the valuation of the digital assets held by the Trust. In embodiments, the calculation methodology for valuing the Trust's digital assets can be as follows:

Value of digital assets=(# of digital assets held by trust)×(blended digital asset price)

If the blended digital asset price is unavailable on any given day, the sponsor can instruct the use of the prior day's blended digital asset price or, if the prior day's blended digital asset Price is deemed unfair/unsuitable, such other price as it deems fair.

Step 2: Calculation of ANAV

Once the value of the digital assets in the trust has been determined on an evaluation day, the trustee, using one or more computers, can subtract all estimated accrued but unpaid fees (other than the fees accruing for such day on which the valuation takes place computed by reference to the value of the Trust or its assets), expenses and other liabilities of the trust from such NAV of the trust. The resulting figure is the adjusted net asset value ("ANAV") of the trust. The ANAV can be used to calculate fees of trustee and/or sponsor.

In embodiments, the ANAV can calculated using the following methodology:

ANAV=(value of digital assets)−(estimated accrued but unpaid fees/expenses/liabilities)

Step 3: Calculation of Daily Expense

Once the NAV has been determined, any fees or expenses that accrued since the last striking of the NAV can be calculated using one or more computers based on the evaluation day ANAV.

All fees accruing for the day (and each day since the last evaluation day) on which the valuation takes place computed by reference to the value of the trust or its assets can be calculated by one or more computers using the ANAV calculated for such evaluation day.

In embodiments, in arrears using the average of the daily ANAV for the prior month, the daily expense fee (for each day since prior evaluation day) can be estimated on a daily basis using the following methodology:

Daily Expense*=(Sponsor's Fee)+(other fees)+(other expenses or liabilities accruing since the prior Evaluation Day)

Step 4: Calculation of NAV and NAV Per Share

In embodiments, the trustee can calculate using one or more computers the NAV, by subtracting from the ANAV the Daily Expense.

In embodiments, the trustee can also calculate using one or more computers the NAV per share by dividing the NAV of the trust by the number of the shares outstanding as of the close of trading. In embodiments, the number of shares outstanding as of the close of trading may be obtained from the NYSE Arca (which includes the net number of any Shares created or redeemed on such evaluation day).

Calculation methodology:

NAV=ANAV−(Daily Expense)

NAV per Share=NAV÷(# of Shares outstanding)

The Blended Digital Asset Price

A blended digital asset price, such as a blended digital math-based asset price, can be calculated, using one or more computers, each evaluation day. Systems and methods for calculating a blended digital asset price are described in U.S. application Ser. No. 14/313,873, filed Jun. 24, 2014, the contents of which are incorporated herein by reference.

The calculation can occur as of and at or as soon as reasonably practicable after 3:00 p.m. Eastern time each evaluation day (time could also be noon, 1 p.m., 2 p.m.—simply needs to be sufficient time before NAV striking to complete the calculations).

The blended digital asset price can be the functional equivalent of a rules-based index and therefore has rules to populate the universe of data inputs and rules on calculation using such inputs. As discussed herein, the blended digital asset price can be used to create an index, to be electronically published. The index can, in turn, also serve as a price benchmark or can be used to create derivative products. Accordingly, in embodiments, a blended digital math-based asset index may be a benchmark for a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product, to name a few.

In embodiments, a blended digital asset price may be obtained from a digital asset index. For example, one or more computers may access (e.g., via an API) one or more blended digital math-based asset values from a computer or database of underlying digital asset index values. In embodiments, digital asset index values may be interpolated to determine a value at a requested point in time, e.g., 4 p.m. E.T.

Eligible Data Inputs for a Blended Digital Asset Price

In embodiments, data for the blended digital asset price can be drawn from the largest exchanges that publicly publish transaction data and principally utilize acceptable currencies, e.g., currencies other than the Chinese Yuan. In this example, the Yuan denominated exchanges may not be included because of manipulation of that currency and unreliability thereof. In embodiments, additional currency denominations may be added or excluded at one or more future dates, which may be dates following the initial formation of the trust.

The sponsor can approve each eligible exchange (which, in embodiments, can be no fewer than three to five exchanges at any given time).

Selection of Data Inputs for a Blended Digital Asset Price

The rules for the blended digital asset price can provide for the use in calculation of the data from the three largest exchanges (by volume) on the sponsor approved list.

In embodiments, this determination of the three exchanges for use can be done on a weekly basis, (e.g., on each Monday) based at least in part on the volume on each such exchange during the prior week. In embodiments, this determination could be done on a different periodic basis (e.g., on a daily basis or a monthly basis) or on a when needed basis (e.g., whenever some circumstances occurs requiring a change of determination).

In embodiments, so long as exchange selection is not on a daily basis, to the extent an exchange that has been selected for inclusion experiences a halt in trading for more than 24 consecutive hours (e.g., a lack of any recorded transactions during the prior 24 hours, regardless of the reason), that exchange can be replaced by the next largest exchange (by volume) on the sponsor approved list. In embodiments, this determination can be made automatically by one or more computers as part of an algorithm.

In embodiments, in the instance of a replacement, the restoration of daily volume on the halted exchange to a level more than the daily volume on the exchange that substituted for it could trigger a reversal of the substitution, if such restoration occurred prior to the next scheduled reconstitution of the included exchanges.

In embodiments, an exchange may be removed where there is a significant drop in trading on that exchange (e.g., 90% drop in trading volume) during a relevant time period (e.g., prior 24 hours, prior week, prior month, to name a few).

Figure 22:
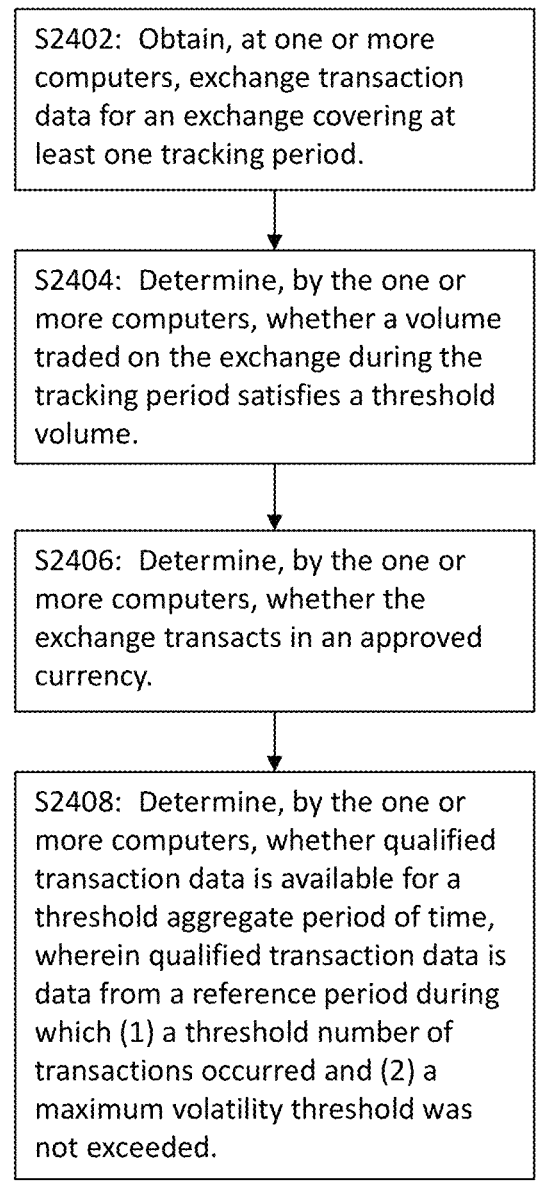
FIG. 22 is a flow chart of a process for determining qualified exchanges in accordance with exemplary embodiments of the present invention.

FIG. 22 illustrates an exemplary process for determining qualified or approved exchanges in accordance with the present invention. In embodiments, this process may be used to determine qualified money transmit businesses instead of exchanges and/or a combination thereof. The process may be programmed with computer code, which may be run on one or more processors. The process can utilize pre-defined criteria, rules, parameters, and/or thresholds to determine qualified exchanges. Such criteria can include transaction volume criteria, denomination types, geographic location, exchange data availability, exchange accessibility information (e.g., considerations of political or regulatory restrictions), regulatory compliance data, exchange customer data, and/or exchange owner data, to name a few. Thresholds can be expressed as absolute values and/or percentages.

In a step S2402, one or more computers may obtain exchange transaction data for an exchange, where the data covers at least one tracking period. The exchange data may be received via electronic transmission (e.g., over the Internet) and/or electronically accessed (e.g., using one or more APIs). The tracking period may be any period of time over which the exchange will be assessed for approval for use in the calculation of a blended digital asset price, such as 15 minutes, 1 hour, 12 hours, 24 hours, and/or 1 week, to name a few.

In a step S2404, the one or more computers may determine whether a volume traded on the exchange during the tracking period satisfies a threshold volume. In embodiments, a threshold volume may be 500 units of digital assets. In embodiments, a threshold volume may be expressed as a percent (e.g., a percent of the digital assets in circulation). The threshold may be modified periodically to help increase or decrease the number of qualified exchanges.

In a step S2406, the one or more computers may determine whether the exchange transacts in an approved currency. The computers may either test for an approved currency (e.g., by comparing to a database of approved currencies) or for an unapproved currency (e.g., by comparing to a database of unapproved currencies). In embodiments, only one currency may be approved, and the test for that currency may be hard-coded in exchange approval software. Currencies may be approved or unapproved based on considerations of reliability and/or stability, to name a few.

In a step S2408, the one or more computers may determine whether qualified transaction data is available for the exchange for a threshold aggregate period of time. Qualified transaction data may be data from a reference period during which a threshold number of transactions occurred (e.g., at least 3 transactions) and/or a maximum volatility threshold was not exceeded (e.g., the high and low price during the reference period did not fluctuate by more than 50% compared to the respective average high and low prices during that reference period of the other top (e.g., top 4) potential qualified exchanges by volume). In embodiments, transaction data may be evaluated from a plurality of reference periods to determine whether the data satisfies qualification criteria for a In embodiments, transaction data to be qualified must satisfy qualification criteria for at least a specified period of time, which may be sub-divided into reference periods. For example, qualified transaction data may be determined for reference periods of 15 minutes, and to be a qualified exchange, the exchange must have qualified transaction data for an aggregate of at least 10 hours (40 reference periods) over a 24-hour tracking period. In embodiments, if an exchange satisfies each of the criteria examined in this exemplary process, it may be considered a qualified exchange for the tracking period over which it was examined. The determination of qualified exchanges may be performed at the end of each tracking period or on a rolling basis (e.g., re-evaluated at the end of each reference period).

Description of Electronic Data Pulled from Inputs

For each exchange on the approved list, the prior 24 hours of data setting forth each trade on the exchange by execution price and quantity transacted can be obtained, e.g., received and/or retrieved. Such transaction data may be obtained In embodiments, one or more digital asset prices, such as, e.g., closing price, traded value, bid price, ask price, and/or spot price, to name a few, may be obtained. In embodiments, only the highest and lowest exchange prices and their respective transaction volumes may be obtained. In embodiments, all exchange price and transaction data may be obtained. In embodiments, a shorter period of time than 24 hours may be used, e.g., 12 hours, 3 hours, to name a few, or a longer period of time such as 48 hours may be used, to insure a sufficient volume of transaction data is considered.

Application of Electronic Data

For each of the exchanges included in the calculation for any given evaluation day, an average price for such date can be used. In embodiments, using each average exchange price for such date, a blended and weighted average price for all exchanges can be extracted and used as the blended digital asset price.

In embodiments, a blended digital asset price may be calculated by first calculating each selected exchange's daily average and then blending (e.g., averaging) the averages into a blended digital asset price. The daily average may be a time-weighted (e.g., exponential) moving mean and/or volume weighted mean. In other embodiments, a blended digital asset price may be calculated using the data from the selected exchanges (e.g., the top 3 qualified exchanges) without first determining single exchange averages.

Single Exchange Average

In embodiments, a single exchange averages may be used instead of a blended digital asset price. In other embodiments, single exchange averages may be combined into a blended digital asset price.

In embodiments, the single exchange average may be calculated by one or more computers using the unweighted mean average of the high and low trading prices for such day (the average price of each trade during the day—which could be subject to manipulation through outlier price trades).

In embodiments, the single exchange average may be calculated by one or more computers using the weighted mean average of the high and low trading prices for such day (e.g., the trading price for each share traded that day, rather than for each executed trade regardless of share size).

In embodiments, the single exchange average may be calculated by one or more computers using the median average of the high and low trading prices for such day.

In embodiments, the single exchange average may be calculated by one or more computers using the weighted median average of the high and low trading prices for such day.

In embodiments the single exchange average may be calculated by one or more computers using any of a median, weighted median, average, and/or weighted average (by volume, time, or otherwise), any of which may be taken of high and low trading prices for a time period (e.g., 1 day, 1 hour, 15 minutes, to name a few), of the second highest and second lowest trading prices for a time period, and/or of all trades during a time period. For example, all transaction price data for a time period may be weighted by the volume transacted at the prices and/or by time (e.g., linearly or exponentially) in order to give greater weight to the more recent price data. Coefficients or other factors may be used to adjust the weighting so as to dampen or exacerbate any price fluctuations. For example, in embodiments, a coefficient for exponential weighting may be 0.69. In other embodiments, such a coefficient may be approximately 0.5, approximately 0.6, approximately 0.7, approximately 0.8, approximately 0.9, to name a few. Accordingly, in embodiments, a coefficient of exponential weighting can fall with a range 0.5-0.9, within a range 0.6-0.8, or within a range 0.7-0.8, to name a few.

Blended Digital Asset Price

In embodiments, the blended digital asset price can be calculated by the average of the single exchange averages. In embodiments, the average may be weighted by volume. An average may weight different exchanges differently in order to account for differences in ease of access of funds from an exchange and/or ease of transacting on the exchange. As described herein, a blended digital asset price may be calculated as part of providing a generated digital asset index.

Figure 23A:
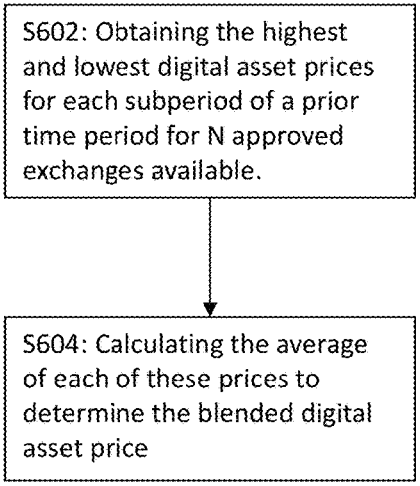

In embodiments, the blended digital asset price may be calculated as illustrated in FIG. 23A. In step S602, one or more computers may obtain the highest and lowest digital asset prices for each sub-period of a prior time period for N approved exchanges available. In embodiments, N may be the 3 largest approved exchanges. In step S604, each of these values may be averaged, using one or more computers, to determine a blended digital asset price for the prior sub-period. In embodiments, the blended digital asset price may be calculated for a 12-hour period or for a 24-hour period. In embodiments, the blended digital asset price may be calculated using a mean average transaction price weighted by volume.

Figure 23B:
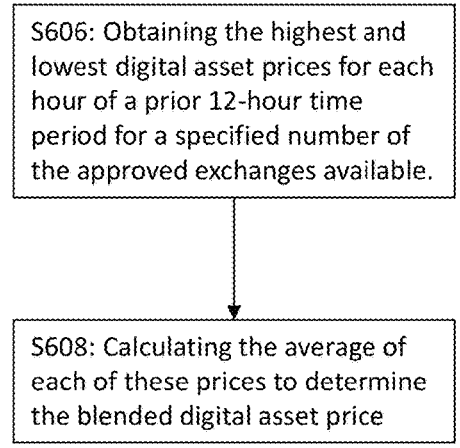

FIG. 23B illustrates a process for calculating the blended digital asset price using a 12-hour sub-period. In a step S606, one or more computers may obtain the highest and lowest digital asset prices for each hour of a prior 12-hour time period for a specified number N of the approved exchanges available. In a step S608, each of the values may be averaged, using one or more computers, to determine a blended digital asset price for the 12-hour period.

Figure 23C:
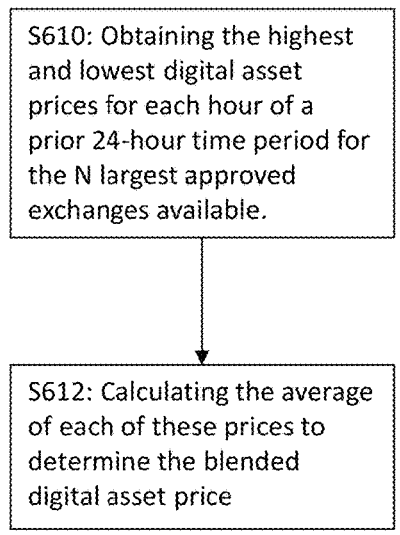

FIG. 23C illustrates a process for calculating the blended digital asset price using a 24-hour sub-period. In a step S610, one or more computers may obtain the highest and lowest digital asset prices for each hour of a prior 24-hour time period for a specified number N of the approved exchanges available. In a step S612, each of the values may be averaged, using one or more computers, to determine a blended digital asset price for the 24-hour period.

Figure 23D:
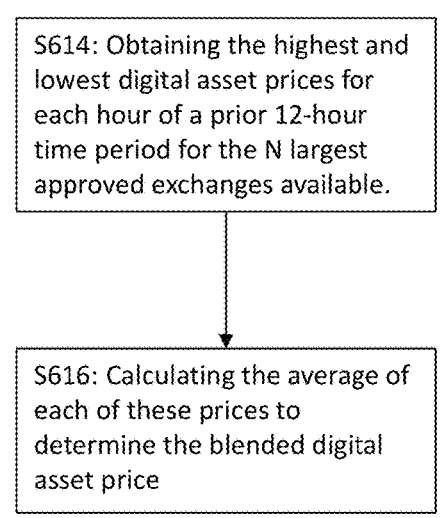

FIG. 23D illustrates a process for calculating the blended digital asset price using a 12-hour sub-period. In a step S614, one or more computers may obtain the highest and lowest digital asset prices for each hour of a prior 12-hour time period for the three largest of the approved exchanges available. In a step S616, each of the values may be averaged, using one or more computers, to determine a blended digital asset price for the 12-hour period.

FIG. 23E illustrates another process for calculating a blended digital asset price. In a step S620, one or more computers may determine one or more reference exchanges. The reference exchanges may be the top N (e.g., 3) qualified exchanges by volume exchanged during a tracking period. A tracking period may be any period of time, such as 15 minutes, 30 minutes, 1 hour, 6 hours, or 12 hours, to name a few. Reference exchanges may be selected from a list of approved or qualified exchanges (e.g., approved by the sponsor). An exemplary process for approving exchanges to determine qualified exchanges is described herein with respect to FIG. 22. Reference exchanges may be determined each tracking period or may be determined over longer periods. For example, the reference exchanges may be determined at a fixed time each day. In a step S622, for each reference exchange, the one or more computers can determine highest and lowest exchange prices, as well as the corresponding volumes of digital assets exchanged at those high and low prices during a reference period. In embodiments, the reference period may be a different amount of time than the tracking period during which the reference exchanges are determined. In a step S624, one or more computers may calculate a blended digital asset price by averaging the high and low prices from each reference exchange, weighted by the respective volume of digital assets traded at each high and low price during the reference period.

FIG. 23F illustrates another exemplary process for calculating a blended digital asset price. In a step S620, one or more reference exchanges may be determined, as described with respect to FIG. 23E. In a step S622a, for each reference exchange, the one or more computers can determine second highest and second lowest exchange prices, as well as the corresponding volumes of digital assets exchanged at those second highest and second lowest prices during a reference period. In a step S624, one or more computers may determine a weighted average of the determined second highest and second lowest prices from each reference exchange, where the weighted average is weighted by volume exchanged at each price, as discussed with respect to FIG. 23E.

Figures 23G, 23H:
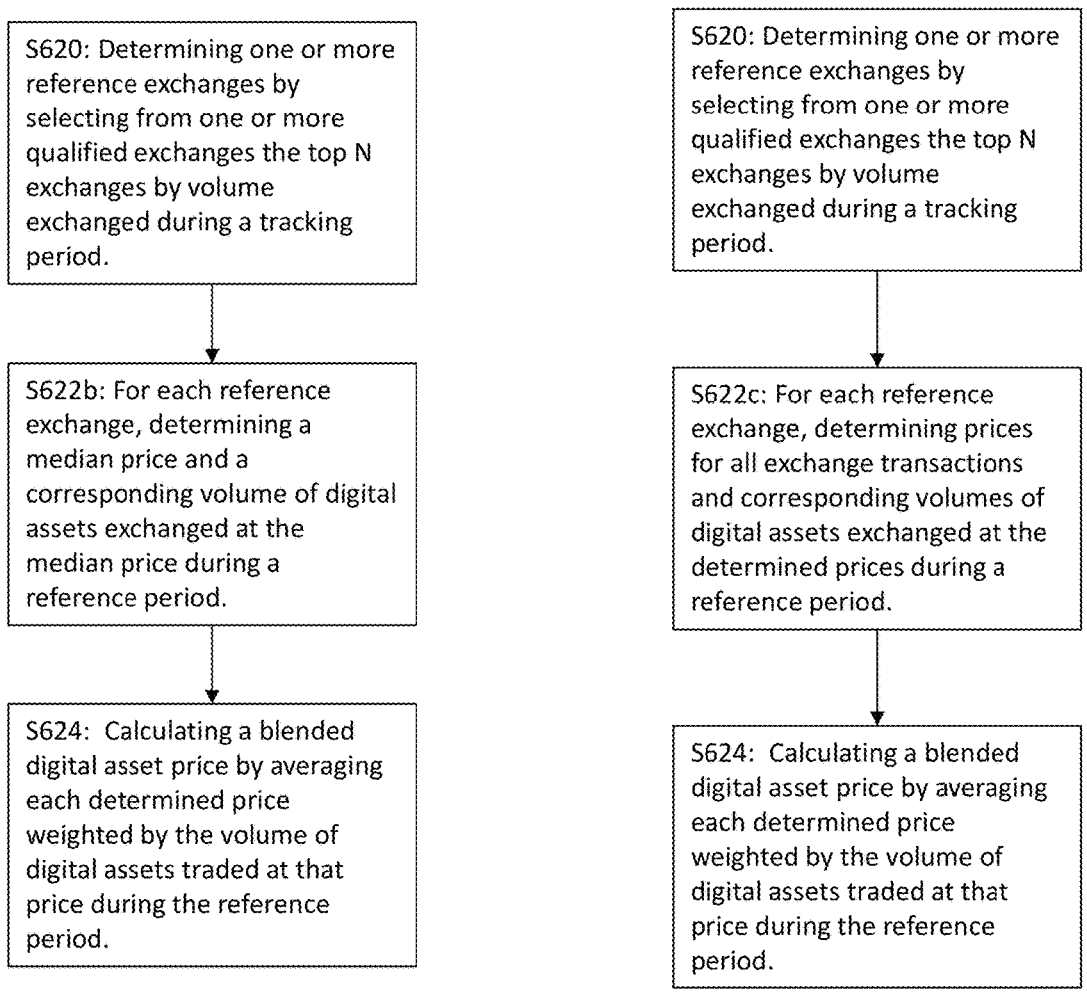

FIG. 23G illustrates another exemplary process for calculating a blended digital asset price. In a step S620, one or more reference exchanges may be determined, as described with respect to FIG. 23E. In a step S622b, for each reference exchange, the one or more computers can determine a median price and corresponding volumes of digital assets exchanged at that price during a reference period. In a step S624, one or more computers may determine a volume weighted average of the determined median prices from each reference exchange, as discussed with respect to FIG. 23E.

FIG. 23H illustrates another exemplary process for calculating a blended digital asset price. In a step S620, one or more reference exchanges may be determined, as described with respect to FIG. 23E. In a step S622c, for each reference exchange, the one or more computers can determine prices for all exchange transactions and corresponding volumes of digital assets exchanged at those prices during a reference period. In a step S624, one or more computers may determine a volume weighted average of the determined exchange prices from the one or more reference exchanges, as discussed with respect to FIG. 23E. In embodiments, the digital asset prices from each reference period may be weighted by time, e.g., so as to preference more recent reference periods. Such weighting may be exponential weighting, such as an exponentially time-weighted moving average. Other moving averages may be employed, with or without weighting, such as a simple moving average, a cumulative moving average, a weighted moving average, and/or a volume weighted moving average, to name a few. Transaction data may be weighted by both volume and time, for example, by applying a volume weighted average as well as an exponential time-weighted moving average. Accordingly, an exponential volume-weighted moving average may be employed, applying an exponential weighting to transaction volumes over shifting period of time (e.g., a trailing 2-hour window).

Figure 24:
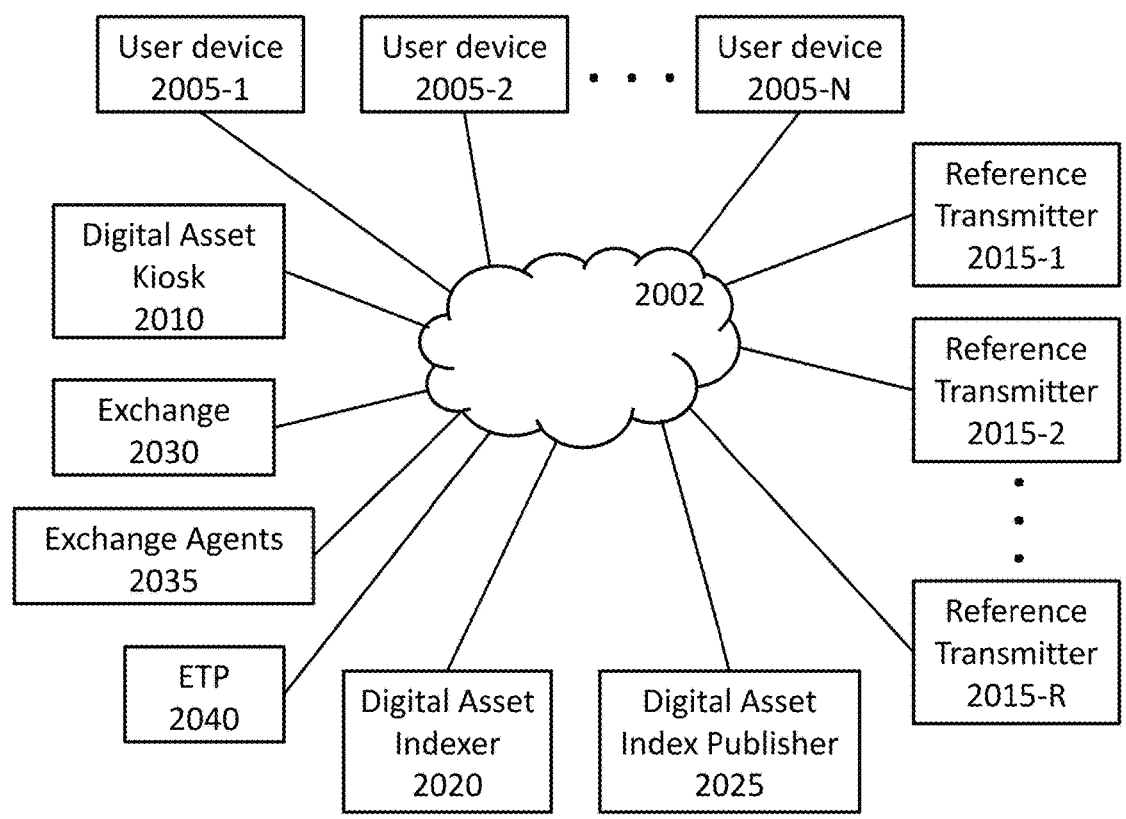
FIG. 24 is a schematic diagram of participants in a system for providing a digital asset index and a digital asset exchange in accordance with exemplary embodiments of the present invention.

FIG. 24 illustrates an exemplary system for providing a digital asset index in accordance with the present invention. A digital asset index system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025 (e.g., Winkdex, Bloomberg, Google, Yahoo, to name a few), one or more exchanges 2030, one or more exchange agents 2035, and/or an exchange traded product computer system 2040, to name a few. Any of the components involved in a digital asset index system may be connected directly (e.g., through wired or wireless connections) or indirectly, such as through a data network 2002. Any of the components of a digital asset index system can comprise or include a computer system comprising one or more computers. Accordingly, any of the components may have at least one or more processors, computer-readable memory, and communications portals for communicating with other components of the system and/or outside entities.

Still referring to FIG. 24, a user device 2005 may be a mobile phone, smart phone, PDA, computer, tablet computer, and/or other electronic device that can receive communications. A user device 2005 may run software, such as a digital wallet, for accessing a digital asset index or may access a digital asset index through a general Internet browser. A digital asset kiosk 2010 may also access a published digital asset index, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An application programming interface ("API") may be used to provide access to a digital asset index from one or more third-party devices or computer systems. An embeddable widget may be provided to enable display on a third-party website of digital asset index data and/or index visualizations (e.g., graphs, charts, and/or accompanying visualization options, such as time range).

Still referring to FIG. 24, data from one or more reference transmitters 2015 may be used to generate an index, as discussed herein. Transmitters may be money service businesses or money transmit businesses in the United States. Transmitters 2015 may be part of a digital asset exchange 2030. Exchanges 2030 outside the United States may function like transmitters, e.g., performing all or part of the roles ascribed herein to transmitters 2015, but without the same money transmit licenses as required in the United States.

FIG. 25A is another flow chart of an exemplary process for providing a blended digital math-based asset price in accordance with the present invention.

In a step S822, one or more computers may access from one or more electronic databases stored on computer-readable memory, electronic digital math-based asset pricing data associated with a first period of time for a digital math-based asset from a plurality of reference digital math-based asset exchanges (e.g., four exchanges). In embodiments, the electronic pricing data can include transaction prices and/or bid and ask prices, to name a few. In embodiments, the one or more computers may access transaction data, including transaction volume data.

In a step S824, the one or more computers may determine a plurality of qualified digital math-based asset exchanges (e.g., three exchanges) from the plurality of reference digital math-based asset exchanges. In embodiments, the plurality of qualified exchanges may be determined by evaluating, by the one or more computers, electronic exchange selection criteria, which may comprise one or more electronic exchange selection rules.

In a step S826, a blended digital math-based asset price for the first period of time may be calculated, using the one or more computers, using a volume weighted average of the electronic digital math-based asset pricing data from the plurality of qualified exchanges for the first period of time.

In a step S828, the one or more computers may store in one or more databases the blended digital math-based asset price for the first period of time. In embodiments, the databases may be remotely located, e.g., in a cloud computing architecture. In embodiments, the databases may store one or more other blended digital math-based asset prices corresponding to one or more other periods of time.

In a step S830, the one or more computers may publish to one or more other computers the blended digital math-based asset price for the first period of time. As described herein, publishing can comprise transmitting the price to one or more computer, transmitting the price to one or more user electronic device (e.g., a mobile phone), providing the price to an electronic display (e.g., a scrolling display), and/or providing the price to a website, to name a few. In embodiments, the price may be published from the database of blended digital math-based asset prices. In other embodiments, the price may be published by the calculating computer directly, e.g., from working memory.

FIG. 25B is a flow chart of another exemplary process for electronically generating an index of digital asset prices.

In a step S842, a first plurality of constituent digital math-based asset exchanges may be determined, using the one or more computers, for a first period of time (e.g., a 24-hour period). In embodiments, electronic digital math-based asset pricing data and associated volume data may be obtained, at the one or more computers, for a first tracking period for each of a plurality of reference digital math-based asset exchanges. In embodiments, the total volume of transactions made on the respective exchange during the tracking period may be calculated, by the one or more computers, for each of the plurality of reference digital math-based asset exchanges. In embodiments, a first plurality of constituent digital math-based asset exchanges may be determined, by the one or more computers, by ranking the plurality of reference digital math-based asset exchanges by total volume for the tracking period and selecting a second plurality of the reference digital math-based asset exchanges (e.g., three) according to the largest total volumes, wherein the second plurality is less than the first plurality.

In embodiments, the process for determining the first plurality of constituent digital math-based asset exchanges can further comprise determining, by the one or more computers, for each of the plurality of reference digital math-based asset exchanges whether the total volume of transactions made on the respective exchange during the tracking period satisfies a threshold volume; determining, by the one or more computers, whether the digital math-based asset exchange transacts in an approved currency; and determining, by the one or more computers, for each of the plurality of reference digital math-based asset exchanges whether qualified transaction data is available from the respective digital math-based asset exchange for a threshold aggregate period of time, wherein qualified transaction data is data from a calculation period during which (1) a threshold number of transactions occurred and (2) a maximum volatility threshold was not exceeded, and wherein a calculation period is a subperiod of the tracking period.

In a step S844, electronic digital math-based asset pricing data may be obtained, using the one or more computers, for each of the first plurality of constituent digital math-based asset exchange for a first subperiod of the first period of time (e.g., a 2-hour period within the first period of time). In embodiments, electronic digital math-based asset pricing data (e.g., transaction prices, bid and ask prices, transaction volume data, to name a few) may be obtained, using the one or more computers, for each of the first plurality of constituent digital math-based asset exchange for a second subperiod of the first period of time.

In a step S846, a blended digital math-based asset price may be determined, using the one or more computers, for the first subperiod, by calculating an exponential volume-weighted moving average of the digital math-based asset pricing data for each of the first plurality of constituent digital math-based asset exchange for the first subperiod. In embodiments, a blended digital math-based asset price may be determined, using the one or more computers, for the second subperiod, by calculating an exponential volume-weighted moving average of the digital math-based asset pricing data for each of the first plurality of constituent digital math-based asset exchange for the second subperiod. In embodiments, the exponential moving average utilizes a coefficient between 0.6 and 0.8.

In a step S848, the blended digital math-based asset price may be stored, using the one or more computers, for the first subperiod in a blended price database stored on computer-readable memory operatively connected to the one or more computers. In embodiments, the blended digital math-based asset price may be stored, using the one or more computers, for the second subperiod in the blended price database. In embodiments, the blended price database may comprise at least blended digital math-based asset prices at a specified interval, e.g., prices every 15 seconds, every minute, and/or once per day, such as at a specified time each day, to name a few. Accordingly, prices at the intervals may be interpolated from the blended digital asset prices closest in time.

In a step S850, blended digital math-based asset price for the first subperiod may be published, by the one or more computers. In embodiments, blended digital math-based asset prices may be published, by the one or more computers, for a plurality of consecutive subperiods during the first period of time. In embodiments, the blended digital math-based asset price for the first subperiod or for the plurality of consecutive subperiods may be published from the blended price database. In embodiments, the blended digital math-based asset price may be published to one or more user devices. In embodiments, the blended digital math-based asset price may be electronically published through a dedicated website and/or through one or more electronic access points. The blended digital asset price can be published, using one or more computers, on the trust's website and distributed to APs. The blended digital asset price may form the basis of a digital asset index, as discussed herein. In embodiments, no intraday blended digital asset price may be required to be published throughout the day.

Still referring to step S850, a graphical representation of blended digital math-based asset prices may be generated, by the one or more computers. The graphical representation may include the blended digital math-based asset prices for the plurality of consecutive subperiods during the second period of time. The graphical representation may be provided from the one or more computers to the one or more second computers. In embodiments, the graphical representation includes a graphical representation of the digital math-based asset pricing data for each of the first plurality of constituent digital math-based asset exchanges for the plurality of consecutive subperiods during the second period of time. In embodiments, the graphical representation further includes a second graphical representation of volume data for each of the first plurality of constituent digital math-based asset exchanges for the plurality of consecutive subperiods during the second period of time.

In still other embodiments, an API for accessing the blended digital math-based asset price may be provided, by the one or more computers to one or more third computers. An electronic API request to access a blended digital math-based asset price for a subperiod may be received, by the one or more computers from the one or more third computers, and the blended digital math-based asset price for the first subperiod may be provided by the one or more computers to the one or more third computers.

In embodiments, generating a blended digital asset price and/or a blended digital asset price index can comprise accessing transaction data from a plurality of exchanges, as described herein. Such processes can include data normalization, which can convert data to a consistent and/or uniform format. For example, digital asset price data from one exchange may be provided in units of bitcoin, while price data from another exchange may be provided in units of milli-bitcoin, and data from another exchange may be provided in satoshis. Upon accessing the data from the different exchanges, the data may be converted to a common format, such as milli-bitcoin. In embodiments, time data may also be converted to a common format, e.g., 24-hour time, and/or a common time zone, e.g., GMT.

In an exemplary embodiment, a blended digital asset price may be calculated by blending the trading prices in U.S. dollars for the top three (by volume) qualified exchanges during the previous two-hour period using a volume-weighted exponential moving average. Constituent exchanges of the index can be selected according to rules, such as requiring that the exchanges have electronic trading platforms on which users may buy or sell digital assets with other users in exchange for U.S. dollars. The value of the index (including a daily spot price) can be determined using exchange transaction data on a moving average basis over a trailing two-hour period. The computer code used to generate the index may weight exchange transactions by volume on a proportional basis. In order to reflect the latest in pricing information, the most recent transactions may be weighted exponentially greater than earlier transactions in the two-hour period.

Example of ETP Process

Without meaning to limit the scope of the present invention, the following examples illustrate exemplary embodiments in accordance with the present invention and set forth the basic operation of the trust on a day-to-day basis by reflecting exemplary creations, redemptions, payments of the sponsor's fee, netting of transfers, trustee instructions and actions, and the creation and activation of cold storage digital wallets from the cold storage vault security system.

Each of these examples assume the following facts:
There are two authorized participants (AP1 and AP2).
The Trust is comprised of 5,000,000 outstanding shares, represented by underlying assets totaling 999,370.51327457 bitcoins. Assuming a blended bitcoin price of $200.00, the trust NAV is $199,728,984.50 as of the open of business on Day 1. For the purpose of this example, the blended bitcoin price does not change.

Each creation unit is represented by 9,986.44922498 bitcoins. While the trust will be formed at 10,000 bitcoins per 50,000 share creation units on the purchase of the seed baskets, the operation of the trust and accumulation of accrued expenses will reduce the bitcoins per creation unit rate over time.

Of the 10,000 cold storage digital wallets generated by the trustee in the formation of the trust, the following is a breakdown of their use status:

1,000 wallets are in use in cold storage, with 999 wallets holding 1,000 bitcoins and one partially filled wallet holding 370.51327457 bitcoins;

422 cold storage wallets have expired due to use for spot checking or activation by recall of paper tokens; and 8579 wallets remain inactive in cold storage.

The partially filled cold storage digital wallets has index number 02814 and holds 370.51327457 bitcoins.

The sponsor's fee is 1.00% per annum.

In the exemplary embodiments described in the following examples, the trust operates by rounding only to the nearest Satoshi, which is one hundred-millionth of a bitcoin. As a result, transactions in bitcoins will be reflected to eight decimal places. To assist in the orderly netting and administration of the administrative portal and the cold storage security system, a three business day settlement period is used. The sponsor's fee represents the trust's only expected regular charge. These examples do not include extraordinary expenses, meaning that the sponsor's fee will be the only expense accruing on a daily basis. This will be reflected in the reduction of the bitcoins represented by a creation unit on each of the three days of the example.

Example 1

In Example 1, the following particular facts are assumed: AP1 places a creation order for three creation unit. AP2 places a redemption order for one creation unit. No Sponsor's Fee or extraordinary expenses payable on settlement date. The trust composition is: 5,000,000 outstanding Shares, representing 999,370.51327457 bitcoins. bitcoins per creation unit: 9,986.44922498. Amount of bitcoins in only partially-filled cold storage digital wallets (Index Number 02814): 370.51327457.

On day T, AP1 and AP2 place their orders for three creation units and one redemption, respectively. Trustee accepts the creation and redemption orders and confirms such receipt to AP1 and AP2.

On day T+1, trustee calculates expected netting to be 1 creation unit (i.e., 3 creation units created less 1 creation unit redeemed; no expected Sponsor's Fee or extraordinary expense payments). Trustee determines that no paper tokens need to be retrieved for withdrawals or distributions of bitcoins on the settlement date. The trustee determines and identifies 20 cold storage digital wallets from the Index Number-Public Key list for deposit activation for settlement date creations.

On day T+2, AP1 submits a creation wallet address supplement identifying the public key from which AP1 can deposit its creation deposit of 29,959.34767494 bitcoins. Using the administrative portal, trustee generates a wallet for the AP1 custody account and provides such wallet's public key to AP1 to receive the creation deposit. AP2 submits a redemption wallet address supplement identifying the public key to which AP2 can receive its redemption proceeds of 9,986.44922498 bitcoins. Using the administrative portal, trustee generates a wallet for the AP2 custody account and provides such wallet's public key to AP2 as the account distributing bitcoins. AP1 delivers 29,959.34767494 bitcoins to the public key identified for its AP1 custody account. Trustee acknowledges receipt of such creation deposit. AP2 delivers 50,000 shares to the trust through the third-party clearing agency (e.g., DTC) clearance process. Trustee acknowledges receipt of such share tender.

On day T+3 (Settlement Date), for netting purposes and using the administrative portal, trustee generates a wallet for the trust custody account and transfers 9,986.44922498 bitcoins from the AP1 custody account to such wallet in the trust custody account. Using the administrative portal, the trustee transfers 9,986.44922498 bitcoins from a trust custody account to the newly created wallet in the AP2 custody account; transfers such bitcoins from the AP2 custody account to wallet associated with the Public Key identified by AP2 as its outside account; and instructs the third-party clearing agency (e.g., the DTC) to cancel the 50,000 shares tendered by AP2, in settlement of the redemption. Using the administrative portal, trustee transfers 629.48672543 bitcoins from the AP1 custody account to partially-filled cold storage digital wallets (Index Number 02814) in cold storage; transfers 1,000 bitcoins each from AP1 custody account to 19 additional newly-activated cold storage digital wallets in cold storage; transfers 343.41172453 bitcoins from AP1 custody account to the newly activated cold storage digital wallets (Index Number 08649) in cold storage; and instructs the third-party clearing agency (e.g., the DTC) to transfer 150,000 newly issued shares to AP1 and to cancel the 50,000 shares tendered by AP2, in settlement of the creation.

At the end of this process, there is a net gain of 100,000 shares (2 creation units) issued and 19,972.89844996 bitcoins deposited into the trust; 20 cold storage digital wallets activated, no cold storage digital wallets expired. All temporary wallets are discarded after use. Amount of bitcoins in only partially-filled cold storage digital wallets (Index Number 08649): 343.41172453.

Example 2

Example 2 is treated as the next business day after settlement of Example 1. In Example 2, the following additional particular facts are assumed: AP1 places a creation order for two creation units. AP2 places a redemption order for two creation units. Sponsor's Fee of 837.22012681 bitcoins is due. The trustee can have calculated the sponsor's fee and the sponsor can have confirmed this calculation and provided a Public Key for its outside account prior to Day T. No extraordinary expenses are due payable on settlement date. The trust composition is: 5,100,000 outstanding shares, representing 1,019,343.41172453 bitcoins. The bitcoins per creation unit is: 9,985.35481959 (reduced because of four days of accrued but unpaid Sponsor's Fee). Amount of bitcoins in only partially-filled cold storage digital wallet (Index Number 08649): 343.41172453.

On day T, AP1 and AP2 place their orders for two creation units and two redemption units, respectively. Trustee accepts the creation and redemption orders and confirms such receipt to AP1 and AP2.

On day T+1, trustee calculates expected netting of 19,970.70963918 (i.e., 2 creation units created less 2 creation units redeemed less expected sponsor's fee, with no expected extraordinary expense payments). Trustee determines that one public key must be retrieved through paper tokens for sponsor's fee distributions on the settlement date and requests that the custodian deliver the paper token for the selected Index Number (cold storage digital wallet 00185) from sets A1, A2 and A3. The Trustee determines that only partially-filled cold storage digital wallet Index Number 08649 can be required for deposit activation for remainder bitcoins from the sponsor's fee distribution.

On day T+2, AP1 submits a creation wallet address supplement identifying the public key from which it can deposit its creation deposit of 19,970.70963917 bitcoins. Using the administrative portal, trustee generates a wallet for the AP1 custody account and provides such wallet's public key to AP1 to receive the creation deposit. AP2 submits a redemption wallet address supplement identifying the public key to which it can received its redemption proceeds of 19,970.70963917 bitcoins. Using the administrative portal, trustee generates a wallet for the AP2 custody account and provides such wallet's public key to AP2 as the account distributing bitcoins. Custodian delivers to trustee (or trustee collects from custodian's premises) the paper tokens for the selected Index Number (cold storage digital wallet 00185) from sets A1, A2 and A3. Trustee scans the QR codes, decrypts and reassembles the Private key and decrypts the public key for cold storage digital wallet 00185. AP1 delivers 19,970.70963917 bitcoins to the public key identified for its AP1 custody account. Trustee acknowledges receipt of such creation deposit. AP2 delivers 50,000 shares to the trust through the third-party clearing agency 250 (e.g., the DTC) clearance process. Trustee acknowledges receipt of such share tender.

On day T+3, settlement occurs. For netting purposes and using the administrative portal, Trustee generates a Wallet for the trust custody account and transfers 19,970.70963917 bitcoins from the AP1 Custody Account to such Wallet in the trust custody account. Using the administrative portal, the trustee transfers 19,970.70963917 bitcoins from the trust custody account to the newly created wallet in the AP2 custody account; transfers such bitcoins from the AP2 custody account to wallet associated with the public key identified by AP2 as its outside account; and instructs the third-party clearing agency (e.g., the DTC) to transfer 100,000 newly issued shares to AP1, in settlement of the creation, and to cancel the 100,000 shares tendered by AP2, in settlement of the redemption. Using the administrative portal, trustee generates a wallet in the sponsor custody account and transfers 837.22012681 bitcoins from Index Number cold storage digital wallets 00185 to the newly created sponsor custody account wallet. Trustee also transfers such bitcoins from the sponsor custody account to the public key identified by sponsor as its outside account; and transfers 162.77987319 bitcoins from Index Number cold storage digital wallet 00185 to the partially filled index number cold storage digital wallet 08649 in cold storage.

At the end of this process, there is no net change of shares issued. bitcoins deposited with the Trust is reduced by 837.22012681. No new cold storage digital wallets activated by deposit; one cold storage digital wallets expired after recall from cold storage and use. All temporary wallets discarded after use. Amount of bitcoins in only partially-filled cold storage digital wallet (Index Number 08649): 506.19159772.

Example 3

Example 3 is treated as the next business day after settlement of Example 2. In Example 3, the following additional particular facts are assumed: AP2 places a redemption order for four creation units. AP1 does not place any order. No Sponsor's Fee or extraordinary expenses payable on settlement date. The trust composition is: 5,100,000 outstanding shares, representing 1,018,506.19159772 bitcoins. bitcoins per creation unit is: 9,985.08121824 (reduced because of four days of accrued but unpaid Sponsor's Fee). Amount of bitcoins in only partially-filled cold storage digital wallet (index Number 08649): 506.19159772.

On day T, AP2 place its redemption order for four creation units. Trustee accepts the redemption order and confirms such receipt to AP2.

On day T+1, trustee calculates expected netting (none). Trustee determines that 40 public keys need to be retrieved through paper tokens for redemption distributions on the settlement date and requests that the custodian deliver the paper tokens for the selected Index Numbers from sets A1, A2 and A3. The trustee determines that only partially-filled cold storage digital wallets Index Number 08649 can be required for deposit activation for remainder bitcoins from the redemption proceeds withdrawal.

On day T+2, AP submits "redemption wallet address supplement" identifying the public key to which it can received its redemption proceeds of 39,940.32487295 bitcoins. Using the administrative portal, trustee generates a wallet for the AP2 custody account and provides such wallet's public key to AP2 as the account distributing bitcoins. Custodian delivers to trustee (or trustee collects from custodian's premises) the paper tokens for the selected 40 cold storage digital wallets by Index Number from Sets A1, A2 and A3. Trustee scans the QR codes, decrypts and reassembles the Private Keys and decrypts the Public Keys for the 40 cold storage digital wallets by Index Number. AP2 delivers 200,000 shares to the Trust through the third-party clearing agency (e.g., the DTC) clearance process. Trustee acknowledges receipt of such share tender.

On day T+3 (Settlement Date), using the administrative portal, the trustee transfers 1,000 bitcoins from each of 39 of the cold storage digital wallets pulled from cold storage to the newly created wallet in the AP2 custody account, totaling 39,000 bitcoins; transfers 940.32487295 bitcoins from the remaining cold storage digital wallet pulled from cold storage to the newly created wallet in the AP2 custody account; transfers 59.67512705 bitcoins from the remaining cold storage digital wallet to partially-filled cold storage digital wallet (Index Number 08649); transfers the total of 39,940.32487295 such bitcoins from the wallet in AP2 custody account to the public key identified by AP2 as its outside account; and instructs the third-party clearing agency (e.g., the DTC) to cancel the 200,000 shares tendered by AP2, in settlement of the redemption.

At the end of this process, there is a reduction of 20,000 shares issued by the trust and a reduction of 39,940.32487295 bitcoins deposited with the trust. No new cold storage digital wallets activated by deposit; forty cold storage digital wallets expired after recall from cold storage and use. All temporary wallets discarded after use. Amount of bitcoins in only partially-filled cold storage digital wallet (Index Number 08649): 565.86672477.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A digital asset account administrative system associated with a digital asset, the system comprising:
(a) a computer comprising one or more processors and computer-readable memory operatively connected to the one or more processor;
(b) one or more first writing devices operatively connected to the computer; and
(c) one or more second writing devices operatively connected to the computer,
wherein the computer, the one or more first writing devices and the one or more second writing devices are, collectively, operatively and physically separated from any network by an air gap so that the computer is an isolated computer, and
wherein the computer-readable memory stores thereon instructions that, when executed by the one or more processors, cause the one or more processors to perform the steps of:
(i) generating, using the isolated computer, a plurality of digital asset accounts capable of holding one or more digital math-based assets that are tracked by a decentralized digital asset network that uses a decentralized electronic ledger in the form of a blockchain maintained by a plurality of physically remote computer systems;
(ii) generating, using the isolated computer, one or more private keys and a digital asset account identifier corresponding to each of the plurality of digital asset accounts;
(iii) associating, using the isolated computer, each of the one or more digital asset accounts with a respective reference identifier;
(iv) dividing, using the isolated computer, at least one of the one or more private keys corresponding to each of the plurality of digital asset accounts into a plurality of private key segments, wherein two or more private key segments as a subset of the plurality of private key segments that includes less than all of the plurality of private key segments are required to regenerate the respective private key;
(v) transmitting, from the isolated computer to the one or more first writing devices, electronic writing instructions for writing each of the plurality of private key segments and the respective reference identifier to a respective removable storage medium;
(vi) writing, using the one or more first writing devices, each respective private key segment of the plurality of private key segments and the respective reference identifier on a respective removable storage medium according to the electronic writing instructions; and
(vii) writing, using the one or more second writing devices operatively connected to the isolated computer, each of the digital asset account identifiers along with the corresponding reference identifier to a storage medium.

2. The digital asset account administrative system of claim 1, wherein the writing step (vi) further comprises the steps of:
(A) transmitting, from the isolated computer to the one or more first writing devices, second electronic writing instructions for writing each of the digital asset account identifiers along with the corresponding reference identifier; and
(B) writing, using the one or more first writing devices, each of the digital asset account identifiers along with the corresponding reference identifier according to the second writing instructions.

3. The digital asset account administrative system of claim 2, wherein the writing step (B) comprises writing to an electronic storage medium.

4. The digital asset account administrative system of claim 2, wherein the writing step (B) comprises writing to a physical storage medium.

5. The digital asset account administrative system of claim 4, wherein the physical storage medium is paper.

6. The digital asset account administrative system of claim 1, wherein the computer-readable memory further stores thereon instructions that, when executed by the one or more processors, cause the one or more processors to perform the additional steps of:
(viii) writing, using the isolated computer, the respective digital asset account identifiers to a removable electronic storage medium.

7. The digital asset account administrative system of claim 1, wherein the computer-readable memory further stores thereon instructions that, when executed by the one or more processors, cause the one or more processors to perform the additional steps of:
(viii) encrypting, using the isolated computer, each of the plurality of private key segments.

8. The digital asset account administrative system of claim 7, wherein the encrypting step (viii) comprises using at least one of the following encryption techniques: symmetric-key encryption, asymmetric-key encryption, scrambling, substitution, hashing, or adding characters.

9. The digital asset account administrative system of claim 1, wherein the one or more first writing devices are printers.

10. The digital asset account administrative system of claim 1, wherein the removable storage medium comprises a storage medium of a type selected from the group consisting of: computer hard drive, disk, tape, memory card, flash memory, CD-ROM, and DVD.

11. The digital asset account administrative system of claim 1, wherein the removable storage medium is a card, and the transmitting step (v) comprises:
transmitting, from the isolated computer to the one or more first writing devices, electronic writing instructions for writing each of the plurality of private key segments and the respective reference identifier on a respective card to generate a plurality of collated sets of cards wherein each of the collated sets of cards comprises cards corresponding to different private keys and wherein the plurality of collated sets includes one or more duplicate sets for each of the collated sets of cards.

12. The digital asset account administrative system of claim 11, wherein the writing step (vi) comprises:
writing, using the one or more first writing devices, each respective private key segment of the plurality of private key segments and the respective reference identifier on a respective card according to the electronic writing instructions.

13. The digital asset account administrative system of claim 12, wherein the respective cards are plastic.

14. The digital asset account administrative system of claim 12, wherein the respective cards are a paper product.

15. The digital asset account administrative system of claim 12, wherein the respective cards are laminated.

16. The digital asset account administrative system of claim 12, wherein the respective cards are papyrus.

17. The digital asset account administrative system of claim 12, wherein the respective cards are metal.

18. The digital asset account administrative system of claim 12, wherein the writing step (vi) comprises printing each respective private key segment of the plurality of private key segments and the respective reference identifier on respective separate cards.

19. The digital asset account administrative system of claim 12, wherein the writing step (vi) comprises etching each respective private key segment of the plurality of private key segments and the respective reference identifier.

20. The digital asset account administrative system of claim 12, wherein the writing step (vi) comprises magnetically encoding each respective private key segment of the plurality of private key segments.

21. The digital asset account administrative system of claim 12, wherein the writing step (vi) comprises writing each respective private key segment of the plurality of private key segments as a scannable code.

22. The digital asset account administrative system of claim 21, wherein the scannable code is a bar code.

23. The digital asset account administrative system of claim 21, wherein the scannable code is a QR code.

24. The digital asset account administrative system of claim 12, wherein the computer-readable memory further stores thereon instructions that, when executed by the one or more processors, cause the one or more processors to perform the additional steps of:
    (viii) tracking, using the isolated computer, storage of each of the plurality of collated sets of cards.

25. The digital asset account administrative system of claim 24, wherein the each of the plurality of collated sets of cards is stored in a vault.

26. The digital asset account administrative system of claim 12, further comprising:
    (c) one or more reading devices operatively connected to the computer,
    wherein the computer-readable memory further stores thereon instructions that, when executed by the one or more processors, cause the one or more processors to perform the additional steps of:
    (viii) reading, using the one or more reading devices, each of the cards to ensure readability.

27. The digital asset account administrative system of claim 26, wherein the one or more reading devices are scanners.

28. The digital asset account administrative system of claim 26, wherein the writing step (vi) is performed before the reading step (viii).

29. The digital asset account administrative system of claim 26, wherein the writing step (vi) is performed after the reading step (viii).

30. The digital asset account administrative system of claim 26, wherein the computer-readable memory further stores thereon instructions that, when executed by the one or more processors, cause the one or more processors to perform the additional steps of:
    (ix) destroying the isolated computer, the one or more first writing devices, the one or more second writing devices, and the one or more reading devices.

* * * * *